United States Patent [19]
Marshall et al.

[11] Patent Number: 5,215,465

[45] Date of Patent: Jun. 1, 1993

[54] INFRARED SPOT TRACKER

[75] Inventors: Albert H. Marshall, Orlando; Ronald S. Wolff, Cocoa; Edward J. Purvis, Winter Park; Robert T. McCormack, Merritt Island, all of Fla.

[73] Assignee: The United States of America as represented by the Secretary of the Navy, Washington, D.C.

[21] Appl. No.: 788,073

[22] Filed: Nov. 5, 1991

[51] Int. Cl.$^5$ .................................. F41G 3/26
[52] U.S. Cl. ........................... 434/22; 434/20; 434/21; 358/93; 273/312
[58] Field of Search ......................... 434/16-24, 434/27, 43, 337; 273/310-316, 437, DIG. 28; 250/208.1, 330; 358/93, 104, 87

[56] References Cited

U.S. PATENT DOCUMENTS

| | | | |
|---|---|---|---|
| 4,223,454 | 9/1980 | Mohon et al. | 424/22 X |
| 4,280,135 | 7/1981 | Schlossberg | 358/93 |
| 4,496,158 | 1/1985 | Baer | 434/22 |
| 4,923,402 | 5/1990 | Marshall et al. | 434/22 |
| 4,934,937 | 6/1990 | Judd | 434/21 |
| 4,948,371 | 8/1990 | Hall | 434/21 |
| 5,035,622 | 7/1991 | Marshall et al. | 434/23 |

Primary Examiner—Richard J. Apley
Assistant Examiner—Joe H. Cheng
Attorney, Agent, or Firm—Robert W. Adams

[57] ABSTRACT

The apparatus is an interactive, scenario based simulator for training a weapons team in close encounter combat. Employed is a large screen projection system, a plurality of trainee positions, and means to remove aggressor images when neutralized by the team, to provide an apparent threat to the trainees from the simulated aggressors, and to track each trainees performance throughout the training scenario.

3 Claims, 7 Drawing Sheets

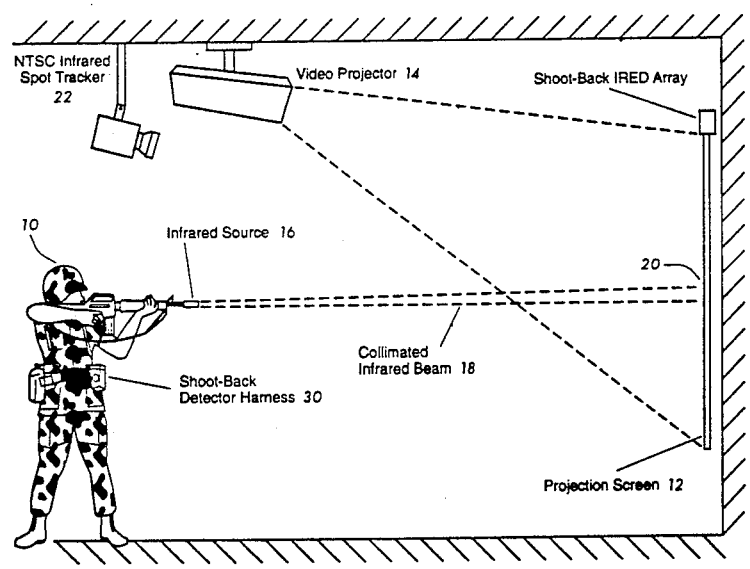

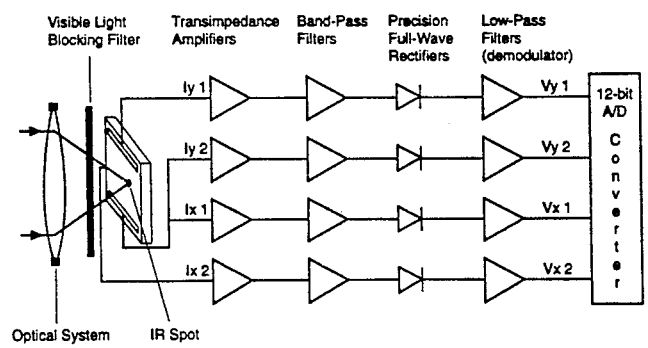

INFRARED SPOT TRACKER

BACKGROUND OF THE INVENTION

The present invention relates generally to the field of training devices and their component features, and more specifically to such devices that offer interactive simulation having responsive graphics components and systems.

The requirement to maintain a high state of readiness during austere budget times and to simulate close combat training effectively has placed new requirements on the training device community. Increased use of small echelon military-style operations to perform counter-terrorist and anti-drug strikes, and to affect tactical law enforcement functions have placed unique and renewed emphasis on simulation and training. Heretofore, strategies and tactics were rudimentary. Likewise, simulators were straight-forward and basic. Recently, the skills required for successful close combat have been perfected, and have outpaced the ability of previously existing training devices to simulate the scenario Needed were training devices that would allow trainees to practice and rehearse close combat training exercises such as low intensity conflict, light infantry, SWAT and security operations with an unsurpassed level of realism and feedback. Typical events might include security operations, hostage rescue, shoot-no-shoot, ambush training situations and routine law enforcement operations in a common team scenario environment.

Current simulator-based team trainers use technology which restricts both realism in tactical training situations and ability for thorough performance measurements. For example, aggressor images are not removed from the training scenario when the trainee successfully directs his or her simulated fire at the image, a feature if included that would simulate the aggressor in the real world who is disabled as a threat by accurate fire. In addition to directly affecting the training of the team member who is encountering the aggressor image, the training of other members as individuals and together as a team are negatively affected if the aggressor image is allowed to remain in the training scenario.

Further, current trainers do not require trainees to seek sensible cover and concealment during the scenario. Team trainers currently available permit the trainees to engage targets while fully exposed to on-screen aggressors since here is no aggressore shoot-back capability in the prior art.

Additionally, the prior art tracking systems for determining the aiming point of the trainees' weapons is limited to collecting data only at trigger-pull. As a result, continuous weapon position data is not available for replay, analysis, and feedback. There is also a substantial delay between trigger-pull and data collation that is inherent and proportional to the number of trainees in the team trainer.

Commercially available infrared spot tracking systems typically consist of a Charge Coupled Device (CCD) video camera interfaced to a digital frame grabber operating at standard video rates. A suitable lens system images the tracking area (i.e., video projection screen) onto the CCD imaging sensor. The frame grabber digitizes each frame of video data collected by the CCD camera. This data is further processed with digital signal processing hardware as well as proprietary software algorithms to find the position coordinates of the imaged IR spot.

The CCD imaging sensor consists of a two-dimensional matrix of discrete photodiode elements. A 10-bit (1024 horizontal elements × 1024 vertical elements) CCD imaging sensor has over one-million individual photodiode elements that convert the incident illumination into a proportional quantity of electrical charges. The electrical charges are sequentially transferred to a readout stage. At the readout stage, each electrical charge is converted into a proportional voltage signal. This voltage is further amplified to give a low impedance output video signal.

For accurate tracking and trigger-pull synchronization the position coordinates of each weapon should be updated at least every 3 milliseconds with a resolution of 10 bits. The CCD-based tracking system discussed above requires over 30 milliseconds to sequentially sample the weapon position coordinates, which is too long for its application to multiple trainees.

The present invention and its related component systems improve the effectiveness and realism for training a weapon fire team in a simulator environment.

The goal of the development effort that led to the present invention was to introduce new technology and techniques which can improve current team training system technology. The new developments include an interactive and high speed weapon tracking system in a training system that allows trainees to engage disappearing aggressor targets which are presented on a large video projection screen.

SUMMARY OF INVENTION

The objectives were to overcome the disadvantages of the prior art and provide an improved team trainer, develop apparatus and a method to remove aggressor targets which are hit as a training scenario progresses, develop apparatus and a method which allows aggressor targets to engage and disable trainees who do not take appropriate cover, and design a weapon tracking system that continuously and accurately provides weapon aimpoint coordinates for up to 9 trainees.

The development effort met the stated objectives. Aggressor targets are instantly removed from a training scenario as they are disabled by weapon fire from trainees. Also, an array of infrared emitting diodes is placed above the projection screen and a detector harness is used to detect a modulated infrared beam from this array, which increases tactical realism by requiring trainees to seek appropriate cover when engaged by aggressor targets. An innovative weapon tracking system that generates accurate weapon position data at over 300 Hz has been developed which is capable of continuously tracking weapon aiming points for each of a plurality of trainees.

Increased realism and effectiveness in simulator-based weapons team training can be realized through implementation of the new techniques and technology that are disclosed herein. Continuously tracking weapon aiming points for all members of a fire team expands performance measurement and playback capabilities. Training effectiveness and realism also are increased by instantly removing disabled aggressors from the training scenario and requiring trainees to take appropriate cover when an aggressor returns fire. Results include an increase in communication and awareness between members of the team. In contrast, previous training systems did not require trainees to seek appropriate cover. Also, aggressor targets were not removed from the progressing training scenario when they were successfully engaged and disabled by trainees.

DESCRIPTION OF A PREFERRED EMBODIMENT

Figure 1:
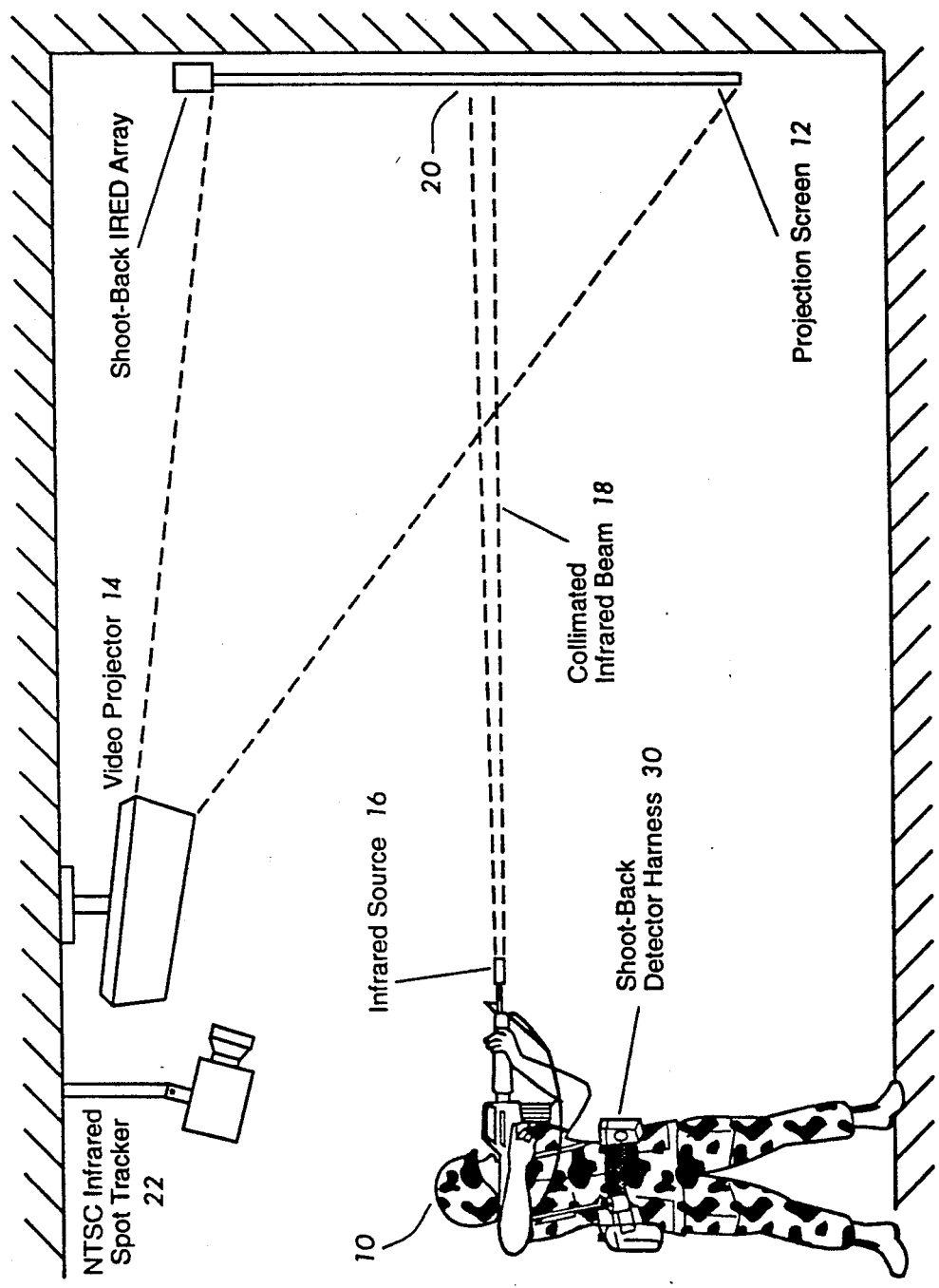
FIG. 1 is a diagram of a combat team trainer.
Figure 2:
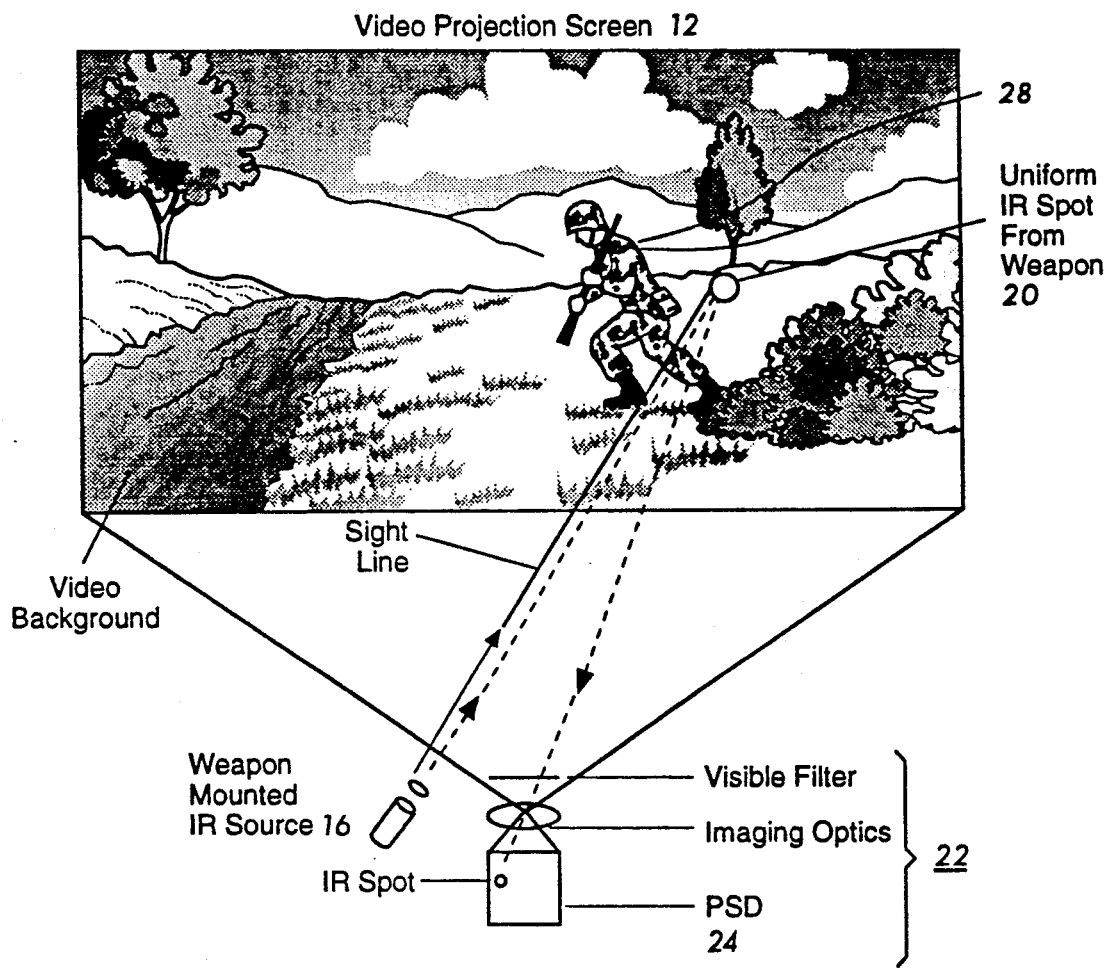
FIG. 2 shows an Infrared Spot Tracker Imaging Diagram of the preferred embodiment.

A preferred embodiment of the present invention is shown in FIG. 1. The training device accommodates training for a plurality of military or law enforcement trainees in a common-threat scenario. The trainees 10 interact with 100 inch video projection screen 12 set up in a training exercise room. The video projection screen 12 displays both live video targets and graphics overlay from video projector 14 and a video disk player under computer 26 control. Each trainee has a weapon that is equipped with a collimated source 16 of infrared (IR) energy, an infrared emitting diode (IRED). The IRED is collimated to maximize the IR energy transferred from the weapon to the projection screen 12 while minimizing the IR beam 18 divergence. The collimated infrared source 16 is aligned with the trainee's weapon and places a small infrared spot 20 on the video projection screen 12 corresponding to the location the trainee is pointing his weapon. The infrared sources 16 are sequentially modulated in a time-multiplexed mode by the system computer 26 to both identify the active weapon among the plurality of trainees and to improve signal detection.

Figure 3:
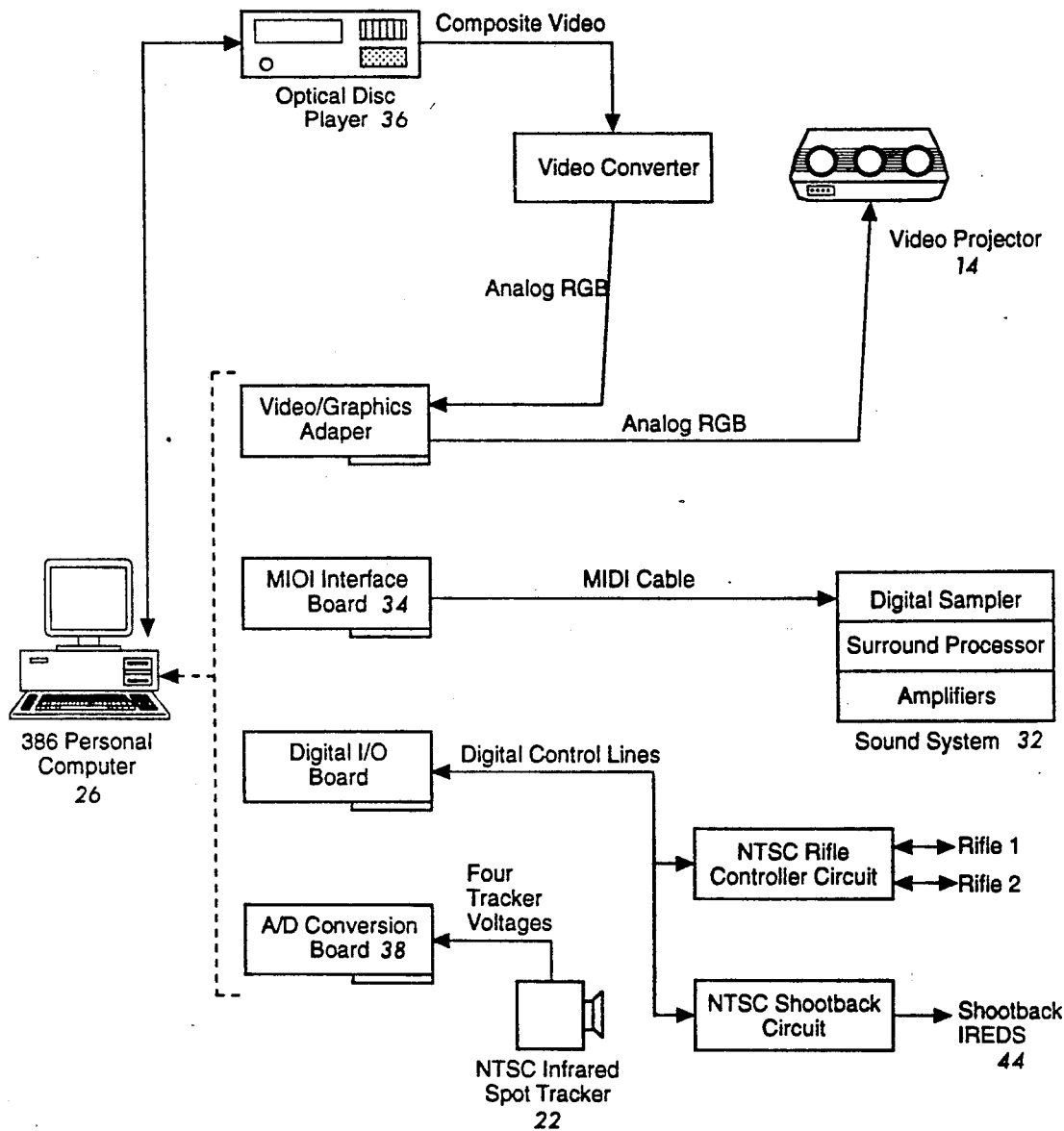
FIG. 3 is a block diageream of a combat team trainer.

A high-speed, low cost, infrared spot tracker 22 determines the continuous X and Y position coordinates of each weapon. The optical system for the infrared spot tracker 22 (IST) views the entire video projection screen 12 from a distance of approximately 12 feet, as configured in the preferred embodiment. The infrared spot 20 imaged onto the projection screen 12 surface is optically transferred or reimaged to a corresponding location on the Position Sensing Detector 24 (PSD) as shown in FIG. 3. The PSD and associated electronic circuitry is located within the IST enclosure. The system computer 26 determines the position coordinates of the infrared spot on the PSD and consequently the video projection screen 12 as well.

The high-speed PSD-based infrared spot tracker 22 generates the continuous position coordinate data of each weapon in less than 3 milliseconds; in contrast, a typical CCD-based tracker would require over 16 milliseconds. Due to the high-speed tracking capability of the PSD-based tracker 22, the training device allows for accurate tracking and trigger-pull synchronization for up to nine trainees.

The system computer 26 shown in FIG. 3 synchronizes the time-multiplexed enable signal for each weapon with the 12-bit analog to digital conversion of the IST position data. Once the system computer 26 knows the position coordinates of a weapon, it can compare that data to the stored coordinates of active targets 28 on the projection screen 12 at the time of trigger pull. If the IST position data matches the coordinates of a target on the projection screen 12, a hit is recorded for that weapon. A high-speed video graphics board utilizing "active windows" enables the targets 28 to disappear when hit without affecting the ongoing scenario.

The trainees are encouraged to take sensible cover as they would in the real world while engaging targets 28 displayed on the video projection screen 12. Each trainee wears a Multiple Integrated Laser Engagement System (MILES) torso harness 30 containing infrared detectors and an alarming device to indicate if he has been hit by an on-screen aggressor. The on-screen aggressor shoot-back is simulated above the video projection screen 12. Each IRED is pointed in a particular sector within the training exercise room so that all exposed areas are within the field of fire of the on-screen aggressors. The individual IREDs are turned on and off by the system computer 26 corresponding to where the on-screen aggressor is pointing his weapon. If a trainee does not take cover while in the field of fire of the on-screen aggressors he will be illuminated with infrared energy. The infrared detectors positioned on the MILES torso vest will detect the incident IR energy and activate an alarm to indicate that the trainee has been shot by the on-screen aggressor. Once a trainee has been hit he is considered dead and his weapon is disabled.

After a training session is over, the video scenario is played back in slow motion. The system computer 26 shows the continuous pointing location of each weapon by graphically displaying color coded icons representing the continuous IST position data stored by the system computer 26 during the actual training session. Hit and miss shot locations are indicated by changing the color of the icons.

A complete sound system 32 has also been developed to simulate the actual acoustical training environment of each scenario An Analog/Digital sampler digitizes, stores and plays back the background sounds as well as the synchronized gun shot sounds corresponding to the trainees and the on-screen aggressors. The sampler is under the control of a Musical Instrument Digital Interface (MIDI) port interfaced to the system computer 26 for proper timing and synchronization.

Several software programs control both training scenario development and presentation for the training device. A source code of the programs, written in C language under the MS-DOS operating system, are attached hereto. Computer software control of the optical disc player allows automated scenario development and rapid aggressor selection. Control of the weapon tracking system hardware provides continuous tracking of each weapon's aimpoint and status. Various functions of the video graphics adapter allow interactive control of the on-screen aggressors. Commands transmitted by MIDI (Musical Instrument Digital Interface) board 34 provide sound effects as each scenario progresses. Synchronous control of the training device system hardware based on the scenario content creates the training session.

Moving video footage from an optical disc player 36 generates the training device aggressor threat. Scenario development begins with formulation of a script for the aggressor force. The script describes aggressor actions including timing and movement within the camera's field of view. Creating aggressors that will disappear when hit imposes some restrictions on the video recording process. Scenario constraints include maintaining a stationary camera, restricting overlap of aggressor targets 28, and sustaining consistent lighting. However, these constraints enable instant feedback through disappearing targets 28 and increase flexibility in aggressor selection.

Creating aggressor targets 28 which disappear when hit requires consistency in background and lighting of the video image. These factors are crucial during portions of a scenario where aggressor targets 28 are visible and engageable. Each scenario's moving video can be sectioned into segments in which an aggressor appears into view, engages the trainee, and then takes appropriate cover. Dividing a scenario's moving video footage into sections maximizes optical disc storage by eliminating nonessential video. During each section, camera stability and lighting consistency allow the video graphics adapter to add or remove aggressor targets 28 as a training session progresses.

Depending on the type of scenario, movement of the camera may be necessary to recreate the threat situation. For example, a security force clearing a building would maneuver through the building. Therefore, maneuvering the camera is necessary to produce this type of scenario. To allow for this type of camera movement the scenario script specifies locations where aggressor engagements occur. Before aggressors are introduced into the scenario, the camera position is fixed at a designated location which maintains a consistent background. From this location, multiple aggressor actions are recorded. The camera is then maneuvered to the next designated area and the process is repeated Recording multiple aggressor actions at each location enables the training session to branch based upon the trainee performance. These video segments of aggressor engagement and camera movement are edited and transferred to optical disc.

After transferring a scenario's video segments to optical disc, a program generates a detailed description or map of each segment. This program automates this mapping process by using a user-friendly menu system, graphical overlays under mouse control, and optical disc control functions. The mapping process generates a data file specifying each video segment First, the optical disc is scanned to locate the start frame for a video segment. Once located, the number of aggressor targets 28 is identified and entered. For each target, a rectangle is drawn around the area which covers the complete exposure or path of the aggressor target during the video segment This rectangle defines the live video window used to interactively control each aggressor. By single stepping the optical disc both hit areas and shootback directions are identified for each frame of the video segment. Specifying a unique filename for each segment's mapping data creates a data base which describes every video segment applicable to a specific training scenario.

The purpose of the detailed mapping process is to allow a video graphics adapter to interactively present the aggressor force during a training scenario. The optical disc player composite video output is converted to an analog RGB signal for input to the video graphics adapter. The video graphics adapter is configured for a 756×972 pixel display buffer which is capable of storing two high resolution video frames each containing 756×486 pixels. The video graphics adapter performs real-time capture of the video image at 16 bits per pixel. This 16 bit per pixel format allows the display of both live video and high resolution graphics. Addition and removal of aggressor targets 28 is accomplished by opening and closing live video windows within the captured video image. Closing a live video window while using a double buffer drawing technique allows instantaneous removal of the aggressor target. Software control of the tracking system hardware allows each weapon to be continuously monitored during a training scenario The hardware is comprised of the newly developed infrared spot tracker 22 based on a position sensing detector 24 (PSD), an analog to digital (A/D) conversion board 38, a high powered infrared emitting diode (IRED) mounted on each weapon, and control electronics. Each weapon's aimpoint, trigger switch position, selector switch position, and magazine reload indicator are sampled at approximately 60 Hz.

A periodic interrupt procedure controls the weapon tracking process. The A/D board is configured to acquire the IST's four analog outputs with direct memory (DMA) data transfer, which requires minimal CPU overhead. A programmable interval timer provides timing signals which sequence the process. The programmable interval timer is configured to generate both a 3 millisecond periodic interrupt (rate generator) and a 2 millisecond one shot delay. Activated every 3 milliseconds, an interrupt service procedure controls the weapon tracking process.

Figure 4:
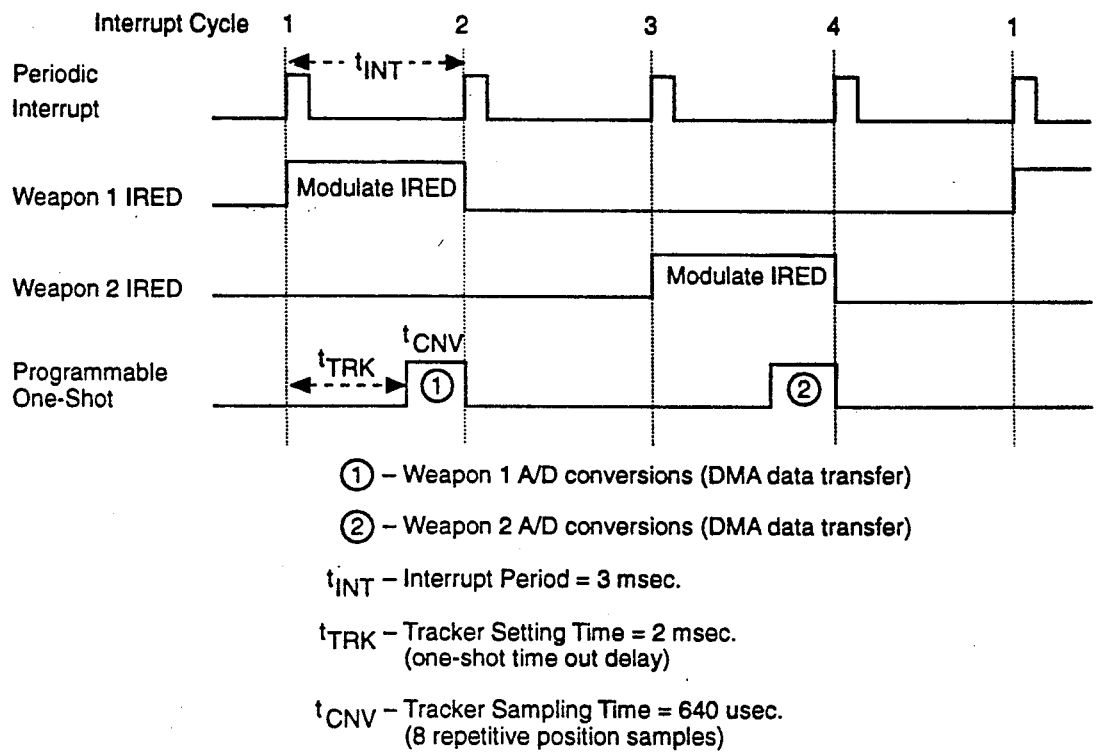
FIG. 4 shows a Timing Sequence for Tracking Weapon Aim points.

The timing sequence for a two weapon system is shown in FIG. 4. At the start of the first interrupt cycle weapon one's IRED is activated and the programmable oneshot is retriggered. After 2 milliseconds the infrared spot tracker's four analog outputs have settled and reflect the horizontal and vertical position of weapon one's aimpoint. Simultaneously, the programmable one-shot output gates the A/D board to acquire the tracker's four outputs. Each output is converted as 50 kHz to 12-bit digital values. During approximately 640 microseconds the four outputs are sampled eight times and the 12-bit results are DMA transferred into a data buffer. Upon entry of the second interrupt cycle, weapon one's IRED is turned off and the A/D data buffer is monitored. Comparing data buffer elements to a voltage threshold determines the presence of the weapon one's infrared spot 20. If detected, the tracker's raw data is averaged. Calculations are then used to determine weapon one's non-scaled horizontal and vertical positions. In addition, weapon one's switch positions are updated. Similarly, weapon two's IRED is modulated during interrupt cycle three and positional data is generated during cycle four.

Repetition of this interrupt sequence provides continuous update of each weapon's aimpoint and switch status. Two techniques enable this tracking process to require minimal CPU overhead. First, multiple conversions of the tracker's four analog outputs are performed with DMA data transfer. Second, a periodic interrupt procedure, essentially a background task, performs both tracking system controls and basic position data calculations.

A simple weapon zeroing procedure is used to find coefficients and offsets for two first order equations. These equations are then used to convert the raw tracking system data to x and y screen coordinates. However, this technique does not maximize the accuracy and stability of the tracking system hardware. In order to increase the accuracy of the tracking system, the weapon alignment algorithm would be adjusted to account for the tracker's viewing angle, the tracker's lens distortion, and the video projector's linearity; and, the tracker's imaging optics would be optimized to increase accuracy. Furthermore, increasing the A/D conversion rate to acquire more samples and improving data conditioning algorithms would improve tracking system performance.

As described for the preferred embodiment, the training device is configured as a two weapon system. However, the weapon tracking process is expandable. Additional weapons can be added while achieving sufficient sampling rates, up to 9 weapons at greater than 30 Hz. Also, a larger field of view can be covered through the use of multiple infrared spot tracker 22.

The training device system computer 26 controls the presentation of each scenario's moving video footage through a RS-232 communication link to the optical disc player. Synchronizing the moving video footage to the simulation software provides an event timing mechanism. Each moving video segment is synchronized by initiating the optical disc playback operation and monitoring a vertical sync counter on the video/graphics board. During optical disc playback the current frame number is instantly accessible by reading this counter. This provides an accurate and efficient method for synchronizing the simulation software. In comparison, polling the optical disc player through the RS-232 port requires too much time and CPU overhead.

During a training scenario various segments of moving video footage are presented to the trainees. Target mapping and hit areas are read from a data file located on ramdisk. The simulation is controlled by synchronizing scenario mapping data to the interrupt generated rifle tracking data. An aggressor target is removed from the training scenario when a trainee succesfully fires his weapon within the hit area defined for the current video frame. Weapon sound effects are generated based on both rifle tracking data and aggressor target shoot-back data. Weapon aim points, shot locations, and status are continuously stored for each trainee during the training session. After a training session is completed, this information is provided to the trainees for review.

The performance of each trainee is evaluated based on the number of rounds expended, the number of aggressor targets hit, and a visual replay of each weapon's movement with shot locations. Upon completion of a training scenario a replay function performs a slow-motion display of the scenario with graphical overlays. During replay a different colored circle represents each weapon's aim point. Shot locations are indicated by changing the weapon's aim point color and briefly pausing the video playback. An aggressor target hit, a semi-automatic fire miss, or an automatic fire miss is indicated by changing the aim point color to red, blue or green respectively. The ability to continuously track each weapon's movement enhances both individual and team performance measurements.

Figure 6:
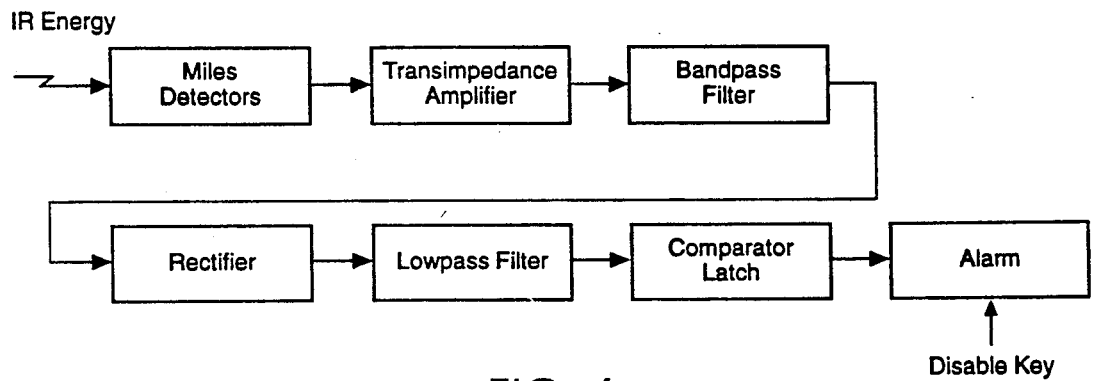
FIG. 6 is a Block Diagram of IR Detection Circuitry.

The implementation of the aggressor shoot-back system consist of three subsystems: 1) the shoot-back bar 40, consisting of a horizontal IRED array located just above the video projection screen, 2) the IRED modulator/driver circuitry 42 located in the proximity of the system computer and coupled to bar 40 by lines 44, and 3) the infrared detection circuitry located on the back of the MILES torso vest, and shown in FIG. 6. The system computer 26 turns the IRED modulator/driver on and off in synchronization with the on-screen aggressors action. If the on-screen aggressor is shooting his weapon towards a particular sector then the corresponding IRED is enabled and modulated, forcing the trainee to take cover while in that sector.

Figure 5:
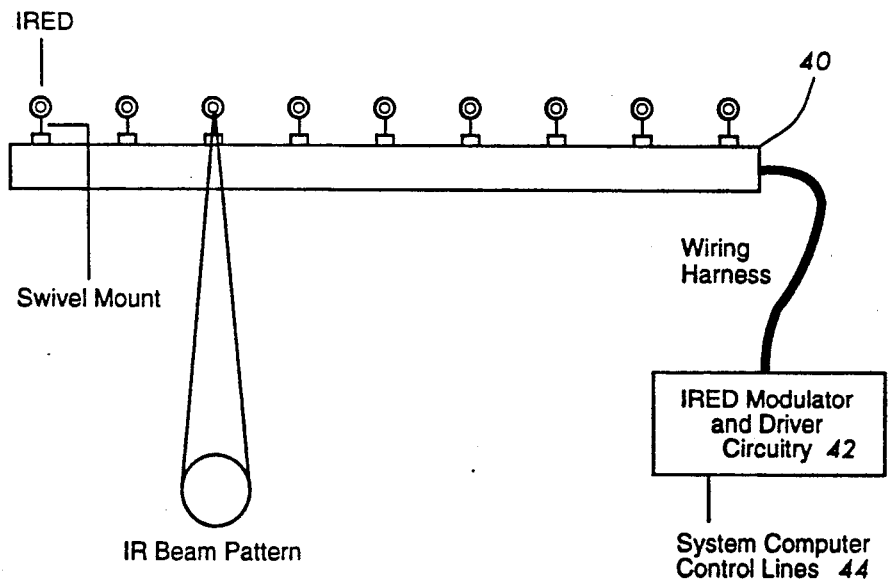
FIG. 5 shows a Shoot-back IRED Array Mounted Horizontally Above Projection Screen.

The shoot-back bar comprises nine IREDs with built in lenses placed horizontally across the top of the video projection screen 12. FIG. 5 illustrates the shoot-back IRED array used to simulate aggressor shoot-back. The individual IREDs are mounted on a ball and socket swivel mount for optimum adjustment. The IREDs have a half intensity beam angle of less than six degrees. The small beam angle is suitable for the other dimensions of the training device and allows the individual IREDs output energy to be strategically directed throughout the training exercise room.

The IREDs are modulated by a 1.6 Khz square wave when enabled by the system computer 26. Modulating the IREDs allows the driver circuit to pulse more current through the IRED for a higher output power as well as increasing the detectivity of the low level IR signal by the detection circuitry.

The modulator circuit consist of a LM555 timer integrated circuit operating in the astable oscillating mode. The TTL output voltage of the LM555 timer supplies the gate voltage for an Enhancement Mode Junction Field-Effect Transistor (EMJFET) which then sources the required current to IRED.

The IR detection circuitry is shown in FIG. 6 and comprises eight infrared detectors connected in parallel and strategically placed on the MILES torso vest. The original MILES electronics is replaced with specific electronics to detect the modulated infrared energy from the IRED array used to simulates shoot-back.

A low noise transimpedance amplifier converts the output current from the photodetectors into a proportional voltage. The infrared signal voltage is amplified and filtered with a fourth order bandpass filter. The output signal from the bandpass filter is rectified and demodulated with a lowpass filter. The lowpass filtered signal is compared to a reference voltage to determine if the trainee was hit by an on-screen aggressor. If a sufficient signal is detected to indicate a hit, then an alarm sounds to indicate to the trainee he has been killed. The alarm is latched with an SCR; therefore, the trainee must disable his weapon to utilize a "key" to turn off the hit indicator alarm.

Figure 7:
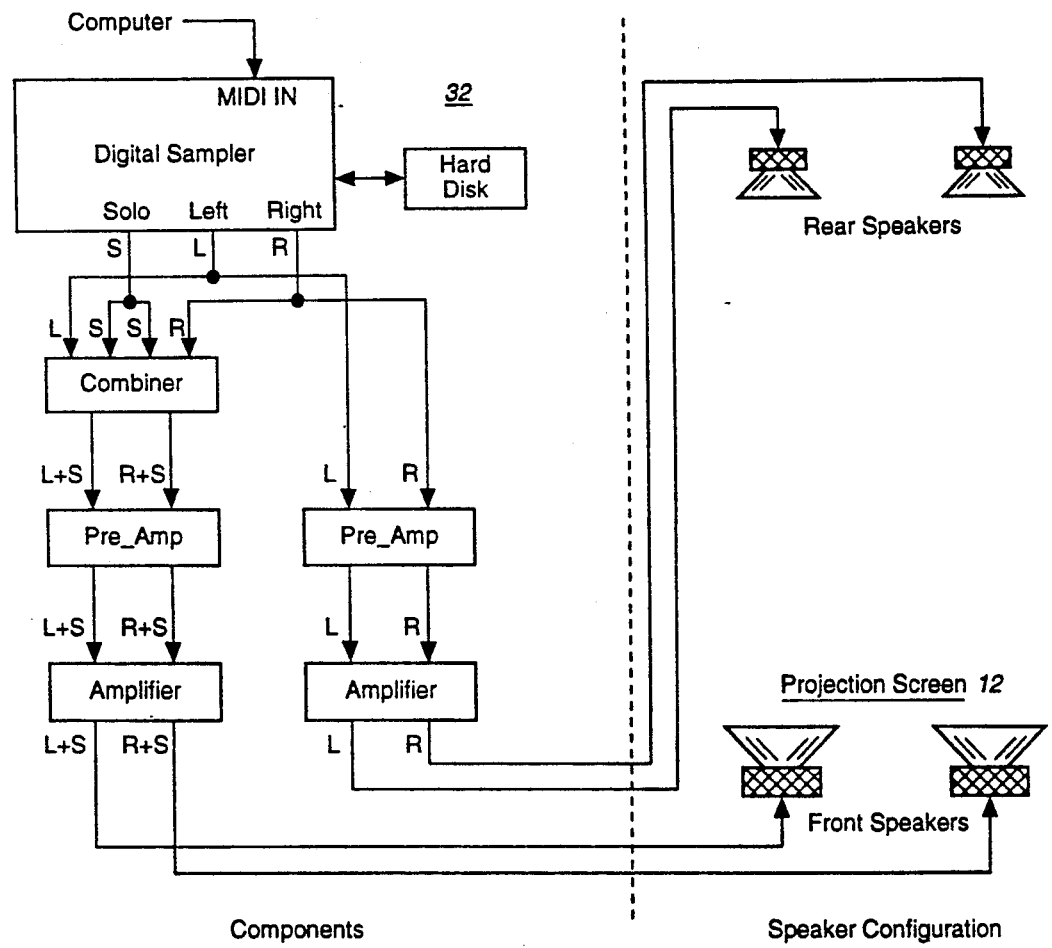
FIG. 7 shows the Sound System Components and Speaker Configuration of the preferred embodiment.

Sound effects are generated during a training scenario. The major sound system components and speaker configuration is shown in FIG. 7. They provide sounds of the various weapons being fired by both the trainees and their on-screen adversaries. Also, background sounds are generated to increase realism during a training scenario. The heart of the sound system 32 is a digital sampler module. The sampler digitizes, stores and plays back sound effects under the control of a MIDI (Musical Instrument Digital Interface) port A MIDI controller card is installed in the system computer 26. During a scenario the computer sends appropriate commands to the sampler via the MIDI interface. The sampler creates the appropriate sounds and sends to amplifiers which drive foreground and background sounds. Mixers are used to control dispersion between the foreground and background.

Using a sampler module with an external storage device allows a multitude of sound effects to be available for increasing realism in training. The sampler uses both a 3.5 inch 800 Kbyte floppy drive and an 80 Mbyte SCSI hard disk to store digitized sounds. Depending on sample rate, the 80 Mbyte SCSI disk can hold as much as an hour or more of sampled sounds that can be mixed and sequenced by the sampler to generate essentially unlimited amounts of audio feedback. The sounds that are digitized and recreated by the sampler come from a variety of sources. Some may be selected from commercially available sound effects available on compact disk. Some are recorded in the field using both regular and DAT tape recorders. Still others may be synthesized. For use in the training device, the sounds were edited and sometimes normalized before being digitized. Realism and variation in training scenarios is enhanced by adding computer controlled sound effects.

An infrared spot tracking system is used in the training device to determine the continuous X and Y position coordinates representative of where each trainee is pointing his weapon.

To overcome the disadvantages of CCD-based tracking systems, a low-cost, high-speed, IST was developed utilizing a two-dimensional lateral-effect photodiode, the Position Sensing Detector 24 (PSD). The PSD is not a discrete charge transfer device such as the CCD, but rather a continuous analog output device. In contrast to other types of position sensing photo devices such as CCD detectors, the PSD offers higher resolution, faster speed, larger dynamic range, and simpler signal processing.

Figure 8:
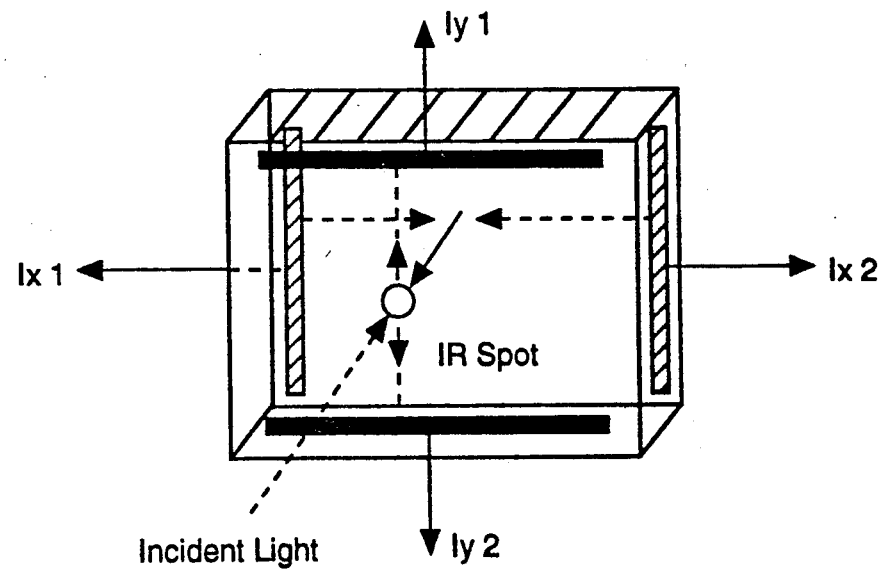
FIG. 8 shows a Two Dimensional PSD Structure.

The PSD is a photoelectronic device utilizing the lateral photo-effect to convert an incident light spot into continuous position data. Its two-dimensional PSD structure is shown in FIG. 8. The lateral photo-effect occurs because of the diffusion properties of separated charge carriers along a uniformly or nonuniformly irradiated p-n junction. The current diffusion in a fully reversed-biased p-n junction occurs primarily due to the external collection of generated charge carriers through finite loading impedances. For a two-dimensional fully reversed-bias PSD with zero loading impedance, there is an analytical linear relationship between the output current and the light spot position along the pertinent axis.

The basic construction of a two-dimensional lateral-effect PSD consist of p and n doped layers of silicon forming a p-n junction. The front side of the PSD is an implanted p-type resistive layer with two lateral contacts placed opposite each other. The back side of the PSD is an implanted n-type resistive layer with two lateral contacts placed orthoganol to the contacts on the front side. The p and n layers are formed by ion implantation to ensure uniform resistivity. As an example, high resistivity silicon can be implanted with boron on the front side and with phosphorus on the back side. The p-n junction is light sensitive; therefore, incident light will generate a photoelectric current which flows through the ion implanted resistive layers. Electrodes are formed at the edges of the PSD by metalization on the ion-implanted resistive layers. Transimpedance amplifiers serve as a finite load impedance to convert the generated charge carriers to a position dependent voltage.

The two-dimensional lateral-effect PSD used in the design of the IST is able to detect an incident light spot position on its rectangular surface with a maximum non-linearity of 0.1 percent.

Figure 9:
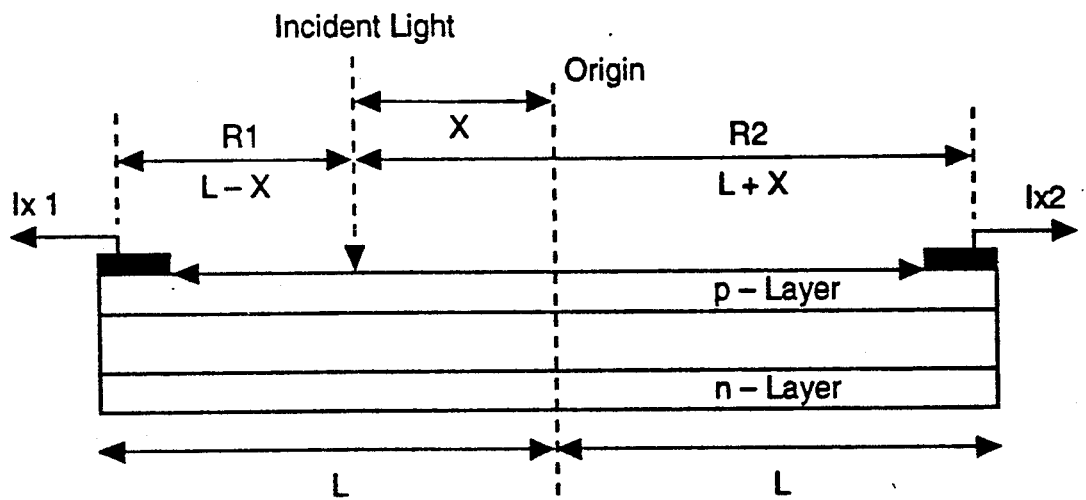
FIG. 9 shows a One Dimensional PSD Structure.

The photoelectric current generated by the incident light flows through the device and can be seen as two input currents and two output currents. The distribution of the output currents to the electrodes determines the light position in the Y dimension; the distribution of the input currents determines the light position in the X dimension. The current to each electrode is inversely proportional to the distance between the incident light position and the actual electrode due to the uniform resistivity of the ion implanted resistive layers. FIG. 9 shows a one-dimensional PSD position model that illustrates how simple algebraic equations determine the incident light spot position. This model assumes a zero ohm load impedance and a theoretically uniform implanted resistive layer.

In FIG. 9 the distance between electrodes 1 and 2 is 2 L, and the uniform resistance is R. The distance from electrode 1 to the position of the incident light spot is L − X, and the resistance is $R_1$. The distance from electrode 2 to the position of the incident light spot is L + X, and the resistance is $R_2$. The photocurrents produced at electrodes 1 and 2 are proportional to the incident input energy and inversely proportional to the uniform resistant path from the incident light to the electrodes. The total photocurrent produced by the input energy is $I_0$. The sum of the output currents $I_1$ and $I_2$ is equal to $I_0$.

Figure 10:
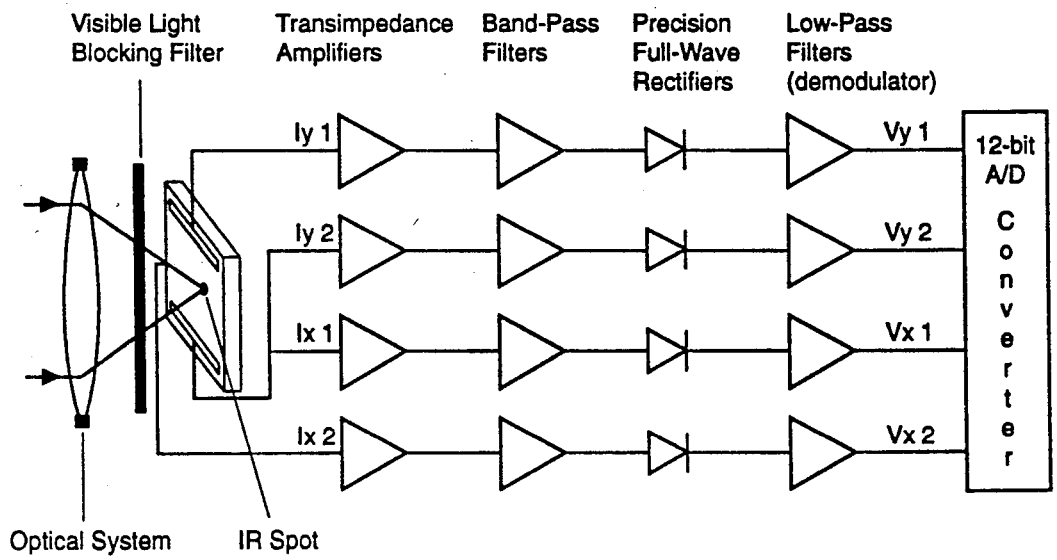
FIG. 10 shows an Infrared Spot Tracker Block Diagram.

From FIG. 10, we can derive the following equations, $$I_1 = I_0 \frac{R_2}{R_1 + R_2} \quad (1)$$

$$I_2 = I_0 \frac{R_1}{R_1 + R_2} \quad (2)$$

The resistance of $R_1$ and $R_2$ is proportional to the linear distance that $R_1$ and $R_2$ represent since the resistive layer is uniform. In general, the resistance of a given material is given by $$R = \frac{\rho L}{A} \quad (3)$$

where,
  p = resistivity of the material in ohms.meter
  L = length of material in meters
  A = area of material in meters$^2$ IF we now define $R_1$ and $R_2$ with respect to p, L, and A we obtain the following expressions:

$$R_1 = \frac{\rho(L - x)}{A} \quad (4)$$

$$R_2 = \frac{\rho(L + x)}{A} \quad (5)$$

Substituting equations (4) and (5) into equations (1) and (2), the output currents $I_1$ and $I_2$ can now be written as:

$$I_1 = I_0 \frac{L + x}{2L} \quad (6)$$

-continued $$I_2 = I_0 \frac{L-x}{2L} \quad (7)$$

We can eliminate the dependance of equations (6) and (7) on $I_0$ by dividing the difference of $I_1$ and $I_2$ by the sum of $I_1$ and $I_2$. We can now solve for the X position ($X_{pos}$) of the incident input energy relative to the chosen coordinate system shown in FIG. 10.

$$X_{pos} = \frac{I_1 - I_2}{I_1 + I_2} \quad (8)$$

Substituting equations (6) and (7) into equation (8) gives $$X_{pos} = \frac{x}{L} \quad (9)$$

Equation (9) gives the linear position of the incident energy important since the intensity of the focused energy source on the PSD surface is rarely constant in a typical application. The two-dimensional PSD position model operates analogous to the one-dimensional PSD position model except that there are now two uniform resistive layers and four electrodes. The top resistive layer is used to divide the output currents into $I_{y1}$ and $I_{y2}$. The bottom resistive layer is used to divide the input currents into $I_{x1}$ and $I_{x2}$. The four currents $I_{y1}$, $I_{y2}$, $I_{x1}$, and $I_{x2}$ determine the x and y position coordinates of the incident energy source analogous to the one-dimensional case.

The X position coordinate is given by $$X_{pos} = \frac{I_{x1} - I_{x2}}{I_{x1} + I_{x2}} \quad (10)$$

The Y position coordinate is given by $$Y_{pos} = \frac{I_{y1} - I_{y2}}{I_{y1} + I_{y2}} \quad (11)$$

Equations (10) and (11) clearly show that we may obtain the X and Y position coordinates of an incident energy spot focused onto the PSD surface by a simple manipulation of the output photocurrents.

Since it is the magnitude of the photocurrents that we wish to manipulate we can represent the four output currents with four output voltages as long as we preserve the magnitude information. We now have the following design equations:

$$X_{pos} = \frac{V_{x1} - V_{x2}}{V_{x1} + V_{x2}} \quad (12)$$

$$Y_{pos} = \frac{V_{y1} - V_{y2}}{V_{y1} + V_{y2}} \quad (13)$$

The design of the analog electronic subsystems for the PSD-based tracker 22 is dependent on the amount of reflected IR energy collected and focused onto the PSD surface. This energy is a function of the IR energy source mounted on the weapon, the projection screen reflectivity, the angle of incidence of the collimated energy source 16 to the projection screen, and the collecting optics used to collect and focus the reflected IR energy onto the PSD surface.

FIG. 10 shows that the electronic design of the IST consists of six functional blocks. The lens system 46 as previously discussed images the video projection screen 12 onto the PSD surface, thereby imaging the modulated IR spot on the PSD accordingly. The PSD's photo-voltaic effect converts the modulated IR energy focused on its surface into four separate photocurrent outputs. The voltage representation of the magnitude of the photocurrent outputs are used to calculate the spot position on the PSD surface according to equations (12) and (13).

Figure 11:
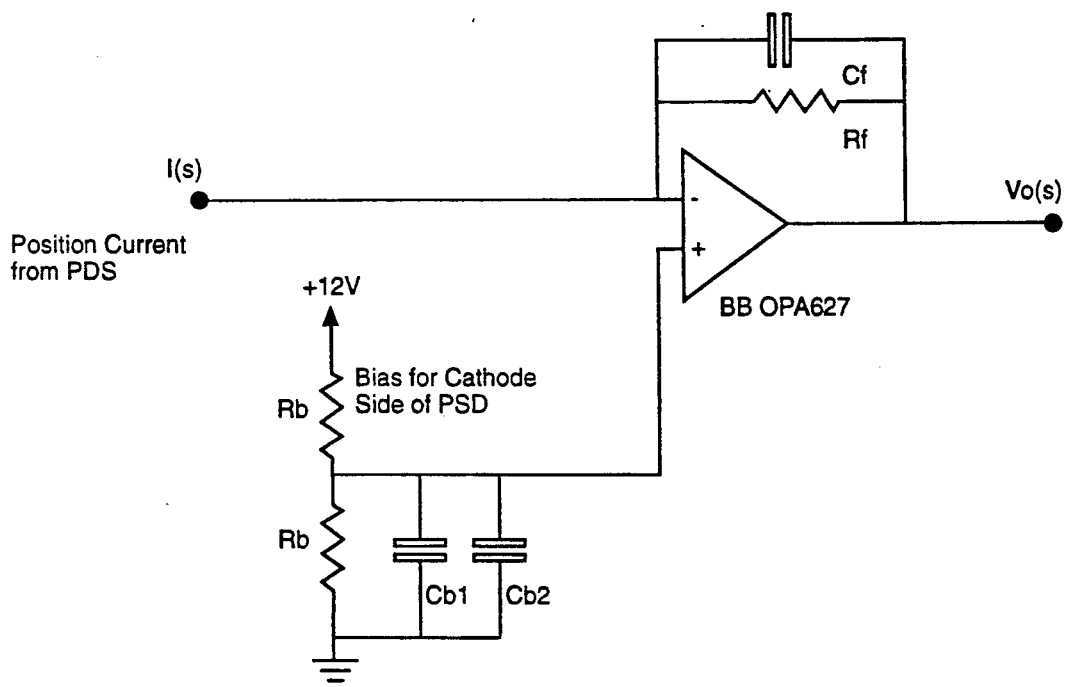
FIG. 11 shows a DC Coupled PSD/Transimpedance Amplifier Configuration.

The photocurrent outputs from the PSD electrodes are terminated into low noise transimpedance amplifiers. FIG. 11 with a bias potential for reverse biasing the p-n PSD junction In this configuration, the PSD views a load impedance $Z_L(s)$ defined as $$Z_L(s) = \frac{R_f}{A(s)[R_f C_f s + 1]} \quad (14)$$

where,
A(s) is the amplifier's open-loop transfer function
w is the modulating frequency of the IRED
$R_f$ is the feedback resistor
$C_f$ is the feedback capacitor To maximize the lateral photo-effect and the linearity of the PSD output currents, the terminating load impedance $Z_L(s)$ should be much less than the position sensing sheet resistance of the PSD [3]. As can be seen from equation (14), this limits the magnitude of the feedback resistor and the modulating frequency of the IRED for optimum performance.

The transimpedance amplifier converts the generated charge carriers from the PSD to a representative voltage. The output voltage of the transimpedance amplifier is given by, $$V_o(s) = I(s)\left[\frac{R_f}{R_f C_f s + 1}\right] + V_n(s) + V_{os}(s) \quad (15)$$

where,
$V_o(s)$ is the output voltage of the amplifier
I(s) is one of four modulated PSD output currents
$V_n(s)$ is the total output noise voltage including shot noise, thermal noise, and amplifier noise
$V_{os}(s)$ is the total offset voltage due to the dark current and amplifier bias currents The low-level dc coupled output voltage from the transimpedance amplifier is band-pass filtered with a wide-band fourth order Butterworth filter. The band-pass filter suppresses the unwanted background signal (e.g., room lights), the reverse bias voltage, the offset voltage, and the output noise from the transimpedance amplifier while amplifying the 10 KHz IR signal from the trainee's weapon.

The band-pass filtered signal is further amplified and converted back to a modulated dc voltage level by a precision full-wave rectifier circuit. The dc restoration enables the original dc modulated 10 KHz photocurrent magnitude information to be retained as a dc modulated 20 KHz time varying voltage with a nonzero average.

The full-wave rectified signal is low-pass filtered (demodulated) with a fourth-order Bessel filter to remove the ac Fourier components of the waveform while retaining the dc magnitude information. A cutoff frequency of 500 Hz was chosen to minimize the transient response of the low-pass filter while still allowing for adequate filtering.

The analog output voltages from the low-pass filters are used to calculate the incident spot position relative to the PSD surface according to the following equations: For the X position coordinate, $$X_{pos} = \frac{V_{x1} - V_{x2}}{V_{x1} + V_{x2}} \quad (16)$$

and for the Y position coordinate, $$Y_{pos} = \frac{V_{y1} - V_{y2}}{V_{y1} + V_{y2}} \quad (17)$$

where, $V_{x1}$, $V_{x2}$, $V_{y1}$, and $V_{y2}$ are the analog output voltages representing the photocurrent magnitude information from the PSD.

The high-speed analog to digital converter board converts the analog output data from the IST to a 12-bit digital signal. The system computer 26 performs the simple calculations to determine the $X_{pos}$ and $Y_{pos}$ coordinates of the IR spot based on equations (16) and (17). An algorithm based on statistical averaging and position probablity is performed over a number of samples to increase the effective resolution to 10 bits.

From the foregoing description, it may readily be seen that the present invention comprises new, unique and exceedingly useful apparatus which constitutes a considerable improvement over the prior art. Obviously, many modifications and variations of the present invention are possible in light of the above teachings. It is, therefore, to be understood that within the scope of the appended claims the present invention may be practiced otherwise than as specifically described.

```
/*----------------------------------------------------------------*/
/*                                                                */
/* MODULE - TEAM2.c                                               */
/*                                                                */
/* This module is the main module for WTET.  This module contains functions*/
/* which control system operation.                                */
/*                                                                */
/*----------------------------------------------------------------*/ include <stdio.h>
include <stdlib.h>
#include <conio.h>
#include <graph.h>
#include <stage.h>
include <dos.h> include       "include\literal.h"
include       "include\loadl.h"
#include       "include\vista.h"
#include       "include\vdisk.h"
#include       "include\nmidi.h"
#include       "include\replayl.h"
#include       "include\track.h"
#include       "include\das20.h"

#undef         GLOBAL
#define        GLOBAL             /* define GLOBAL to blank */
#define        INIT               /* initialize in global.h */
#include       "global.h"

/***************** TRACK.H DATA DESCRIPTION ******************************
  trnds[x]              total round fired by rifle x rstat[x] = 0          off screen, no shot fired
  rstat[x] = 1          off screen, semi shot fired
  rstat[x] = 2          off screen, auto shot fired
  rstat[x] = 3          on screen, no shot fired
  rstat[x] = 4          on screen, semi shot fired
  rstat[x] = 5          on screen, auto shot fired tstat[x] = TRUE       rifle x trigger pulled, semi or auto
  tstat[x] = FALSE      rifle x trigger released, semi or auto mag[x]                number of rounds remaining in rifle x's magazine acnt[x]               number of rifle samples while trigger pulled
                  under automatic fire mode aflag[x] = TRUE       rifle x trigger pulled, auto mode only
  aflag[x] = FALSE      rifle x trigger released, semi or auto
*************************************************************************/
```

```
/*---------------------------------------------------------------------*/
/*                                                                     */
/* MODULE - TEAM2.c                                                    */
/* FUNCTION - random ( int limit)                                      */
/*  This function generates a random interger from 0 to limit          */
/*                                                                     */
/*---------------------------------------------------------------------*/
int random(int   limit)
{
        float   rrnd;

rrnd = (float) rand();
        rrnd = rrnd/32767.0;
        return ( (int) (rrnd * limit));
}

/*---------------------------------------------------------------------*/
/*                                                                     */
/* MODULE - TEAM2.c                                                    */
/* FUNCTION - sync_delay ( int fields)                                 */
/*  This function causes a generates a delay based on number of fields */
/*  or 16.67 msec increments.                                          */
/*                                                                     */
/*---------------------------------------------------------------------*/
void vsync_delay(int   fields)
{
        int     i;

for ( i = 0; i < fields; i++) {
              VBLWait();
        }
}

/*---------------------------------------------------------------------*/
/*                                                                     */
/* MODULE - TEAM2.c                                                    */
/* FUNCTION - wait_for_frame(int frame)                                */
/*                                                                     */
/*  This function searches on the video disk player for a specific frame */
/*  (frame) and waits until that frame is accessed.                    */
/*                                                                     */
/*---------------------------------------------------------------------*/
void wait_for_frame(int frame)
{
        int     cfrm;

while(1) {
              cfrm = vdisk_track();
              vsync_delay(2);
              if (cfrm == frame) break;
        }
}

/*---------------------------------------------------------------------*/
/* MODULE - TEAM2.c                                                    */
/* FUNCTION - open_target_windows(int frame)                           */
/*                                                                     */
/*  This function opens target windows within the frame grabed image by */
/*  inverting the image which specifies live video and stores the backgound */
/*  in inverted form.                                                  */
/*---------------------------------------------------------------------*/
void open_target_windows(void)
{
        int     j;

for ( j = 0; j < targs; j++) {
              alive[j] = TRUE;
              InvertRect( trg_window[j]);
        }
}
```

```
/*---------------------------------------------------------------------*/
/* MODULE - TEAM2.c                                                    */
/* FUNCTION - close_target_windows()                                   */
/*                                                                     */
/* This function closes any active target windows within the frame grabed */
/* image.                                                              */
/*---------------------------------------------------------------------*/
void close_target_windows(void)
{
        int     j;

for (j = 0; j < targs; j++) {
             if ( alive[j] == TRUE) InvertRect(trg_window[j]);
        }
}

/*---------------------------------------------------------------------*/
void get_background(int frame)
{
        ImageHdl        image1;

vdisk_int_search(stillframe);
        SetBackColor(VIDEO);
        EraseRect(screen);
        vsync_delay(120);
        ACTIVE_PAGE_1;
        VIEW_PAGE_1;
        wait_for_frame( stillframe);
        vsync_delay(120);
        GrabFrame();
        image1 = NewImageForPort(screen);
        GetImageFromPort(image1,screen);
        ACTIVE_PAGE_2;
        PutImageToPort(screen,image1);
        DisposeImage(image1);
        VIEW_PAGE_2;
}

/*---------------------------------------------------------------------*/
void sync_play(ulong *vcnt)
{
        int     c;

while (1) {
             c = VBLWait();                    /* wait for even field */
             if ( c == 0) {
                  *vcnt = VBLCount() + 1;
                  break;
             }
        }
        vdisk_cmd(PLAYFWD);
}

/*---------------------------------------------------------------------*/
void  handle_shootback(int cfrm)
{
        static int      frm_cnt, sfrm, sbpat;
        static uint     xp,yp;
        static float    xz,yz;
        static Rect     flash;

if ( sb_flag == TRUE) {
             frm_cnt = cfrm - sfrm;
             if ( frm_cnt >= 3) {
                  outp( DAS20_OUT, 0x07);       /* turn off ireds */
                  sb_flag = FALSE;
             }
        }
```

```
        else {
            if ( cfrm >= sb[sb_cnt].frm ) {
                if ( alive[ sb[sb_cnt].trg ] == TRUE) {
                    sb_flag = TRUE;
                    sfrm = cfrm;
                    sbpat = sb[sb_cnt].cde;
                    if ( sbpat == 7) {
                        SetRect(&flash,0,0,90,90);
                        play_note(GRENADE,0x64);
                        VIEW_PAGE_1;
                        close_target_windows();
                        ACTIVE_PAGE_1;
                        vsync_delay(110);
                        xp = 0; yp = 0; xz = 10.0; yz = 10.0;
                        vsync_delay(45);
                        SetPanZoom(xp,yp,FloatToFixed(xz),
                                        FloatToFixed(yz));
                        SetForeColor(RED);
                        PaintRect(flash);
                        outp( DAS20_OUT, ~(sbpat));
                        vsync_delay(180);
                        SetForeColor(BLACK);
                        PaintRect(screen);
                        vsync_delay(30);
                        xp = 0; yp = 0; xz = 1.0; yz = 1.0;
                        SetPanZoom(xp,yp,FloatToFixed(xz),
                                        FloatToFixed(yz));
                    }
                    else {
                        play_note(SB_GUN,0x30);
                        outp( DAS20_OUT, ~(sbpat));
                    }
                }
                sb_cnt++;
            }
        }
    }
}

/*---------------------------------------------------------------------------*/
void  handle_rifle(int gun, int cfrm)
{
    static  Point   test;
    static  int     xs, ys, stat, i;

stat = 0;
    xs = 0;
    ys = 0;
    if ( rstat[gun] > 2) {                          /* ON SCREEN? */
        gunpos(gun, &xs, &ys);
        stat = 1;
        if ( rstat[gun] > 3 ) {
            if ( rstat[gun] == 4) stat = 2;     /* SEMI SHOT FIRED*/
            else stat = 3;                      /* AUTO SHOT FIRED*/
            test.x = xs;
            test.y = ys;
            for (i = 0; i < targs; i++) {
                if ( alive[i] == TRUE) {
                    if ( PtInRect(test, hit_rect[cfrm][i])) {
                        hits[gun]++;
                        stat = 4 + i;       /* TARGET HIT */
                        play_note(HIT,0x7E);
                        alive[i] = FALSE;
                        InvertRect(trg_window[i]);
                    }
                }
            }
        }
    }
    guns[cfrm].x[gun] = xs;                         /* STORE REPLAY DATA */
```

```
        guns[cfrm].y[gun] = ys;
        guns[cfrm].s[gun] = stat;
}

/*------------------------------------------------------------------*/
int any_target_alive(void)
{
        int     test, j;

test = FALSE;
        for (j = 0; j < targs; j++) {
            if ( alive[j] == TRUE) test = TRUE;
        }
        return test;
}

/*------------------------------------------------------------------*/
int run_scenario( char *scenname)
{
        Point           test;
        int             i, j, lfm, cfrm;
        long            vcnt, vnum, cfd;

hits[1] = 0;
        hits[2] = 0;
        printf("load scenario file\n");
        load_scenario( scenname);               /* LOAD SCENARIO FILE */
        printf("%d\n", stillframe);
        printf("%d\n", numfiles);
        for (i = 0; i < numfiles; i++)  printf("%s\n", cfiles[i]);
        get_background( stillframe);            /* STORE BACKGROUND   */
        VIEW_PAGE_1;
        open_replay_write();
        vsync_delay(180);                       /* 3 second delay */ for ( i = 0; i < numfiles; i++ ) {
            load_clip( cfiles[i]);
            vdisk_int_search(startframe);
            vsync_delay(90);
            ACTIVE_PAGE_2;
            vnum = (long) (frames * 2);
            open_target_windows();
            VIEW_PAGE_2;
            sync_play( &vcnt);
            sb_flag = FALSE;
            sb_cnt = 0;
            while(1) {
                cfd = VBLCount() - vcnt;
                cfrm = (int) cfd >> 1;
                if ( cfd >= vnum) break;
                if ( cfrm != lfm ) {
                    handle_rifle( 1, cfrm);
                    handle_rifle( 2, cfrm);
                    handle_shootback( cfrm);
                    if ( !any_target_alive() ) break;
                    lfm = cfrm;
                }
            }
            VIEW_PAGE_1;
            vdisk_cmd(CANCEL);
            close_target_windows();
            outp( DAS20_OUT, 0x07);             /* turn off ireds */
            save_replay_data(frames);
        }
        close_replay();
        ACTIVE_PAGE_1;
        SetForeColor(BLACK);
        PaintRect(screen);
}
```

```c
/*----------------------------------------------------------------------*/
void print_results( void )
{
        char    text[70];

load_font(1);
        SetForeColor(WHITE);
        SetBackColor(BLACK);
        EraseRect(screen);
        _clearscreen(_GCLEARSCREEN);

sprintf(text, "SCENARIO'S RESULTS");
        MoveTo(300,100);
        DrawText(text,0,strlen(text));

sprintf(text, "Rifle 1");
        MoveTo(200,150);
        DrawText(text,0,strlen(text));
        sprintf(text, "number of rounds fired => %d", trnds[1] );
        MoveTo(200,175);
        DrawText(text,0,strlen(text));
        sprintf(text, "number of targets hit  => %d", hits[1] );
        MoveTo(200,200);
        DrawText(text,0,strlen(text));

sprintf(text, "Rifle 2");
        MoveTo(200,250);
        DrawText(text,0,strlen(text));
        sprintf(text, "number of rounds fired => %d", trnds[2] );
        MoveTo(200,275);
        DrawText(text,0,strlen(text));
        sprintf(text, "number of targets hit  => %d", hits[2] );
        MoveTo(200,300);
        DrawText(text,0,strlen(text));

printf("hit any key to continue\n");
        text[0] = getch();
}

/*----------------------------------------------------------------------*/
main (void)
{
        char    keyed;
        char    scenario[12];
        char    text[40];
        FILE    *temp;

system("f:");
        initialize_vista();
        SetRect (&screen, 0, 0, 756, 486);
        SetForeColor(AMBER);
        SetBackColor(VIDEO);
        EraseRect(screen);
        setup_midi();
        setup_serial_port();
        vdisk_cmd(ONLINE);
        vdisk_cmd(STEPFWD);
        _clearscreen(_GCLEARSCREEN);
        start_tracker();
        zero_gun(1);
        zero_gun(2);
        stop_tracker();

while (1) {
                load_font(4);
                SetForeColor(YELLOW);
                SetBackColor(BLACK);
                EraseRect(screen);
                SetBackColor(VIDEO);
                sprintf(text,"Weapons Team Engagement Trainer");
                MoveTo(100,100);
```

```
DrawText(text,0,strlen(text));
sprintf(text,"Testbed");
MoveTo(310,180);
DrawText(text,0,strlen(text));
load_font(2);
MoveTo(210,250);
sprintf(text, "Naval Training System Center");
DrawText(text,0,strlen(text));
MoveTo(230,290);
sprintf(text, "          Orlando, FL          ");
DrawText(text,0,strlen(text));

load_font(1);
MoveTo(240,365);
sprintf(text, "Al Marshall   (407) 380-4653  DTCN: 960-4653");
DrawText(text,0,strlen(text));
MoveTo(240,390);
sprintf(text, "Bob McCormack              X4582");
DrawText(text,0,strlen(text));
MoveTo(240,415);
sprintf(text, "Ed Purvis                  X4584");
DrawText(text,0,strlen(text));
MoveTo(240,440);
sprintf(text, "Ron Wolff                  X4583");
DrawText(text,0,strlen(text));
load_font(4);

_clearscreen(_GCLEARSCREEN);
pr...
printf("2. REPLAY SCENARIO \n");
printf("3. ZERO WEAPON 1 \n");

printf("4. ZERO WEAPON 2 \n");
printf("ESC - QUIT\n\n\n\n\n\n");

while ( kbhit() ) {              /* flush keyboard */
     keyed = getch();
} keyed = getch();
if ( keyed == '1') {
     _clearscreen(_GCLEARSCREEN);
     system("type test.txt");
     file_input:
     _settextposition(15,1);
     printf("enter scenario filename\n");
     printf("                         \r");
     scanf("%s", scenario);
     if ( (temp = fopen( scenario, "r")) == NULL) {
          goto file_input;
     }
     fclose(temp);
     start_tracker();
     play();
     run_scenario(scenario);
     stop();
     stop_tracker();
     print_results();
     keyed = 0;
}
if ( keyed == '2' ) {
     ACTIVE_PAGE_2;
     VIEW_PAGE_2;
     show_replay(scenario);
     ACTIVE_PAGE_1;
     VIEW_PAGE_1;
     print_results();
     keyed = 0;
}
if ( keyed == '3' ) {
```

```
                    start_tracker();
                    zero_gun(1);
                    stop_tracker();
                    keyed = 0;
                } if ( keyed == '4' ) {
                    start_tracker();
                    zero_gun(2);
                    stop_tracker();
                    keyed = 0;
                }
                if ( keyed == ESC ) break;
        }
        vdisk_cmd(OFFLINE);
        SetForeColor(BLACK);
        PaintRect(screen);
        stop_tracker();
        _exit(0);
}
/*--------------------------------------------------------------------------*/
/* GLOBAL.H include file contain global data declarations.                  */
/* Module TEAM2.C (main module) includes this file with the word "GLOBAL"   */
/* not defined and the word INIT defined, this initialized the data         */
/* All others include with GLOBAL defined as EXTERN and INIT not defined    */

GLOBAL  Rect    screen;
GLOBAL  int     hits[5];
GLOBAL  int     alive[4];

/*********************** CLIP FILE DATA ********************************/
GLOBAL  int     stillframe;             /* still frame of scenerio      */
GLOBAL  int     startframe;             /* start frame                  */
GLOBAL  int     frames;                 /* number of frames             */
GLOBAL  int     targs;                  /* number of targets            */
GLOBAL  Rect    trg_window[4];          /* target windows               */
GLOBAL  Rect    hit_rect[1000][4];      /* frame / target hit windows   */
GLOBAL  int     sb_num;                 /* shootback occurances         */
GLOBAL  int     sb_cnt;                 /* shootback count              */
GLOBAL  int     sb_flag;                /* shootback flag               */

GLOBAL  struct sbdata {
        int     frm;                    /* shootback frame offset       */
        int     trg;                    /* target shooting back         */
        int     cde;                    /* IRED pattern                 */
} sb[10];

GLOBAL  int     numfiles;
GLOBAL  char    *cfiles[20]
#ifdef  INIT                            /* INITIALIZE once */
        =       { {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"},
                  {"filename.ext"}, {"filename.ext"}}
#endif
;                                       /* end of statement */

/*********************** REPLAY STORAGE DATA ***************************/
GLOBAL  struct rdata {
        int     x[5];
        int     y[5];
        int     s[5];
} guns[1000];
```

```c
/* PIO12-1.H */

/****************** reference PIO12.DOC ******************************/
#define         PORT_1A         0x300
#define         PORT_1B         0x301
#define         PORT_1C         0x302
#define         CNTRL_1         0x303
#define         MODE_1          0x90            /* PORT A input mode    */
                                                /* PORT B output mode   */
                                                /* PORT C output mode   */ define         SETUP_PIO12_1   outp( CNTRL_1, MODE_1)
define         MAGPAT          0x01
#define         SELPAT          0x02
define         TRGPAT          0x04 define         IRED_ENABLE     outp( PORT_1B, 0x01)
define         IRED_DISABLE    outp( PORT_1B, 0x00)

#define         IRED1_msb       outp( CNTRL_1, 0x0E)
#define         IRED1_lsb       outp( CNTRL_1, 0x0C)
#define         IRED2_msb       outp( CNTRL_1, 0x0E)
#define         IRED2_lsb       outp( CNTRL_1, 0x0D)
#define         IRED3_msb       outp( CNTRL_1, 0x0F)
#define         IRED3_lsb       outp( CNTRL_1, 0x0C)
#define         IRED4_msb       outp( CNTRL_1, 0x0F)
#define         IRED4_lsb       outp( CNTRL_1, 0x0D)

#define         DATA1_msb       outp( CNTRL_1, 0x0A)
#define         DATA1_lsb       outp( CNTRL_1, 0x08)
#define         DATA2_msb       outp( CNTRL_1, 0x0A)
#define         DATA2_lsb       outp( CNTRL_1, 0x09)
#define         DATA3_msb       outp( CNTRL_1, 0x0B)
#define         DATA3_lsb       outp( CNTRL_1, 0x08)
#define         DATA4_msb       outp( CNTRL_1, 0x0B)
#define         DATA4_lsb       outp( CNTRL_1, 0x09)

#define         MAGSET1_ON      outp( CNTRL_1, 0x00)
#define         MAGSET1_OFF     outp( CNTRL_1, 0x01)
#define         MAGSET2_ON      outp( CNTRL_1, 0x02)
#define         MAGSET2_OFF     outp( CNTRL_1, 0x03)
#define         MAGSET3_ON      outp( CNTRL_1, 0x04)
#define         MAGSET3_OFF     outp( CNTRL_1, 0x05)
#define         MAGSET4_ON      outp( CNTRL_1, 0x06)
#define         MAGSET4_OFF     outp( CNTRL_1, 0x07)

/* RIFLE interface box connections
inputs  trigger         PA2             selector        PA1
        magazine        PA0 outputs IRED msb        PC7             IRED lsb        PC6
        DATA msb        PC5             DATA lsb        PC4
        mag4reset       PC3             mag3reset       PC2
        mag2reset       PC1             mag1reset       PC0

IRED ENABLE     PB0 (active high)
*/

/* LITERAL.H */ define         _fastcall
define         TRUE    1
#define         FALSE   0
#define         ESC     27
define         SPACE   0x20 define         uint    unsigned int
define         ulong   unsigned long define         LBMICE  0x01
define         RBMICE  0x02
#define         PULL    1
```

```
define         RELEASE 0 define         WHITE       0x7fffL
define         CYAN        0x3FFL
#define         YELLOW      0x7FE0L
#define         BLACK       0x0L
#define         RED         0x7c00L
#define         VIDEO       0x8000L
#define         GREEN       0x3E0L
#define         BLUE        0x1FL
define         AMBER       0x4200L define         GUN1            65
define         GUN2            72
#define         SB_GUN          74
#define         GRENADE         47
#define         EXP2            84
define         HIT             41 define         VIEW_PAGE_1     SetPanPos(0,0)
define         ACTIVE_PAGE_1   MovePortTo(0,0)
#define         VIEW_PAGE_2     SetPanPos(0,486)
#define         ACTIVE_PAGE_2   MovePortTo(0,486)

#define         DAS20_OUT       0x32c

/* ---------------------------------------------------------------------*/
/* VISTA.H */ extern  void initialize_vista();
extern      void load_font(int font_number);

/* ---------------------------------------------------------------------*/
/*                                                                      */
/* MODULE - VISTA.c                                                     */
/*                                                                      */
/*  This module contains functions which initialize the VISTA video/    */
/*  graphics adapter.                                                   */
/* ---------------------------------------------------------------------*/ include <stdio.h>
include <stdlib.h>
#include <conio.h>
#include <dos.h>
include <stage.h> include "include\literal.h"

/*----------------------------------------------------------------------*/
static  char            *font[6] = { {"c:\\vista\\stage\\fonts\\roman11.fft"},
                                     {"c:\\vista\\stage\\fonts\\roman18.fft"},
                                     {"c:\\vista\\stage\\fonts\\roman26.fft"},
                                     {"c:\\vista\\stage\\fonts\\roman33.fft"},
                                     {"c:\\vista\\stage\\fonts\\roman38.fft"},
                                     {"c:\\vista\\stage\\fonts\\roman52.fft"} };

/* ---------------------------------------------------------------------*/
/*                                                                      */
/* MODULE - VISTA.c                                                     */
/* FUNCTION - load_font (int number)                                    */
/*                                                                      */
/*  This function loads the bit mapped font specified by the character  */
/*  string  font[number].                                               */
/*----------------------------------------------------------------------*/ void load_font(int number)
{
        FontRecHdl      sysfont;
```

```
        sysfont = LoadTextFont(font[number]);
        SetTextFont(sysfont);
}
/*---------------------------------------------------------------------------*/
/*                                                                           */
/* MODULE - VISTA.c                                                          */
/* FUNCTION - initialize vista(void)                                         */
/*                                                                           */
/*  This function initializes the VISTA video/graphics adapter.              */
/*                                                                           */
/*---------------------------------------------------------------------------*/ void initialize_vista()
{
        ImageHdl        image1;
        CursorHdl       gunsight;
        CursorHdl       arrow;
        Rect            screen;

if (StageFlexInit(756,486,              /* display resolution */
                    756,972,                    /* addressable resolution */
                    16,                         /* pixel size, other default */
                    0,                          /* genlock on */
                    -1,                         /* interlaced */
                    -1,                         /* ntsc */
                    -1.0,                       /* gamma in */
                    -1.0,                       /* gamma out */
                    -1,-1,-1,-1,-1,-1,-1)) {

SetPenNormal();
                SetDisplayMode(dispModeOverlayIndep);
                EnableGenlock();
                load_font(2);
                OpenPntDev (microsoftMouse);
                InitCursor();
                SetCursorTracking(true);
                gunsight = NewBuiltinCursorForPort( gunsightCursorType, 21,20 );
                SetCursor(gunsight);
                SetRect(&screen, 0, 0, 756, 486);
                SetForeColor(RED);
                SetBackColor(VIDEO);
                EraseRect(screen);
        }
        else {
                printf("STAGE driver not loaded\n");
                exit(0);
        }
}

/*---------------------------------------------------------------------------*/
/* DAS20.H include file for modue DAS20.H                                    */ define DAS20_OP0_HIGH   outp(0x32c,1)
define DAS20_OP0_LOW    outp(0x32c,0)

extern  uint    xa[10], xb[10], ya[10], yb[10];
extern  uint    xasum, xbsum, yasum, ybsum;
extern  int     trnds[5], rstat[5], tstat[5], mag[5], acnt[5],aflag[5];
extern  uint    _far    *psd;
extern  uint    psd_seg;
extern  uint    intrcnt;
extern  int     portdata;

extern void setup_das20 (void);
extern void reset_rifles(void);

/*---------------------------------------------------------------------------*/
/*  MODULE - DAS20.                                                          */
/*                                                                           */
/*  This module contains initialization of the das20 A/D board and tracker   */
```

```c
/* interface control.  An interrupt generated by a periodic interval timer */
/* on the das8 board is used to control the tracking process.              */
/*                                                                         */
/*-------------------------------------------------------------------------*/ include <stdio.h>
include <dos.h> include "include\literal.h"
include "include\das8.h"
#include "include\pio12-1.h"
#include "include\nmidi.h"

/*-------------------------------------------------------------------------*/
extern int DAS20 (int mode, int *dio);
extern int _far *ALLOC(int datasize);

/*-------------------------------------------------------------------------*/
uint    xa[10], xb[10], ya[10], yb[10];
uint    xasum, xbsum, yasum, ybsum;
int     trnds[5], rstat[5], tstat[5], mag[5], acnt[5], aflag[5];
uint    _far    *psd;
uint    psd_seg;
uint    intrcnt;
int     portdata;

static  int     mode = 0;
static  int     dio [10] = {0,0,0,0,0,0,0,0,0,0};
static  int     flag = 0;

/*-------------------------------------------------------------------------*/
/* MODULE - DAS20.                                                         */
/* FUNCTION - reset_rifles(void)                                           */
/*                                                                         */
/* This function resets rifle data and control flags.  The magazine reload */
/* indicator for each weapon is reset.                                     */
/*                                                                         */
/*-------------------------------------------------------------------------*/ void reset_rifles(void)
{
        int     i;

MAGSET1_ON;
        MAGSET1_OFF;
        MAGSET2_ON;
        MAGSET2_OFF;
        MAGSET3_ON;
        MAGSET3_OFF;
        MAGSET4_ON;
        MAGSET4_OFF;
        for (i = 0; i < 5; i++ ) {
                mag[i] = 30;
                trnds[i] = 0;
                tstat[i] = FALSE;
                acnt[i] = 0;
                aflag[i] = FALSE;
                rstat[i] = 0;
        }
}

/*-------------------------------------------------------------------------*/
/* MODULE - DAS20.                                                         */
/* FUNCTION - checkgun(int i )                                             */
/*                                                                         */
/* This function checks the current status on the rifle i's switches and   */
/* status.  Control flags are set accordingly.                             */
/*                                                                         */
/*-------------------------------------------------------------------------*/
static void _fastcall checkgun(int i)
```

```c
{
    if ( mag[i] > 0 ) {
        if ( (portdata & TRGPAT) == 0) {
            if ( portdata & SELPAT ) {
                if ( aflag[i] ) {
                    if ( acnt[i] == 3 ) {
                        if ( i == 1 ) play_note(GUN1,0x64);
                        else play_note (GUN2, 0x64);
                        mag[i]--;
                        trnds[i]++;
                        rstat[i] = rstat[i] + 2;
                        acnt[i] = 0;
                    }
                    acnt[i]++;
                }
                else {
                    acnt[i] = 0;
                    aflag[i] = TRUE;
                    if ( i == 1 ) play_note(GUN1, 0x64);
                    else play_note(GUN2, 0x64);
                    mag[i]--;
                    trnds[i]++;
                    rstat[i] = rstat[i] + 2;
                }
            }
            else {
                if ( tstat[i] == FALSE ) {
                    if ( i == 1 ) play_note(GUN1, 0x64);
                    else play_note(GUN2, 0x64);
                    trnds[i]++;
                    mag[i]--;
                    rstat[i] = rstat[i] + 1;
                }
            }
            tstat[i] = TRUE;
        }
        else {
            tstat[i] = FALSE;
            aflag[i] = FALSE;
        }
    }
}

/*----------------------------------------------------------------*/
/* MODULE - DAS20.                                                */
/* FUNCTION - setup_dma(void)                                     */
/*                                                                */
/* This function sets up the das20 board for the next block scan dma */
/* transfer of the trackers four analog channels.                 */
/*                                                                */
/*----------------------------------------------------------------*/
static void _fastcall setup_dma(void)
{
    mode = 6;                           /* setup das20 conversion */
    dio[0] = 32;                        /* gated by one shot      */
    dio[1] = psd_seg;
    dio[2] = 1;
    dio[3] = 1;
    flag = DAS20 (mode, dio);           /* setup next conversion  */
}

/*----------------------------------------------------------------*/
/* MODULE - DAS20.                                                */
/* FUNCTION - avg_dmadata( int i )                                */
/*                                                                */
/* This function averages the block scanned dma data and stores the */
/* averages for the rifle selected ( i ).                         */
/*                                                                */
/*----------------------------------------------------------------*/
static void _fastcall avg_dmadata( int n)
{
    int    i,j;
```

```
        xasum = 0;
        xbsum = 0;
        yasum = 0;
        ybsum = 0;
        for (i = 0; i < 32; i = i + 4) {
                xasum = xasum + ( psd[i+0] >> 4 );
                xbsum = xbsum + ( psd[i+1] >> 4 );
                yasum = yasum + ( psd[i+2] >> 4 );
                ybsum = ybsum + ( psd[i+3] >> 4 );
        }
        xa[n] = xasum >> 3;
        xb[n] = xbsum >> 3;
        ya[n] = yasum >> 3;
        yb[n] = ybsum >> 3;
}

/*----------------------------------------------------------------------------*/
/*  MODULE - DAS20.                                                           */
/*  FUNCTION - track (void )                                                  */
/*                                                                            */
/*  This function is an interrupt procedure which controls the overall        */
/*  tracker interace control and data collection.  Sequenctially each         */
/*  weapon is sampled continuously based on the current cycle number.         */
/*----------------------------------------------------------------------------*/ static void interrupt _far track (void)
{
        D8_OP4LOW;                              /* retrigger das8 oneshot */
        D8_OP4HIGH;
        intrcnt++;                              /* gun selector */
        if (intrcnt == 11) intrcnt = 0;

switch (intrcnt) {
                case 0:                         /* ON IRED1 */
                        IRED_ENABLE;
                        IRED1_msb;
                        IRED1_lsb;
                        setup_dma();
                        break;

case 1: IRED_DISABLE;                   /* READ GUN1           */
                        rstat[1] = 0;                   /* SET TO OFF SCREEN   */
                        if (((psd[0]>>4)+(psd[1]>>4))>0x200) {
                                avg_dmadata(1);         /* AVG DATA            */
                                rstat[1] = 3;           /* SET TO ON SCREEN    */
                        }
                        DATA1_msb;                      /* SELECT GUN 1 DATA   */
                        DATA1_lsb;
                        portdata = inp( PORT_1A);       /* READ GUN 1 DATA     */
                        if ( portdata & MAGPAT ) {      /* NEW MAGAZINE?       */
                                mag[1] = 30;
                                MAGSET4_ON;
                                MAGSET4_OFF;
                        }
                        checkgun(1);
                        break;

case 2: IRED_ENABLE;            /* ON IRED2 */
                        IRED2_msb;
                        IRED2_lsb;
                        setup_dma();
                        break;

case 3: IRED_DISABLE;                   /* READ GUN2           */
                        rstat[2] = 0;                   /* SET TO OFF SCREEN   */
                        if (((psd[0]>>4)+(psd[1]>>4))>0x200) {
                                avg_dmadata(2);         /* AVG DATA            */
                                rstat[2] = 3;           /* SET TO ON SCREEN    */
                        }
                        DATA2_msb;                      /* SELECT GUN 2 DATA   */
                        DATA2_lsb;
                        portdata = inp( PORT_1A);       /* READ GUN 2 DATA     */
```

```c
                    if ( portdata & MAGPAT ) {      /* NEW MAGAZINE?           */
                         mag[2] = 30;
                         MAGSET2_ON;
                         MAGSET2_OFF;
                    }
                    checkgun(2);
                    break;
               default:
                    break;
          }

D8_OP3HIGH;
     outp (0x20, 0x20);                    /* send End-of-Interrupt */
     return;
}

/*---------------------------------------------------------------------------*/
/*   MODULE - DAS20.                                                         */
/*   FUNCTION - setup_das20 (void)                                           */
/*                                                                           */
/*   This function initializes the das20 board.                              */
/*                                                                           */
/*                                                                           */
/*---------------------------------------------------------------------------*/ void setup_das20 (void)
{

/* INITIALIZE DAS20, BASE ADDR = 0x320, INTR LEVEL = 7, DMA CHANNEL = 3 */
     mode = 0; dio[0] = 0x320; dio[1] = 7; dio[2] = 3;
     flag = DAS20 (mode, dio);

/* ALLOCATE DMA BUFFER FOR TRACKER DATA  ( 2000 WORDS )                    */
     psd = ALLOC(2000);
     if (psd == NULL) {
          printf ("\nCannot allocate dma buffer\n");
          exit (0);
     }
     psd_seg = segadr (psd);

/* LOAD SCAN BUFFER TO READ CHANNELS 0 , 1,  2 , 3                         */
/* UNIPOLAR inputs 0 - 10 V     ( dio[1] = 2 )                             */
     mode = 1; dio[0] = 0; dio[1] = 2; dio[2] = 2;
     flag = DAS20 (mode, dio);
     mode = 1; dio[0] = 1; dio[1] = 2; dio[2] = 0;
     flag = DAS20 (mode, dio);
     mode = 1; dio[0] = 2; dio[1] = 2; dio[2] = 0;
     flag = DAS20 (mode, dio);
     mode = 1; dio[0] = 3; dio[1] = 2; dio[2] = 1;
     flag = DAS20 (mode, dio);

/* SETUP A/D PACER CLOCK TO 50 KHz                                         */
     mode = 24; dio[0] = 10; dio[1] = 10;
     flag = DAS20 (mode, dio);

/* SET INTERRUPT VECTOR FOR INTERVAL TIMER                                 */
     _dos_setvect (0x0d, track);
}

/* -------------------------------------------------------------------------*/
/* DAS8.H include file for module DAS8.C                                    */ define     D8_BASE        0x310
define     D8_CTRL        D8_BASE+2
#define     D8_STAT        D8_BASE+2
#define     CNTR0          D8_BASE+4
#define     CNTR1          D8_BASE+5
#define     CNTR2          D8_BASE+6
#define     COUNT_CTRL     D8_BASE+7
```

```
#define         ENABLE_D8INTR      outp(D8_CTRL, 0x08)     /* INTE enabled  */
#define         DISABLE_D8INTR     outp(D8_CTRL, 0x00)     /* INTE disabled */
#define         D8_OP4LOW          outp(D8_CTRL, 0x08)     /* INTE enabled  */
#define         D8_OP4HIGH         outp(D8_CTRL, 0x88)     /* INTE enabled  */
#define         D8_OP3HIGH         outp(D8_CTRL, 0xC8)     /* INTR enabled  */
define         STOP_D8TIMERS      outp(COUNT_CTRL, 0xB0)  /* STOP counter 2 */ extern void setup_d8timers (float intr_msec, float oneshot_msec);

/*------------------------------------------------------------------------*/
/* MODULE - DAS8.c                                                        */
/* This module contains initialization of the das8 interface board.       */
/* The programmable interval timer of this board is used to generate      */
/* periodic interupts and timing signals which control the tracking system.*/
/*                                                                        */
/*------------------------------------------------------------------------*/ include <stdio.h>
include <conio.h> define         D8_BASE            0x310
define         D8_CTRL            D8_BASE+2
#define         D8_STAT            D8_BASE+2
#define         CNTR0              D8_BASE+4
#define         CNTR1              D8_BASE+5
#define         CNTR2              D8_BASE+6
#define         COUNT_CTRL         D8_BASE+7

/*------------------------------------------------------------------------*/
/* MODULE - DAS8.c                                                        */
/* FUNCTION - setup_d8timers ( float intr_msec, float oneshot_msec)       */
/*                                                                        */
/* This function setup the programmable interval timer to generate        */
/* an peridic interrupt of (intr_msec) msec.  A progammable oneshot output */
/* (delayed by oneshot_msec msec) gates the das20 block scan mode.        */
/*------------------------------------------------------------------------*/ void setup_d8timers ( float  intr_msec, float  oneshot_msec)
{
        int     counter0, counter1;

counter1 = (int) ( 20 * intr_msec);
        counter0 = (int) ( 20 * oneshot_msec);
/* counter 2, input clock - buss clock / 2 = 4.00 MHz                  */
/* mode - software triggered strobe                                    */
/* count of 200 loaded producing 20 KHz output                         */
        outp (COUNT_CTRL, 0xb4);
        outp (CNTR2, 0xc8);
        outp (CNTR2, 0x00);
/* counter 1, input clock - counter 2 output 20 KHz                    */
/* mode - software triggered stobe                                     */
/* output connected to das8 interrupt input for periodic interrupt     */
        outp (COUNT_CTRL, 0x74);
        outp (CNTR1, (counter1 & 0xff));
        outp (CNTR1, (counter1 & 0xff00) >> 8);
/* counter 0, input clock - counter 1 output 20 KHz                    */
/* mode - programmable oneshot                                         */
/* output used to gate das20 A/D conversions under DMA                 */
/* das8 OP4 connected to counter 0 gate to retrigger oneshot           */
        outp (COUNT_CTRL, 0x32);
        outp (CNTR0, (counter0 & 0xff));
        outp (CNTR0, (counter0 & 0xff00) >> 8);
}

/* TRACK.H */ extern  int     xsum[5], xdif[5];       /* sum of psd readings     */
extern  int     ysum[5], ydif[5];       /* difference of psd readings */
extern  float   xdiv[5], ydiv[5];       /* difference / sum        */
extern  float   xadj[5], yadj[5];       /* x,y scale factors       */
extern  float   xzhi[5], yzhi[5];       /* upper zero x,y readings */
extern  float   xzlo[5], yzlo[5];       /* lower zero x,y readings */
```

```c
extern  void start_tracker (void);
extern  void stop_tracker (void);
extern  void _fastcall calcxydiv (int i);
extern  void _fastcall gunpos(int i, int *xs, int *ys);
extern  void wait_trig(int i, int state);
extern  void zero_gun(int i);

#include <stdio.h>
include <conio.h>
#include <graph.h>
#include <dos.h>
include <stage.h> include "include\literal.h"
include "include\pio12-1.h"
#include "include\das8.h"
#include "include\das20.h"

/*---------------------------------------------------------------------------*/
int     xsum[5], xdif[5];           /* sum of psd readings         */
int     ysum[5], ydif[5];           /* difference of psd readings  */
float   xdiv[5], ydiv[5];           /* difference / sum            */
float   xadj[5], yadj[5];           /* x,y scale factors           */
float   xzhi[5], yzhi[5];           /* upper zero x,y readings     */
float   xzlo[5], yzlo[5];           /* lower zero x,y readings     */
int     xs[5], ys[5];

/*---------------------------------------------------------------------------*/
void start_tracker (void)
{
    SETUP_PIO12_1;
    setup_das20();
    reset_rifles();
    setup_d8timers(3.0, 2.0);
    ENABLE_D8INTR;
    outp (0x21, (inp (0x21) & 0xdf));
}

/*---------------------------------------------------------------------------*/
void stop_tracker (void)
{
    int     j,k;

STOP_D8TIMERS;
    DISABLE_D8INTR;
    outp (0x21, (inp (0x21) | 0x20));       /* disable interrupt   */
    for (j = -30000; j < 30000; j++);
    outp (0x21, (inp (0x21) | 0x20));       /* disable interrupt   */
    IRED_DISABLE;                           /* TURN OFF GUN BOX    */
}

/*---------------------------------------------------------------------------*/
void _fastcall calcxydiv (int i)
{
    xsum[i] = xa[i] + xb[i];
    xdif[i] = xb[i] - xa[i];
    ysum[i] = ya[i] + yb[i];
    ydif[i] = yb[i] - ya[i];
    xdiv[i] = ( (float) xdif[i] / (float) xsum[i] );
    ydiv[i] = ( (float) ydif[i] / (float) ysum[i] );
}

/*---------------------------------------------------------------------------*/
void _fastcall gunpos(int i, int *xs, int *ys)
{
    calcxydiv ( i );
    *xs = (int) ((xdiv[i] - xzhi[i]) / xadj[i]) + 250;
    *ys = (int) ((ydiv[i] - yzhi[i]) / yadj[i]) + 225;
```

```c
}
/*------------------------------------------------------------------*/
extern void wait_trig(int i, int state)
{
        int     trig;

while (1) {
                if ( kbhit() ) {
                        if ( getch() == ESC) {
                                stop_tracker();
                                exit(0);
                        }
                }
                trig = tstat[i];
                if ( trig == state) break;
        }
}

/*------------------------------------------------------------------*/
void zero_gun(int i)
{
        char    line1[40];
        char    line2[40];
        Rect    r1,r2,screen;

load_font(2);
        sprintf(line1, "Aim at mark, squeeze trigger");
        sprintf(line2, "GUN %d ZERO",i);

SetRect(&r1,249,224,251,226);
        SetRect(&r2,524,374,526,376);
        SetRect(&screen,0,0,755,485);
        SetBackColor(BLACK);
        SetForeColor(WHITE);
        EraseRect(screen);
        MoveTo(300,60);
        DrawText(line2,0,strlen(line2));

PaintRect(r1);                          /* upper zero mark */
        MoveTo(260,170);
        DrawText(line1,0,strlen(line1));
        wait_trig( i, PULL);
        calcxydiv( i );
        xzhi[i] = xdiv[i];
        yzhi[i] = ydiv[i];
        EraseRect(screen);
        printf("upper mark x,y    %.5f, %.5f\n", xdiv[i], ydiv[i]);
        wait_trig( i, RELEASE);

PaintRect(r2);                          /* lower zero mark */
        MoveTo(100,380);
        DrawText(line1,0,strlen(line1));
        wait_trig( i, PULL);
        calcxydiv( i );
        xzlo[i] = xdiv[i];
        yzlo[i] = ydiv[i];
        EraseRect(screen);
        printf("lower mark x,y    %.5f, %.5f\n", xdiv[i], ydiv[i]);
        wait_trig( i, RELEASE);

xadj[i] = ( xzlo[i] - xzhi[i]) / 275.0;
        yadj[i] = ( yzlo[i] - yzhi[i]) / 150.0;
        printf("adjustment factors    %.5f, %.5f \n\n", xadj[i], yadj[i] );

if ( ( xadj[i] == 0.0 ) || ( yadj[i] == 0.0 ) ) {
                printf("\n\nGUN %d ZERO FAILURE\n\n", i);
                stop_tracker();
                exit(0);
        }
}
```

```c
/*---------------------------------------------------------------------------*/
/*  MODULE - LOAD1.C                                                         */
/*  This module contains procedures which load scenario information from     */
/*  a file into global data structures.                                      */
/*                                                                           */
/*---------------------------------------------------------------------------*/ pragma title("LOAD1.C")
pragma linesize(132)

#include <stdio.h>
include <stage.h> include "include\literal.h"

undef      INIT
#undef      GLOBAL
#define     GLOBAL    extern              /* external global data */
#include "global.h"

static  FILE    *clipfile;
static  FILE    *scenfile;

/*---------------------------------------------------------------------------*/
/*  MODULE - LOAD1.c                                                         */
/*  FUNCTION - load_clip ( float intr_msec, float oneshot_msec)              */
/*                                                                           */
/*  This function setup the programmable interval timer to generate          */
/*  an peridic interrupt of (intr_msec) msec. A progammable oneshot output   */
/*  (delayed by oneshot_msec msec) gates the das20 block scan mode.          */
/*---------------------------------------------------------------------------*/ int load_clip ( char *clipname)
{
        char    fname[20];
        int     i,j,dumpstatus;

sprintf(fname,"f:%s",clipname);
        if ( ( clipfile = fopen(fname,"rb")) == NULL) {
                printf("can't open\n");
                return FALSE;
        }

/* READ FILE HEADER INFORMATION */
        fread( ( char *) &startframe, sizeof(int), 1, clipfile);
        fread( ( char *) &stillframe, sizeof(int), 1, clipfile);
        fread( ( char *) &frames, sizeof(int), 1, clipfile);
        fread( ( char *) &targs, sizeof(int), 1, clipfile);

/* READ TARGET WINDOWS */
        for ( j = 0; j < targs; j++) {
                fread( ( char *) &trg_window[j], sizeof(Rect), 1, clipfile);
        }

/* READ TARGET HIT WINDOWS */
        for ( i = 0; i < frames; i++) {
                for ( j = 0; j < targs; j++) {
                        fread( ( char *) &hit_rect[i][j], sizeof(Rect), 1, clipfile);
                        fread( ( char *) &dumpstatus, sizeof(int), 1, clipfile);
                }
        }

/* READ NUMBER OF SHOOTBACK OCCURANCES */
        dumpstatus = fread ( (char *) &sb_num, 2, 1, clipfile);
        if ( dumpstatus > 0) {
                for (i = 0; i < sb_num; i++) {
                        fread ( (char *) &sb[i].frm, sizeof(int), 1, clipfile);
                        fread ( (char *) &sb[i].trg, sizeof(int), 1, clipfile);
                        fread ( (char *) &sb[i].cde, sizeof(int), 1, clipfile);
                }
                for (i = sb_num; i < 10; i++) {
                        sb[i].frm = 20000;      /* frame never tested */
```

```c
            }
        }
        fclose(clipfile);
        return TRUE;
}
/*-----------------------------------------------------------------------*/
int load_scenario( char *scenname)
{
        char    fname[20];
        int     i, fld;

sprintf(fname,"f:%s",scenname);
        if (( scenfile = fopen(fname,"rt")) == NULL) {
            printf("can't open\n");
            return FALSE;
        }

/* READ STILLFRAME NUMBER and NUMBER OF CLIPFILES */
        fld = fscanf( scenfile, "%d", &stillframe);
        fld = fscanf( scenfile, "%d", &numfiles);

/* READ FILE NAMES */
        for (i = 0; i < numfiles; i++) {
            fld = fscanf( scenfile, "%s", cfiles[i]);
        }
        fclose(scenfile);
        return TRUE;
}

/* NMIDI.H */ extern  void setup_midi (void);
extern  void note_on (uint note, uint vel);
extern  void note_off (uint note);
extern  void play (void);
extern  void stop (void);
extern  void play_note (uint note, uint vel);

#include <stdio.h>
include <conio.h> include "include\literal.h"

/*-----------------------------------------------------------------------*/
#define MIDI_CTRL       0x331
#define MIDI_DATA       0x330
#define MIDI_RESET      0xFF            /* Total Reset Command */
#define UARTMODE        0x3F            /* "Dumb UART Mode" */
#define MIDI_DRR        0x40            /* Mask for Data Read Reg. Bit */
#define MIDI_DSR        0x80            /* Mask for Data Set Ready Bit */
#define NOTEON          0x90
#define START_PLAYING   0xFA            /* Start Playing and send msg */
#define STOP_PLAYING    0xFC            /* Stop Playing and send msg */

/*-----------------------------------------------------------------------*/
extern void  setup_midi (void)
{
        int     mdata;

outp(MIDI_CTRL, MIDI_RESET );
        mdata = inp(MIDI_DATA);
        while ((inp(MIDI_CTRL) & MIDI_DRR) != 0);

outp(MIDI_CTRL, UARTMODE );
        mdata = inp(MIDI_DATA);
        while ((inp(MIDI_CTRL) & MIDI_DSR) != 0);
}

/*-----------------------------------------------------------------------*/
extern void  play(void)
```

```c
{
    int     mdata;

outp(MIDI_DATA, START_PLAYING);
    mdata = inp(MIDI_DATA);
    while ((inp(MIDI_CTRL) & MIDI_DRR) != 0);
}

/*----------------------------------------------------------------*/
extern void  stop(void)
{
    int     mdata;

outp(MIDI_DATA, STOP_PLAYING);
    mdata = inp(MIDI_DATA);
    while ((inp(MIDI_CTRL) & MIDI_DRR) != 0);
}

/*----------------------------------------------------------------*/
extern void  note_on (uint note, uint vel)
{
    int     mdata;

outp (MIDI_DATA, NOTEON);
    mdata = inp(MIDI_DATA);
    while ((inp(MIDI_CTRL) & MIDI_DRR) != 0);

outp (MIDI_DATA, note);
    mdata = inp(MIDI_DATA);
    while ((inp(MIDI_CTRL) & MIDI_DRR) != 0);

outp (MIDI_DATA, vel);
    mdata = inp(MIDI_DATA);
    while ((inp(MIDI_CTRL) & MIDI_DRR) != 0);
}

/*----------------------------------------------------------------*/
extern void  note_off (uint note) {
    int     mdata;

outp (MIDI_DATA, NOTEON);
    mdata = inp(MIDI_DATA);
    while ((inp(MIDI_CTRL) & MIDI_DRR) != 0);

outp (MIDI_DATA, note);
    mdata = inp(MIDI_DATA);
    while ((inp(MIDI_CTRL) & MIDI_DRR) != 0);

outp (MIDI_DATA, 0x00);
    mdata = inp(MIDI_DATA);
    while ((inp(MIDI_CTRL) & MIDI_DRR) != 0);
}

/*----------------------------------------------------------------*/
extern void  play_note (uint note, uint vel)
{
    note_off(note);
    note_on(note, vel);
}

/*----------------------------------------------------------------*/
/* REPLAY1.H */ extern void show_replay( char *scenfile );
extern void save_replay_data( int number );
extern void get_replay_data( int number );
extern void open_replay_write ();
extern void open_replay_read ();
extern void close_replay ();

/*----------------------------------------------------------------*/
/*                                                                */
```

```c
/* MODULE - REPLAY1.c                                                          */
/* This module contains functions which provide replay of scenario data        */
/*                                                                             */
/*-----------------------------------------------------------------------------*/ include <stdio.h>
include <stdlib.h>
#include <conio.h>
include <stage.h> include "include\literal.h"
include "include\vdisk.h"
#include "include\load1.h"

#undef  INIT
#undef  GLOBAL
#define GLOBAL  extern                      /* external global data */
#include "global.h"

/*-----------------------------------------------------------------------------*/
static  FILE            *replayfile;
static  ImageHdl        im[5];
static  Rect            imr[5];
static  int             xs, ys;
static  ulong           aim_color[5] = {WHITE, YELLOW, CYAN, AMBER, CYAN};

/*-----------------------------------------------------------------------------*/
/*                                                                             */
/* MODULE - REPLAY1.c                                                          */
/* FUNCTION - open_replay_write(void)                                          */
/*                                                                             */
/* This function opens a file on the ramdisk f: for storage of replay data     */
/*                                                                             */
/*-----------------------------------------------------------------------------*/
void open_replay_write(void)
{
     if (( replayfile = fopen("f:replay.dat","wb")) == NULL) {
          printf("can't open replay data file\n");
          exit(0);
     }

}

/*-----------------------------------------------------------------------------*/
void open_replay_read(void)
{
     if (( replayfile = fopen("f:replay.dat","rb")) == NULL) {
          printf("can't open replay data file\n");
          exit(0);
     }
}

/*-----------------------------------------------------------------------------*/
void close_replay(void)
{
     fclose ( replayfile );
}

/*-----------------------------------------------------------------------------*/
void save_replay_data(int number)
{
     int    i, j;

for (i = 0; i < number; i++) {
          for (j = 1; j < 3; j++) {
               fwrite( (char *) &guns[i].x[j], sizeof(int), 1, replayfile);
               fwrite( (char *) &guns[i].y[j], sizeof(int), 1, replayfile);
               fwrite( (char *) &guns[i].s[j], sizeof(int), 1, replayfile);
          }
     }
}
```

```c
/*-----------------------------------------------------------------------*/
void get_replay_data(int number)
{
        int     i, j;

for (i = 0; i < number; i++) {
            for (j = 1; j < 3; j++) {
                    fread( (char *) &guns[i].x[j], sizeof(int), 1, replayfile);
                    fread( (char *) &guns[i].y[j], sizeof(int), 1, replayfile);
                    fread( (char *) &guns[i].s[j], sizeof(int), 1, replayfile);
            }
        }
}

/*-----------------------------------------------------------------------*/
/*                                                                       */
/* MODULE - REPLAY1.c                                                    */
/* FUNCTION - create_aimpoints(void)                                     */
/*                                                                       */
/*  This function creates images for storage of the background information */
/*  during scenario replay.                                              */
/*-----------------------------------------------------------------------*/
static void create_aimpoints(void)
{
        int     i;

SetRect( &imr[1],96,96,104,104 );
        for ( i = 1; i < 5; i++) {
                im[i] = NewImageForPort( imr[1] );
        }
}
/*-----------------------------------------------------------------------*/
static void dispose_aimpoints(void)
{
        int     i;

for ( i = 1; i < 5; i++) {
                DisposeImage(im[i]);
        }
}

/*-----------------------------------------------------------------------*/
static void open_target_windows(void)
{
        int     j;

for ( j = 0; j < targs; j++) {
                alive[j] = TRUE;
                InvertRect( trg_window[j]);
        }
}

/*-----------------------------------------------------------------------*/
static int any_target_alive(void)
{
        int     i, targets_alive;

targets_alive = FALSE;
        for (i = 0; i < targs; i++) {
                if ( alive[i] == FALSE) {
                        InvertRect( trg_window[i]);
                        alive[i] = 20;                  /*invert only once*/
                }
                if ( alive[i] == TRUE) targets_alive = TRUE;
        }
        return targets_alive;
}

/*-----------------------------------------------------------------------*/
static void close_target_windows(void)
{
```

```c
        int     j;

for (j = 0; j < targs; j++) {
                if ( alive[j] == TRUE) InvertRect(trg_window[j]);
        }
}
/*--------------------------------------------------------------------*/
static void wait_for_frame(int frame)
{
        int     current_frame;

while(1) {
                current_frame = vdisk_track();
                if (current_frame == frame) break;
        }
}
/*--------------------------------------------------------------------*/
int show_gun_track(int gun, int cfm)
{
        int     stat;
        int     delay;

stat = guns[cfm].s[gun];
        delay = 3;
        if ( stat > 0 )  {                                      /* on screen? */
                xs = guns[cfm].x[gun];                          /* aim location */
                ys = guns[cfm].y[gun];
                SetRect(&imr[gun],xs-4,ys-4,xs+4,ys+4);         /* store background */ if ( stat == 1 ) {                              /* aim point tracking */
                        SetForeColor( aim_color[gun]);
                        delay = 3;
                }
                if ( stat == 2 ) {                              /* semi miss */
                        SetForeColor(BLUE);
                        delay = 60;
                }
                if ( stat == 3 ) {                              /* auto miss */
                        SetForeColor(GREEN);
                        delay = 60;
                }
                if ( stat > 3 ) {                               /* target kill */
                        SetForeColor(RED);
                        alive[stat - 4] = FALSE;
                        delay = 120;
                }
                PaintOval(imr[gun]);                            /* show result */
                SetForeColor(BLACK);
                FrameOval(imr[gun]);
        }
        return delay;
}

/*--------------------------------------------------------------------*/
static void erase_gun_track(int gun, int cfm)
{
        int     stat;

stat = guns[cfm].s[gun];
        if ( stat > 0 ) {                                       /* on screen? */
                PutImageToPort(imr[gun],im[gun]);               /* restore spot */
        }
}

/*--------------------------------------------------------------------*/
static void save_gun_track(int gun, int cfm)
{
        int     stat, xs, ys;

stat = guns[cfm].s[gun];
        if ( stat > 0 ) {                                       /* on screen? */
```

```
            xs = guns[cfm].x[gun];                    /* aim location */
            ys = guns[cfm].y[gun];
            SetRect(&imr[gun],xs-4,ys-4,xs+4,ys+4);
            GetImageFromPort(im[gun],imr[gun]);       /* save backgnd */
        }
    }

/*------------------------------------------------------------------*/
static replay_symbols(void)
{
    char    text[70];
    Rect    temp;

load_font(1);                                   /* SCENARIO REPLAY */
    SetForeColor( BLACK);
    SetRect(&temp, 0, 0, 755, 100);
    PaintRect(temp);
    SetForeColor( WHITE);
    sprintf(text,"SCENARIO REPLAY");
    MoveTo(80,30);
    DrawText(text,0,strlen(text));

SetRect(&temp, 250, 30, 268, 45);
    SetForeColor(aim_color[1]);
    PaintRect( temp);
    SetForeColor(WHITE);
    sprintf(text,"GUN 1 aimpoint");
    MoveTo(280,45);
    DrawText(text,0,strlen(text));

SetRect(&temp, 250, 55, 268, 70);
    SetForeColor(aim_color[2]);
    PaintRect( temp);
    SetForeColor(WHITE);
    sprintf(text,"GUN 2 aimpoint");
    MoveTo(280,70);
    DrawText(text,0,strlen(text));

SetRect(&temp, 500, 30, 518, 45);
    SetForeColor(GREEN);
    PaintRect( temp);
    SetForeColor(WHITE);
    sprintf(text,"MISS (automatic fire)");
    MoveTo(530,45);
    DrawText(text,0,strlen(text));

SetRect(&temp, 500, 55, 518, 70);
    SetForeColor(BLUE);
    PaintRect( temp);
    SetForeColor(WHITE);
    sprintf(text,"MISS (semi-automatic fire)");
    MoveTo(530,70);
    DrawText(text,0,strlen(text));

SetRect(&temp, 500, 80, 518, 95);
    SetForeColor(RED);
    PaintRect( temp);
    SetForeColor(WHITE);
    sprintf(text,"HIT");
    MoveTo(530,95);
    DrawText(text,0,strlen(text));
}
/*------------------------------------------------------------------*/
void show_replay(char   *scenfile)
{
    int    fn, cfm, maxdelay, delay1, delay2;

replay_symbols();
    load_scenario( scenfile );                      /* load scenario */
    create_aimpoints();
    open_replay_read();
    for (fn = 0; fn < numfiles; fn++) {
```

```
        load_clip( cfiles[fn]);
        printf("clip file %s\n", cfiles[fn]);
        printf("frames %d\n", frames);
        printf("startframe %d\n", startframe);
        get_replay_data( frames );
        vdisk_int_search(startframe);

fast_play_to( startframe);
        vsync_delay(90);
        open_target_windows();

for ( cfm = 0; cfm < frames; cfm++) {

/* save backgrounds */
                save_gun_track(1, cfm);
                save_gun_track(2, cfm);

/* draw gun locations */
                delay1 = show_gun_track(1, cfm);
                delay2 = show_gun_track(2, cfm);

/* delay maxdelay vsyncs between frames */
                if ( delay1 > delay2 ) maxdelay = delay1;
                else maxdelay = delay2;
                vsync_delay( maxdelay );
                vdisk_cmd(STEPFWD);

/* restore backgrounds */
                erase_gun_track(1, cfm);
                erase_gun_track(2, cfm);
                if ( !any_target_alive() ) break;
                if ( kbhit() ) break;
        }
        close_target_windows();
        if ( kbhit() ) break;
    }
    close_replay();
    dispose_aimpoints();
}

/* -------------------------------------------------------------------------- */
/* VDISK.H include file for VDISK.c                                           */
/*    Literals used to control video disk player                              */ define         PLAYFWD         "\002PF\003\x0d"
define         PLAYREV         "\002PR\003\x0d"
#define         TRACKNO         "\002NO\003\x0d"
#define         STEPFWD         "\002TF\003\x0d"
#define         STEPREV         "\002TR\003\x0d"
#define         FASTFWD         "\002FF7:\003\x0d"
#define         FASTREV         "\002FR7:\003\x0d"
#define         SCANFWD         "\002CF\003\x0d"
#define         SCANREV         "\002CR\003\x0d"
#define         SLOWFWD         "\002LF2:\003\x0d"
#define         SLOWREV         "\002LR2:\003\x0d"
#define         ONLINE          "\002ON11:\003\x0d"
#define         OFFLINE         "\002OF\003\x0d"
#define         CANCEL          "\002CS\003\x0d"
#define         INTVIDEO        "\002VI\003\x0d"
#define         EXTVIDEO        "\002VE\003\x0d"
#define         DISPLAYON       "\002DS\003\x0d"
#define         DISPLAYOFF      "\002DR\003\x0d"
#define         JUMPFWD         "\002JF5:\003\x0d"
#define         JUMPREV         "\002JR5:\003\x0d"

extern  void setup_serial_port();
extern  void vdisk_cmd(char *p);
extern  void fast_play_to(int   target_frame);
extern  void vdisk_search(char *p);
extern  void vdisk_int_search(int target_frame);
extern  int  vdisk_track();
```

```c
/* ---------------------------------------------------------------------- */
/*                                                                        */
/* MODULE - VDISK.c                                                       */
/*                                                                        */
/*  This module contains functions which are used to control the video    */
/*  disk player through serial communications.                            */
/* ---------------------------------------------------------------------- */ include <stdio.h>
include <stdlib.h>
#include <bios.h>
include <string.h> include "include\literal.h"
include "include\vdisk.h"

static      unsigned    smode_data;
static      unsigned    sdata, sstatus;
static char             sbuffer[50];
static char             *endcmd = ":\003\x0d";

/***************** INITIALIZE SERIAL PORT *****************************/
void setup_serial_port()
{
        smode_data = _COM_CHR8 | _COM_STOP1 | _COM_NOPARITY | _COM_9600;
        sstatus = _bios_serialcom(_COM_INIT, 1, smode_data);
}

/**************** SEND COMMAND STRING TO PLAYER ************************/
void vdisk_cmd(char  *p)
{
        int         x,len;
        char        resp;

len = (int) strlen(p);                  /* send command string */
        for ( x = 0; x < len ; x++) {
                sstatus = 0;
                while ( sstatus != 0x2000) {
                        sstatus = _bios_serialcom(_COM_STATUS, 1, sdata);
                        sstatus = sstatus & 0x2000;
                }
                sdata = (unsigned) p [x];
                sstatus = _bios_serialcom(_COM_SEND, 1, sdata);
        }
        sstatus = 0;                            /* recieve ack / nak */
        while ( sstatus != 0x0100 ) {
                sstatus = _bios_serialcom(_COM_STATUS, 1, sdata);
                sstatus = sstatus & 0x0100;
        }
        sstatus = _bios_serialcom(_COM_RECEIVE, 1, sdata);
        resp = (char) sstatus;
        if ( resp == 0x15 ) printf("video disk communications error\n");
}

/******************* GET FRAME NUMBER ***********************************/
int vdisk_track()
{
        int    x;

vdisk_cmd(TRACKNO);
        x = 0;
        while (1) {
                sstatus = 0;
                while ( sstatus != 0x0100 ) {
                        sstatus = _bios_serialcom(_COM_STATUS, 1, sdata);
                        sstatus = sstatus & 0x0100;
                }
                sstatus = _bios_serialcom(_COM_RECEIVE, 1, sdata);
                sbuffer[x] = (char) sstatus;
                if ( sbuffer[x] == 0x03 ) break;
                x++;
        }
```

```c
        sbuffer[8] = 0;
        x = atoi(&sbuffer[3]);
        return x;
}

/***** SEARCH TO FRAME ****************************************************/
void vdisk_search(char *p)
{
        char    command[25];

sprintf(command,"\002SR%s%s",p,endcmd);
        vdisk_cmd(command);
}

/***** SEARCH TO FRAME ****************************************************/
void vdisk_int_search(int target_frame)
{
        char    buff[8];
        char    command[25];

itoa( target_frame, buff, 10);
        sprintf(command,"\002SR%s%s",buff,endcmd);
        vdisk_cmd(command);
}

/***** 10 FAST FORWARD TO FRAME *******************************************/
void vdisk_ffwto(char *p)
{
        char    command[25];

sprintf(command,"\002FF.10:%s%s",p,endcmd);
        vdisk_cmd(command);
}

/***** 10 FAST REVERSE TO FRAME *******************************************/
void vdisk_frvto(char *p)
{
        char    command[20];

sprintf(command,"\002FR.10:%s%s",p,endcmd);
        vdisk_cmd(command);
}

/******* FAST PLAY TO FRAME ***********************************************/
void fast_play_to(int    target_frame)
{
        char    buff[8];
        int     current_frame;

itoa( target_frame, buff, 10);
        current_frame = vdisk_track();
        if ( target_frame < current_frame) vdisk_frvto(buff);
        else vdisk_ffwto(buff);
}

/*---------------------------------------------------------------*/
/* MODULE: mapmenu4.c                                            */
/*                                                               */
/* This module is the entry point and main menu for the outline program */
/*---------------------------------------------------------------*/

/*
Include Files ---> libraries, etc.
*/
#include <stdio.h>
include <stdlib.h>
#include <conio.h>
include <stage.h>
#include <graph.h>
#include <string.h>
#include <process.h>
```

```c
#include <dos.h>
#include <bios.h>
#include <time.h>
#include <math.h>
include <ctype.h> include "nvdisk.h"

/*
SOME LITERAL DECLARATIONS
*/
#define    esc      0x1b
#define    space    0x20
#define    car_ret  0x0d
define    bs       0x08 define    byte     unsigned char
define    word     unsigned int
#define    lbmice   0x01
define    rbmice   0x02 define    lbut     0x01
define    rbut     0x02
define    mbut     0x04 pragma page ()

/*
local variables
*/
static Rect          screen;
static Point         mice;
static word          micebuttons;
static char          ch,kkey,dtype;
static unsigned int  button_stat;
static int           i;
static unsigned char finished = 0;
static int           x,y,row,col,orow,ocol,cflag,odtype;
/*
MENU FUNCTION STRINGS AND POSITIONS
*/
static unsigned char smenu[28][30] = {
        {"map targets   "}, {"map shootback  "}, {"edit scene    "},
        {"play back scene"}, {"             "}, {"             "},
        {"             "}, {"       "}, {"       "}, {"       "},
        {"       "}, {"       "}, {"       "},
        {"       "}, {"       "}, {"       "}, {"       "},
        {"       "}, {"       "}, {"       "},
        {"       "}, {"EXIT PROGRAM  "}, {"       "}, {"       "},
        {"       "}, {"       "}, {"       "},
        {"       "}};

static int rc[28][2] = { {2,5}, {3,5}, {4,5}, {5,5}, {6,5}, {7,5}, {8,5},
                {2,24},{3,24},{4,24},{5,24},{6,24},{7,24},{8,24},
```

{2,43},{3,43},{4,43},{5,43},{6,43},{7,43},{8,43},
{2,62},{3,62},{4,62},{5,62},{6,62},{7,62},{8,62} };

```c
/*
target hit rectangles
*/
extern int    stat1[5000];
extern int    stat2[5000];
extern int    stat3[5000];
extern int    stat4[5000];

#pragma page ()

extern void map_targets (void);

extern void map_shootback (void);

extern void edit_mapfile (void);

extern void playback_scene (void);

extern void wait_till_button   (wc -d bcode) {
        Du..ns (&
        while ( micebuttons      de) {
                Buttons (&micebuttons);
                }
        }
extern void wait_till_button_down (word bcode) {
        Buttons( &micebuttons);
        while ( !(micebuttons & bcode) ) {
                Buttons( &micebuttons);
                }
        } extern void wait_till_all_buttons_up (void) {
        Buttons (&button_stat);
        while (button_stat != 0) {
                Buttons (&button_stat);
                }
        } extern void wait_while_all_buttons_up (void) {
        Buttons (&button_stat);
        while (button_stat == 0) {
                Buttons (&button_stat);
                }
        }
/*----------------------------------------------------------------*/
/* MODULE:  mapmenu4.c                                            */
/*                                                                */
/* FUNCTION: print_menu (void)                                    */
/*                                                                */
/* This function displays the main menu on the console screen    */
/*----------------------------------------------------------------*/ static void print_menu (void) {
        _settextcolor(7);
        _clearscreen(_GCLEARSCREEN);
```

```c
_rectangle(_GBORDER,24,8,160,114);
_rectangle(_GBORDER,176,8,312,114);
_rectangle(_GBORDER,328,8,464,114);
_rectangle(_GBORDER,480,8,616,114);
for (x = 0; x < 28; x++) {
        _settextposition(rc[x][0],rc[x][1]);
        _outtext(&smenu[x][0]);
}

_displaycursor(_GCURSORON);
_settextcolor(12);
_settextposition(rc[dtype][0],rc[dtype][1]);
_outtext(&smenu[dtype][0]);
_settextcolor(7);
_settextposition(12,1);

orow = 0;
ocol = 0;
}
/*---------------------------------------------------------------*/
/* MODULE:   mapmenu4.c                                          */
/*                                                               */
/* FUNCTION: screen_menu (void)                                  */
/*                                                               */
/* This function scans the main menu and launches the proper selections */
/*---------------------------------------------------------------*/ static void screen_menu (void) {
        print_menu ();
        while (1) {
                if ( kbhit() ) {
                        kkey = getch();
                        if ( kkey == esc ) break;
                }

GetCursorPos(&mice);
                Buttons ( &micebuttons );
                row = mice.y >> 4;
                col = mice.x >> 3;

if ((row != orow) || (col != ocol)) {
                        orow = row;
                        ocol = col;
                        cflag = 0;
                        if ( (row > 1) && (row < 9) ) {
                                odtype = dtype;
                                if ((col > 4) && (col < 20)) {
                                        cflag = 1;
                                        dtype = row - 2;
                                }
                                else if ((col > 23) && (col < 39)) {
                                        cflag = 1;
                                        dtype = row + 5;
                                }
                                else if ((col > 42) && (col < 58)) {
                                        cflag = 1;
                                        dtype = row + 12;
                                }
                                else if ((col > 61) && (col <77)) {
                                        cflag = 1;
                                        dtype = row + 19;
                                }
```

```
                }
        if (cflag) {
                _settextposition(rc[odtype][0],rc[odtype][1]);
                _outtext(&smenu[odtype][0]);
                _settextcolor(12);
                _settextposition(rc[dtype][0],rc[dtype][1]);
                _outtext(&smenu[dtype][0]);
                _settextcolor(7);
                }
        _settextposition(row,col);
        }
        if (micebuttons & rbmice) {
                wait_till_button_up(rbmice);
                break;
                }
        if (micebuttons & lbmice) {
                if (dtype == 0) {
                        map_targets ();
                        print_menu ();
                        }
                else if (dtype == 1) {
                        map_shootback ();
                        print_menu ();
                        }
                else if (dtype == 2) {
                        edit_mapfile ();
                        print_menu ();
                        }
                else if (dtype == 3) {
                        playback_scene ();
                        print_menu ();
                        }
                else if (dtype == 21) break;
                wait_till_button_up(lbmice);

}
        }
        _displaycursor(_GCURSOROFF);
        ShowCursor();
        }
/*---------------------------------------------------------------------*/
/* MODULE:   mapmenu4.c                                                */
/*                                                                     */
/* FUNCTION: main (void)                                               */
/*                                                                     */
/* This function is the main module and entry point of the program    */
/*---------------------------------------------------------------------*/ extern void main (void) {
        _setvideomode(_ERESCOLOR);
        _clearscreen(_GCLEARSCREEN);
        initialize_vista();
        SetBackColor(0x8000L);
        SetForeColor(0L);
        SetRect (&screen, 0, 0, 755, 485);
        EraseRect(screen);
        setup_serial_port();
        vdisk_cmd(ONLINE);
        vdisk_cmd(DISPLAYON);
        dtype = 0;
        for (i = 0; i < 5001; i++) {
                stat1 [i] = 0;
                stat2 [i] = 0;
                stat3 [i] = 0;
                stat4 [i] = 0;
```

```
        }
    finished = 0;
    while (finished == 0) {
            screen_menu();
             _setvisualpage(1);
             _setactivepage(1);
             _clearscreen(_GCLEARSCREEN);
            printf ("\n\n\a\aDo you really want to quit (Yes or No) \n\n");
            ch = getch ();
            if ((ch == 'Y') || (ch == 'y')) finished++;
             _setvisualpage(0);
             _setactivepage(0);
            }
    ClosePntDev();
    StageEnd();
    vdisk_cmd(DISPLAYOFF);
    vdisk_cmd(OFFLINE);
    _setvideomode(_DEFAULTMODE);
    exit(0);
    }
/*------------------------------------------------------------*/
/* MODULE:  mapdsk6.c                                         */
/*                                                            */
/* This module maps the target locations on each frame of the video */
/* disk                                                       */
/*                                                            */
/*------------------------------------------------------------*/

/*
Include Files ---> libraries, etc.
*/
#include <stdio.h>
include <stdlib.h>
#include <conio.h>
include <stage.h>
#include <graph.h>
#include <string.h>
#include <process.h>
#include <dos.h>
#include <bios.h>
#include <time.h>
#include <math.h>
include <ctype.h> include "nvdisk.h"

/*
SOME LITERAL DECLARATIONS
*/
#define     esc     0x1b
#define     space   0x20
#define     car_ret 0x0d
define     bs      0x08 define     byte    unsigned char
define     word    unsigned int
#define     lbmice  0x01
define     rbmice  0x02 define     lbut    0x01
define     rbut    0x02
#define     mbut    0x04
```

```c
/*
VISTA board colors
*/
define WHITE  0x00007FFFL
define BLACK  0x00000000L
define VIDEO  0x00008000L pragma page ()

/*
local variables
*/
static Rect       screen,draw_rect, r1, r2, r3, r4;
static Point      mice;
static word       micebuttons;
static int        x,y,xc,yc,xo,yo;
static char       ch,ch1,kkey,dtype;

/*
target outline colors
*/
static unsigned long  trgcolor[4] = {0x7ebL,0x7c35L,0x435L,0x7febL};

/*
file name
*/
extern char  scenname[20];
extern char  fname[50];

/*
MENU FUNCTION STRINGS AND POSITIONS
*/
static unsigned char smenu[28][30] = {
        {"play forward   "}, {"play reverse  "}, {"scan foward   "},
        {"scan reverse  "}, {"fast forward  "}, {"fast reverse  "},
        {"search (#)    "}, {"slow forward  "}, {"slow reverse  "}, {"step forward  "},
        {"step reverse  "}, {"load scenario "}, {"save scenario "},
        {"replay scenario"}, {"start frame   "}, {"# targets 1-4 "}, {"advance frame "},
        {"t1 area, green"}, {"t2 area, pink "}, {"t3 area, blue "},
        {"t4 area, yellow"}, {"EXIT PROGRAM  "}, {"edit scenario "}, {"still frame   "},
        {"hit 1 rect [A]"}, {"hit 2 rect [S]"}, {"hit 3 rect [D]"},
        {"hit 4 rect [F]"}};

static int rc[28][2] = { {2,5}, {3,5}, {4,5}, {5,5}, {6,5}, {7,5}, {8,5},
                    {2,24},{3,24},{4,24},{5,24},{6,24},{7,24},{8,24},
                    {2,43},{3,43},{4,43},{5,43},{6,43},{7,43},{8,43},
                    {2,62},{3,62},{4,62},{5,62},{6,62},{7,62},{8,62} };

/*
scenario DATA
*/
/*
file header (6 bytes)
*/
```

```
extern int    startframe;
extern int    stillframe;
extern int    frames;
extern int    targs;

/*
target area rectangles (based on # targets (max 4 for now)
*/
extern Rect   ta1;
extern Rect   ta2;
extern Rect   ta3;
extern Rect   ta4;

/*
target hit rectangles (based on # targets and # frames (5000 for now)
*/
extern int    stat1[5000];
extern int    stat2[5000];
extern int    stat3[5000];
extern int    stat4[5000];

extern Rect   th1[5000];
extern Rect   th2[5000];
extern Rect   th3[5000];
extern Rect   th4[5000];

static unsigned int button_stat;
static char bufff [20];

static int i;
static int iii;
static int jjj;
static int kkk;
static int lll;
static int xs0, ys0;
static int rect_x0, rect_y0, rect_x1, rect_y1;
static char done;
static char done1;
static int pen_mode;
static Point cur_pos;
static int bframe, eframe, sc_count = 0, image_cnt, no_rect;
static long cnt;
static int active_rect;
static Rect image_rect;
static Rect image_rect1;
static unsigned long current_color;
static unsigned char hit_flag = 0;
static unsigned char finished = 0;
static unsigned char cursor_flag = 0;
 tatic unsigned char edit_flag = 0;
e. tern int frame;
extern int shootb [500][3];
extern int sb_cnt;

#pragma page ()

extern void save_scenario (void);

extern void load_scenario (void);
```

```
extern void wait_till_button_up (word bcode);

extern void wait_till_button_down (word bcode);

extern void wait_till_all_buttons_up (void);

extern void wait_while_all_buttons_up (void);

#pragma page ()
```

```
/*------------------------------------------------------------------*/
/* MODULE: mapdsk6.c                                                */
/*                                                                  */
/* FUNCTION: display_frame_no (void)                                */
/*                                                                  */
/* This function reads the current frame number from the video disk */
/* and prints it to the screen                                      */
/*                                                                  */
/*------------------------------------------------------------------*/ void display_frame_no (void) {
        int dsk_frm;
        _settextposition(13,60);
        dsk_frm = vdisk_track ();
        printf ("Frame: %d       ", dsk_frm);
        }

/*------------------------------------------------------------------*/
/* MODULE: mapdsk6.c                                                */
/*                                                                  */
/* FUNCTION: corner1 (void)                                         */
/*                                                                  */
/* This function locates the first corner of the hit box            */
/*                                                                  */
/*------------------------------------------------------------------*/ static void corner1 (void) {
        ShowCursor ();
        button_stat = 0;
        while (button_stat != lbut) {
                Buttons (&button_stat);
                if (kbhit ()) {
                        button_stat = lbut;
                        }
                }
        GetCursorPos (&cur_pos);
        while (button_stat == lbut) {
                Buttons (&button_stat);
                }
        rect_x0 = cur_pos.x;
        rect_y0 = cur_pos.y;
        if (rect_x0 > 756) {
                rect_x0 = 756;
                }
        if (rect_y0 > 486) {
                rect_y0 = 486;
                }
        }
/*------------------------------------------------------------------*/
/* MODULE: mapdsk6.c                                                */
/*                                                                  */
/* FUNCTION: corner2 (void)                                         */
/*                                                                  */
/* This function locates the second corner of the hit box           */
/*                                                                  */
/*------------------------------------------------------------------*/
```

```
static void corner2 (void) {
        HideCursor ();
        while (button_stat != rbut) {
                Buttons (&button_stat);
                if (kbhit ()) {
                        button_stat = rbut;
                        ch = getch ();
                        }
                GetCursorPos (&cur_pos);
                rect_x1 = cur_pos.x;
                rect_y1 = cur_pos.y;
                if (rect_x1 > 756) {
                        rect_x1 = 756;
                        }
                if (rect_y1 > 486) {
                        rect_y1 = 486;
                        }
                SetForeColor (VIDEO);
                FrameRect (image_rect);
                FrameRect (image_rect1);
                SetForeColor (current_color);
                SetRect (&image_rect,
                        rect_x0, rect_y0,
                        rect_x1, rect_y1);
                OrderRect (&image_rect);
                image_rect1 = image_rect;
                InsetRect (&image_rect1, 1, 1);
                FrameRect (image_rect);
                SetForeColor (BLACK);
                FrameRect (image_rect1);
                for (cnt = 0; cnt < 50000; cnt++);
                }
        while (button_stat == rbut) {
                Buttons (&button_stat);
                }
        ShowCursor ();
        }

/*--------------------------------------------------------------*/
/* MODULE: mapdsk6.c                                            */
/*                                                              */
/* FUNCTION: move_rect (void)                                   */
/*                                                              */
/* This function moves the hit box on the screen                */
/*                                                              */
/*--------------------------------------------------------------*/ static void move_rect (void) {
        GetCursorPos (&cur_pos);
        rect_x0 = cur_pos.x;
        rect_y0 = cur_pos.y;
        if (rect_x0 > 756) {
                rect_x0 = 756;
                }
        if (rect_y0 > 486) {
                rect_y0 = 486;
                }
        rect_x1 = rect_x0 + (image_rect.x2 - image_rect.x1);
        rect_y1 = rect_y0 + (image_rect.y2 - image_rect.y1);
        if (rect_x1 > 756) {
                rect_x1 = 756;
                }
        if (rect_y1 > 486) {
```

```
                    rect_y1 = 486;
                }
        HideCursor ();
        SetForeColor (VIDEO);
        FrameRect (image_rect);
        FrameRect (image_rect1);
        SetForeColor (current_color);
        SetRect (&image_rect,
                rect_x0, rect_y0,
                rect_x1, rect_y1);
        OrderRect (&image_rect);
        image_rect1 = image_rect;
        InsetRect (&image_rect1, 1, 1);
        FrameRect (image_rect);
        SetForeColor (BLACK);
        FrameRect (image_rect1);
        ShowCursor ();
        }
/*------------------------------------------------------------*/
/* MODULE: mapdsk6.c                                          */
/*                                                            */
/* FUNCTION: move_corner (void)                               */
/*                                                            */
/* This function changes the size of the hit box by relocating one of */
/* its corners                                                */
/*                                                            */
/*------------------------------------------------------------*/ static void move_corner (void) {
        GetCursorPos (&cur_pos);
        rect_x1 = cur_pos.x;
        rect_y1 = cur_pos.y;
        if (rect_x1 > 756) {
                rect_x1 = 756;
                }
        if (rect_y1 > 486) {
                rect_y1 = 486;
                }
        rect_x0 = image_rect.x1;
        rect_y0 = image_rect.y1;
        HideCursor ();
        SetForeColor (VIDEO);
        FrameRect (image_rect);
        FrameRect (image_rect1);
        SetForeColor (current_color);
        SetRect (&image_rect,
                rect_x0, rect_y0,
                rect_x1, rect_y1);
        OrderRect (&image_rect);
        image_rect1 = image_rect;
        InsetRect (&image_rect1, 1, 1);
        FrameRect (image_rect);
        SetForeColor (BLACK);
        FrameRect (image_rect);
        ShowCursor ();
        }
/*------------------------------------------------------------*/
/* MODULE: mapdsk6.c                                          */
/*                                                            */
/* FUNCTION: searchto (void)                                  */
/*                                                            */
/* This function moves the video disk to a certain frame      */
/*                                                            */
/*------------------------------------------------------------*/
```

```c
static void searchto (void) {
        int    frmint;
        char   frm[10];

_setvisualpage(1);
        _setactivepage(1);
        _clearscreen(_GCLEARSCREEN);
        while(1) {
                printf ("Enter target frame   ");
                scanf(" %d",&frmint);
                printf ("frame = %d\n",frmint);
                if ( (frmint > 0) && (frmint < 24001) ) break;
        }
        fast_play_to(frmint);
        _setvisualpage(0);
        _setactivepage(0);
}
```

```
/*--------------------------------------------------------------------*/
/* MODULE: mapdsk6.c                                                  */
/*                                                                    */
/* FUNCTION: still_frame (void)                                       */
/*                                                                    */
/* This function determines and stores the still frame number         */
/*                                                                    */
/*--------------------------------------------------------------------*/
```

```c
static void still_frame (void) {
        int    nowframe;
        char   keyed;

_setvisualpage(1);
        _setactivepage(1);
        _clearscreen(_GCLEARSCREEN);
        if (stillframe != 0) {
                printf ("\a\a\a\aStill Frame is already defined.  Do you wish to change it (Yes or No)? ");
                keyed = getch ();
                if ( (keyed != 'y') && (keyed != 'Y') ) {
                        _setvisualpage(0);
                        _setactivepage(0);
                        return;
                }
        }
        nowframe = vdisk_track();
        printf("\n\n Current frame = %d\n",nowframe);
        printf(" Hit 'S' to set scenario still frame to current frame\n");
        keyed = getch();
        if ( (keyed == 's') || (keyed == 'S') ) stillframe = nowframe;
        _setvisualpage(0);
        _setactivepage(0);
}
```

```
/*--------------------------------------------------------------------*/
/* MODULE: mapdsk6.c                                                  */
/*                                                                    */
/* FUNCTION: start_frame (void)                                       */
/*                                                                    */
/* This function determines and stores the start frame number         */
/*                                                                    */
/*--------------------------------------------------------------------*/
```

```c
static void start_frame (void) {
        int    nowframe;
        char   keyed;
```

```c
        _setvisualpage(1);
        _setactivepage(1);
        _clearscreen(_GCLEARSCREEN);
        if (startframe != 0) {
                printf ("\a\a\aStart Frame is already defined.  Do you wish to change it (Yes or No)? ");
                keyed = getch ();
                if ( (keyed != 'y') && (keyed != 'Y') ) {
                        _setvisualpage(0);
                        _setactivepage(0);
                        return;
                        }
                } for (i = 0; i < 5001; i++) {
                stat1[i] = 0;
                stat2[i] = 0;
                stat3[i] = 0;
                stat4[i] = 0;
                } for (i = 0; i < 500; i++) {
                shootb [i][0] = 0;
                shootb [i][1] = 0;
                shootb [i][2] = 0;
                } sb_cnt = 0;
        frame = 0;
        frames = 0;
        startframe = 0;
        stillframe = 0;
        targs = 0;

nowframe = vdisk_track();
        printf("\n\n Current frame = %d\n",nowframe);
        printf(" Hit 'S' to set scenario start frame to current frame\n");
        keyed = getch();
        if ( (keyed == 's') || (keyed == 'S') ) startframe = nowframe;
        _setvisualpage(0);
        _setactivepage(0);
        }
/*------------------------------------------------------------------*/
/* MODULE:  mapdsk6.c                                               */
/*                                                                  */
/* FUNCTION: num_targets (void)                                     */
/*                                                                  */
/* This function queries the console for the number of targets in the */
/* scenario                                                         */
/*                                                                  */
/*------------------------------------------------------------------*/ static void num_targets (void) {
        int     numtargs;
        char    keyed;

_setvisualpage(1);
        _setactivepage(1);
        _clearscreen(_GCLEARSCREEN);
        if (targs != 0) {
                printf ("\a\a\aNumber of Targets is already defined.  Do you wish to change it (Yes or No)?");
                keyed = getch ();
                if ( (keyed != 'y') && (keyed != 'Y') ) {
```

```c
                _setvisualpage(0);
                _setactivepage(0);
                return;
            }
        }
        while (1) {
            printf("\n\n Enter number of targets (max = 4).\n");
            scanf("%d",&numtargs);
            if ( (numtargs > 0) && (numtargs < 5) ) break;
            else printf("\n\n maximum number = 4");
        }
        targs = numtargs;
        for (i = 0; i < targs; i++) {
            _clearscreen(_GCLEARSCREEN);
            printf ("Please Outline Target Area %d now.", (i + 1));
            current_color = trgcolor [i];
            SetRect (&image_rect, 0, 0, 4, 4);
            SetRect (&image_rect1, 1, 1, 3, 3);
            corner1 ();
            corner2 ();
            if (i == 0) ta1 = image_rect;
            if (i == 1) ta2 = image_rect;
            if (i == 2) ta3 = image_rect;
            if (i == 3) ta4 = image_rect;
        }
        HideCursor ();
        _setvisualpage(0);
        _setactivepage(0);
    }

/*--------------------------------------------------------------*/
/* MODULE:  mapdsk6.c                                           */
/*                                                              */
/* FUNCTION:  advance_frame (void)                              */
/*                                                              */
/* This function advances the video disk one frame and increments the */
/* proper counters                                              */
/*                                                              */
/*--------------------------------------------------------------*/ static void advance_frame (void) {
    frame++;
    if (frame > frames) frames = frame;
    if (frames > 5000) {
        frame = 5000;
        _setvisualpage(1);
        _setactivepage(1);
        _clearscreen(_GCLEARSCREEN);
        printf ("\n\n\a\a\aBUFFER FULL!!!!!!\a\a\a\n\nHit any key to continue/n/n");
        ch = getch ();
        _setvisualpage(0);
        _setactivepage(0);
        return;
    } if (i == 0) {
        th1 [frame] = th1 [frame - 1];
        stat1 [frame] = stat1 [frame - 1];
    }
    if (i == 1) {
        th2 [frame] = th2 [frame - 1];
        stat2 [frame] = stat2 [frame - 1];
    }
```

```
            if (i == 2) {
                    th3 [frame] = th3 [frame - 1];
                    stat3 [frame] = stat3 [frame - 1];
                    }
            if (i == 3) {
                    th4 [frame] = th4 [frame - 1];
                    stat4 [frame] = stat4 [frame - 1];
                    }
            vdisk_cmd(STEPFWD);
            }
```

```
/*----------------------------------------------------------------*/
/* MODULE:  mapdsk6.c                                             */
/*                                                                */
/* FUNCTION:  retreat_frame (void)                                */
/*                                                                */
/* This function moves the video disk back one frame              */
/*                                                                */
/*----------------------------------------------------------------*/ static void retreat_frame (void) {
        if (frame > 0) frame--;
        vdisk_cmd(STEPREV);
        }
```

```
/*----------------------------------------------------------------*/
/* MODULE:  mapdsk6.c                                             */
/*                                                                */
/* FUNCTION:  start_rect (void)                                   */
/*                                                                */
/* This function draws a rectangle arround the target hit box or the */
/* target area                                                    */
/*                                                                */
/*----------------------------------------------------------------*/ static void start_rect (void) {

_setvisualpage(1);
        _setactivepage(1);
        _clearscreen(_GCLEARSCREEN);
        if (hit_flag == 0) printf ("Please Outline Target Area %d now.", (i + 1));
        if (hit_flag == 1) printf ("Please Outline Target Hit Box %d now.", (i + 1));
        current_color = trgcolor [i];
        SetRect (&image_rect, 0, 0, 4, 4);
        SetRect (&image_rect1, 1, 1, 3, 3);
        wait_till_all_buttons_up ();
        corner1 ();
        corner2 ();
        if (i == 0) th1 [frame] = image_rect;
        if (i == 1) th2 [frame] = image_rect;
        if (i == 2) th3 [frame] = image_rect;
        if (i == 3) th4 [frame] = image_rect;
        HideCursor ();
        wait_till_all_buttons_up ();
        _setvisualpage(0);
        _setactivepage(0);

}
```

```
/*--------------------------------------------------------------*/
/* MODULE:  mapdsk6.c                                           */
/*                                                              */
/* FUNCTION:  print_coordinates (void)                          */
/*                                                              */
/* This function prints the coordinates of the hit rectangle to the */
/* screen                                                       */
/*                                                              */
/*--------------------------------------------------------------*/ static void print_coordinates () {
        if (hit_flag == 0) {
                _settextposition (12, 1);
                printf ("Coordinates: %d, %d, %d, %d",
                        image_rect.x1, image_rect.y1,
                        image_rect.x2, image_rect.y2);
        }
}

/*--------------------------------------------------------------*/
/* MODULE:  mapdsk6.c                                           */
/*                                                              */
/* FUNCTION:  change_rect (void)                                */
/*                                                              */
/* This function coordinates mouse movements with moving and changing */
/* the size of on-screen rectangles (hit rects and target areas)     */
/*                                                              */
/*--------------------------------------------------------------*/ static void change_rect (void) { if (edit_flag != 1) {
                _setvisualpage(1);
                _setactivepage(1);
        }
        _clearscreen(_GCLEARSCREEN);
        if (hit_flag == 0) printf ("Please Outline Target Area %d now.", (i + 1));
        if (hit_flag == 1) printf ("Please Outline Target Hit Box %d now.", (i + 1));
        printf ("\n\nLeft Mouse Button moves target\n"
                " Right Mouse Button moves corner\n"
                " Middle Mouse Button exits\n");
        current_color = trgcolor [i];

wait_till_all_buttons_up ();
        ShowCursor ();
        done = 0;
        while (done == 0) {
                Buttons (&button_stat);
                print_coordinates ();
                if (button_stat != 0) {
                        HideCursor ();
                        cursor_flag++;
                }
                while (button_stat == lbut) {
                        move_rect ();
                        Buttons (&button_stat);
                        print_coordinates ();
                        if (kbhit()) {
                                ch = getch ();
                                if ((ch == space) && (hit_flag == 1)) {
                                        if (i == 0) th1 [frame] = image_rect;
                                        if (i == 1) th2 [frame] = image_rect;
                                        if (i == 2) th3 [frame] = image_rect;
```

```
                        if (i == 3) th4 [frame] = image_rect;
                        advance_frame ();
                    }
                }
            }
            if (button_stat == mbut) done++;
            while (button_stat == rbut) {
                move_corner ();
                print_coordinates ();
                Buttons (&button_stat);
            } while (cursor_flag != 0) {
                ShowCursor ();
                cursor_flag--;
            }
            if (kbhit()) {
                ch = getch ();
                if (ch == esc) done++;
                if ((ch == space) && (hit_flag == 1)) {
                        if (i == 0) th1 [frame] = image_rect;
                        if (i == 1) th2 [frame] = image_rect;
                        if (i == 2) th3 [frame] = image_rect;
                        if (i == 3) th4 [frame] = image_rect;
                        advance_frame ();
                }
                if (ch == bs) retreat_frame ();
                if ((ch == 'D') || (ch == 'd')) {
                        if (hit_flag == 1) {
                                HideCursor ();
                                SetForeColor (VIDEO);
                                FrameRect (image_rect);
                                ShowCursor ();
                                if (i == 0) stat1 [frame] = 0;
                                if (i == 1) stat2 [frame] = 0;
                                if (i == 2) stat3 [frame] = 0;
                                if (i == 3) stat4 [frame] = 0;
                        }
                }
            }
        }
        HideCursor ();
        wait_till_all_buttons_up ();
        if (edit_flag != 1) {
                _setvisualpage(0);
                _setactivepage(0);
        }
    }
```

```
/*-----------------------------------------------------------------*/
/* MODULE: mapdsk6.c                                               */
/*                                                                 */
/* FUNCTION: t1_area (void)                                        */
/*                                                                 */
/* This function outlines target area 1                            */
/*                                                                 */
/*-----------------------------------------------------------------*/ static void t1_area (void) {
```

```
        if (targs < 1) return;

i = 0;
        image_rect = ta1;
        change_rect ();
        ta1 = image_rect;
        }
```

```
/*----------------------------------------------------------------*/
/* MODULE: mapdsk6.c                                              */
/*                                                                */
/* FUNCTION: t2_area (void)                                       */
/*                                                                */
/* This function outlines target area 2                           */
/*                                                                */
/*----------------------------------------------------------------*/
``` static void t2_area (void) {

```
        if (targs < 2) return;

i = 1;
        image_rect = ta2;
        change_rect ();
        ta2 = image_rect;
        }
```

```
/*----------------------------------------------------------------*/
/* MODULE: mapdsk6.c                                              */
/*                                                                */
/* FUNCTION: t3_area (void)                                       */
/*                                                                */
/* This function outlines target area 3                           */
/*                                                                */
/*----------------------------------------------------------------*/
``` static void t3_area (void) {

```
        if (targs < 3) return;

i = 2;
        image_rect = ta3;
        change_rect ();
        ta3 = image_rect;
        }
```

```
/*----------------------------------------------------------------*/
/* MODULE: mapdsk6.c                                              */
/*                                                                */
/* FUNCTION: t4_area (void)                                       */
/*                                                                */
/* This function outlines target area 4                           */
/*                                                                */
/*----------------------------------------------------------------*/
``` static void t4_area (void) {

```
        if (targs < 4) return;

i = 3;
        image_rect = ta4;
        change_rect ();
        ta4 = image_rect;
        }
```

```
/*--------------------------------------------------------------*/
/* MODULE:   mapdsk6.c                                          */
/*                                                              */
/* FUNCTION: sync_frame (void)                                  */
/*                                                              */
/* This function synchronizes the internal pointers with the video disk */
/* frame number                                                 */
/*                                                              */
/*--------------------------------------------------------------*/
```

```c
static void sync_frame (void) {
        register int temp;

temp = vdisk_track ();
        frame = temp - startframe;
        if (frame > frames) frames = frame;
        if (frames > 5000) {
                frame = 5000;
                frames = 5000;
                }
        }
```

```
/*--------------------------------------------------------------*/
/* MODULE:   mapdsk6.c                                          */
/*                                                              */
/* FUNCTION: display_areas (void)                               */
/*                                                              */
/* This function draws all visible target rectangles on the screen */
/*                                                              */
/*--------------------------------------------------------------*/
```

```c
static void display_areas (void) {
        HideCursor ();
        EraseRect(screen);
        if (targs > 0) {
                current_color = trgcolor [0];
                SetForeColor (current_color);
                FrameRect (ta1);
                }
        if (targs > 1) {
                current_color = trgcolor [1];
                SetForeColor (current_color);
                FrameRect (ta2);
                }
        if (targs > 2) {
                current_color = trgcolor [2];
                SetForeColor (current_color);
                FrameRect (ta3);
                }
        if (targs > 3) {
                current_color = trgcolor [3];
                SetForeColor (current_color);
                FrameRect (ta4);
                }
        ShowCursor ();
        }
```

```
/*--------------------------------------------------------------*/
/* MODULE:   mapdsk6.c                                          */
/*                                                              */
/* FUNCTION: display_rect (void)                                */
/*                                                              */
/* This function draws visible hit rectangles on the screem     */
/*                                                              */
/*--------------------------------------------------------------*/
```

```
static void display_rect (void) {

HideCursor ();

current_color = trgcolor [i];
    SetForeColor (current_color);
    if ((i == 0) && (stat1[frame] == 1)) FrameRect (image_rect);
    if ((i == 1) && (stat2[frame] == 1)) FrameRect (image_rect);
    if ((i == 2) && (stat3[frame] == 1)) FrameRect (image_rect);
    if ((i == 3) && (stat4[frame] == 1)) FrameRect (image_rect);

ShowCursor ();

}

/*--------------------------------------------------------------*/
/* MODULE:  mapdsk6.c                                           */
/*                                                              */
/* FUNCTION:  t1_hit (void)                                     */
/*                                                              */
/* This function draws and edits (moves and/or resizes) hit area 1 */
/*                                                              */
/*--------------------------------------------------------------*/ static void t1_hit (void) { if (targs < 1) return;
    sync_frame ();
    i = 0;
    hit_flag = 1;

display_areas ();
    if (stat1 [frame] == 0) {
            start_rect ();
            stat1 [frame] = 1;
            advance_frame ();
            }
    image_rect = th1 [frame];
    display_rect ();
    change_rect ();
    th1 [frame] = image_rect;

hit_flag = 0;

}

/*--------------------------------------------------------------*/
/* MODULE:  mapdsk6.c                                           */
/*                                                              */
/* FUNCTION:  t2_hit (void)                                     */
/*                                                              */
/* This function draws and edits (moves and/or resizes) hit area 2 */
/*                                                              */
/*--------------------------------------------------------------*/ static void t2_hit (void) {
        if (targs < 2) return;
        sync_frame ();
        i = 1;
        hit_flag = 1;
        display_areas ();
        if (stat2 [frame] == 0) {
```

```
                start_rect ();
                stat2 [frame] = 1;
                advance_frame ();
                }
        image_rect = th2 [frame];
        display_rect ();
        change_rect ();
        th2 [frame] = image_rect;
        hit_flag = 0;
        }
```

```
/*---------------------------------------------------------------*/
/* MODULE: mapdsk6.c                                             */
/*                                                               */
/* FUNCTION: t3_hit (void)                                       */
/*                                                               */
/* This function draws and edits (moves and/or resizes) hit area 3 */
/*                                                               */
/*---------------------------------------------------------------*/ static void t3_hit (void) {
        if (targs < 3) return;
        sync_frame ();
        i = 2;
        hit_flag = 1;
        display_areas ();
        if (stat3 [frame] == 0) {
                start_rect ();
                stat3 [frame] = 1;
                advance_frame ();
                }
        image_rect = th3 [frame];
        display_rect ();
        change_rect ();
        th3 [frame] = image_rect;
        hit_flag = 0;
        }
```

```
/*---------------------------------------------------------------*/
/* MODULE: mapdsk6.c                                             */
/*                                                               */
/* FUNCTION: t4_hit (void)                                       */
/*                                                               */
/* This function draws and edits (moves and/or resizes) hit area 4 */
/*                                                               */
/*---------------------------------------------------------------*/ static void t4_hit (void) { if (targs < 4) return;
        sync_frame ();
        i = 3;
        hit_flag = 1;

display_areas ();
        if (stat4 [frame] == 0) {
                start_rect ();
                stat4 [frame] = 1;
                advance_frame ();
                }
        image_rect = th4 [frame];
        display_rect ();
        change_rect ();
``` th4 [frame] = image_rect;

hit_flag = 0;

}

```
/*-----------------------------------------------------------*/
/* MODULE:   mapdsk6.c                                       */
/*                                                           */
/* FUNCTION: replay_scenario (void)                          */
/*                                                           */
/* This function replays the scenario currently in memory    */
/*                                                           */
/*-----------------------------------------------------------*/
``` static void replay_scenario (void) { fast_play_to(startframe);
    display_areas ();
    for (iii = 0; iii < frames; iii++) {
        for (i = 0; i < targs; i++) {
            HideCursor ();
            SetForeColor (trgcolor [i]);
            if ((i == 0) && (stat1 [iii] == 1)) FrameRect (th1 [iii]);
            if ((i == 1) && (stat2 [iii] == 1)) FrameRect (th2 [iii]);
            if ((i == 2) && (stat3 [iii] == 1)) FrameRect (th3 [iii]);
            if ((i == 3) && (stat4 [iii] == 1)) FrameRect (th4 [iii]);
            ShowCursor ();
        }
        vdisk_cmd(STEPFWD);
        VBLWait ();
        VBLWait ();
        VBLWait ();
        VBLWait ();
        VBLWait ();
        for (i = 0; i < targs; i++) {
            HideCursor ();
            SetForeColor (VIDEO);
            if (i == 0) FrameRect (th1 [iii]);
            if (i == 1) FrameRect (th2 [iii]);
            if (i == 2) FrameRect (th3 [iii]);
            if (i == 3) FrameRect (th4 [iii]);
            ShowCursor ();
        }
        if (kbhit ()) iii = frames;
    }
    vdisk_cmd(STEPREV);
    vdisk_cmd(STEPFWD);

}

```
/*-----------------------------------------------------------*/
/* MODULE:   mapdsk6.c                                       */
/*                                                           */
/* FUNCTION: edit_menu (void)                                */
/*                                                           */
/* This function prints a menu for console choice            */
/*                                                           */
/*-----------------------------------------------------------*/
``` static void edit_menu (void) {
    _clearscreen(_GCLEARSCREEN);
    printf ("EDIT SCENARIO\n\n\n"

```
"  A------->edit target hit box 1\n"
"  S------->edit target hit box 2\n"
"  D------->edit target hit box 3\n"
"  F------->edit target hit box 4\n"
"  G------->go to frame #()\n"
"  <space>-->advance 1 frame\n"
"  <esc>--->EXIT EDIT\n\n");
}

/*....................................................................*/
/* MODULE: mapdsk6.c                                                  */
/*                                                                    */
/* FUNCTION: edit_scenario (void)                                     */
/*                                                                    */
/* This function edits a scenario                                     */
/*                                                                    */
/*....................................................................*/ static void edit_scenario (void) { register int mmm;

edit_flag = 1;
    _setvisualpage(1);
    _setactivepage(1);
    edit_menu ();

fast_play_to(startframe);
    for (kkk = 0; kkk < targs; kkk++) {
        HideCursor ();
        SetForeColor (trgcolor [kkk]);
        if (kkk == 0) FrameRect (ta1);
        if (kkk == 1) FrameRect (ta2);
        if (kkk == 2) FrameRect (ta3);
        if (kkk == 3) FrameRect (ta4);
        ShowCursor ();
        }
    for (iii = 0; iii < frames; iii++) {
        for (kkk = 0; kkk < targs; kkk++) {
            HideCursor ();
            SetForeColor (trgcolor [kkk]);
            if ((kkk == 0) && (stat1 [iii] == 1)) FrameRect (th1 [iii]);
            if ((kkk == 1) && (stat2 [iii] == 1)) FrameRect (th2 [iii]);
            if ((kkk == 2) && (stat3 [iii] == 1)) FrameRect (th3 [iii]);
            if ((kkk == 3) && (stat4 [iii] == 1)) FrameRect (th4 [iii]);
            ShowCursor ();
            } ch = 0;
        while (ch != space) {
            edit_menu ();
            _settextposition (1, 60);
            printf ("Frame # = %d", (iii + 1));
            ch = getch ();
            if ( ch == esc ) {
                iii = frames;
                ch = space;
                }
            if ((ch == 'A') || (ch == 'a')) {
                i = 0;
```

```
                image_rect = th1 [iii];
                if ((stat1 [iii] == 1) && (targs > 0)) change_rect ();
                th1 [iii] = image_rect;
                }
        if ((ch == 'S') || (ch == 's')) {
                i = 1;
                image_rect = th2 [iii];
                if ((stat2 [iii] == 1) && (targs > 1)) change_rect ();
                th2 [iii] = image_rect;
                }
        if ((ch == 'D') || (ch == 'd')) {
                i = 2;
                image_rect = th3 [iii];
                if ((stat3 [iii] == 1) && (targs > 2)) change_rect ();
                th3 [iii] = image_rect;
                }
        if ((ch == 'F') || (ch == 'f')) {
                i = 3;
                image_rect = th4 [iii];
                if ((stat4 [iii] == 1) && (targs > 3)) change_rect ();
                th4 [iii] = image_rect;
                }
        if ((ch == 'G') || (ch == 'g')) {
                _clearscreen(_GCLEARSCREEN);
                printf ("Enter frame # to goto ");
                scanf ("%d", &lll);

printf ("\n\nFrame # %d", lll);

if (lll < frames) {
                        iii = lll - 1;
                        mmm = stillframe + iii;
                        fast_play_to(mmm);
                        ch = space;
                        }
                }
        } vdisk_cmd(STEPFWD);
        for (kkk = 0; kkk < targs; kkk++) {
                HideCursor ();
                SetForeColor (VIDEO);
                if (kkk == 0) FrameRect (th1 [iii]);
                if (kkk == 1) FrameRect (th2 [iii]);
                if (kkk == 2) FrameRect (th3 [iii]);
                if (kkk == 3) FrameRect (th4 [iii]);
                ShowCursor ();
                }
        } edit_flag = 0;
_setvisualpage(0);
_setactivepage(0);

}
```

```
/*------------------------------------------------------------------*/
/* MODULE:  mapdsk6.c                                               */
/*                                                                  */
/* FUNCTION: screen_menu (void)                                     */
/*                                                                  */
/* This function displays the main control menu for this module and */
/* allows choices to be main via mouse and/or keyboard              */
/*                                                                  */
/*------------------------------------------------------------------*/ static void screen_menu (void) {
        int x,y,row,col,orow,ocol,cflag,odtype;

_settextcolor(7);
        _clearscreen(_GCLEARSCREEN);
        _rectangle(_GBORDER,24,8,160,114);
        _rectangle(_GBORDER,176,8,312,114);
        _rectangle(_GBORDER,328,8,464,114);
        _rectangle(_GBORDER,480,8,616,114);
        for (x = 0; x < 28; x++) {
                _settextposition(rc[x][0],rc[x][1]);
                _outtext(&smenu[x][0]);
        }

_displaycursor(_GCURSORON);
        _settextcolor(12);
        _settextposition(rc[dtype][0],rc[dtype][1]);
        _outtext(&smenu[dtype][0]);
        _settextcolor(7);
        _settextposition(12,1);

orow = 0;
        ocol = 0;
        while (1) {
                if ( kbhit() ) {
                        kkey = getch();
                        if ( kkey == esc ) break;
                        if ((kkey == 'A') || (kkey == 'a')) t1_hit();
                        if ((kkey == 'S') || (kkey == 's')) t2_hit();
                        if ((kkey == 'D') || (kkey == 'd')) t3_hit();
                        if ((kkey == 'F') || (kkey == 'f')) t4_hit();
                        if ( kkey == space ) advance_frame();
                }

GetCursorPos(&mice);
                Buttons ( &micebuttons );
                row = mice.y >> 4;
                col = mice.x >> 3;

if ((row != orow) || (col != ocol)) {
                        orow = row;
                        ocol = col;
                        cflag = 0;
                        if ( (row > 1) && (row < 9) ) {
                                odtype = dtype;
                                if ((col > 4) && (col < 20)) { cflag = 1;
                                        dtype = row - 2;
                                }
                                else if ((col > 23) && (col < 39)) {
                                        cflag = 1;
                                        dtype = row + 5;
```

```c
            }
            else if ((col > 42) && (col < 58)) {
                    cflag = 1;
                    dtype = row + 12;
                    }
            else if ((col > 61) && (col <77)) {
                    cflag = 1;
                    dtype = row + 19;
                    }
            }
        if (cflag) {
                _settextposition(rc[odtype][0],rc[odtype][1]);
                _outtext(&smenu[odtype][0]);
                _settextcolor(12);
                _settextposition(rc[dtype][0],rc[dtype][1]);
                _outtext(&smenu[dtype][0]);
                _settextcolor(7);
                }
        _settextposition(row,col);
        } if (micebuttons & rbmice) {
            wait_till_button_up(rbmice);
            break;
            }
    if (micebuttons & lbmice) {
            if (dtype == 0) vdisk_cmd(PLAYFWD);
            else if (dtype == 1) vdisk_cmd(PLAYREV);
            else if (dtype == 2) vdisk_cmd(SCANFWD);
            else if (dtype == 3) vdisk_cmd(SCANREV);
            else if (dtype == 4) vdisk_cmd(FASTFWD);
            else if (dtype == 5) vdisk_cmd(FASTREV);
            else if (dtype == 6) searchto();
            else if (dtype == 7) vdisk_cmd(SLOWFWD);
            else if (dtype == 8) vdisk_cmd(SLOWREV);
            else if (dtype == 9) vdisk_cmd(STEPFWD);
            else if (dtype == 10) vdisk_cmd(STEPREV);
            else if (dtype == 11) load_scenario();
            else if (dtype == 12) save_scenario();
            else if (dtype == 13) replay_scenario();
            else if (dtype == 14) start_frame();
            else if (dtype == 15) num_targets();
            else if (dtype == 16) advance_frame();
            else if (dtype == 17) t1_area();
            else if (dtype == 18) t2_area();
            else if (dtype == 19) t3_area();
            else if (dtype == 20) t4_area();
            else if (dtype == 21) break;
            else if (dtype == 22) edit_scenario();
            else if (dtype == 23) still_frame();
            else if (dtype == 24) t1_hit();
            else if (dtype == 25) t2_hit();
            else if (dtype == 26) t3_hit();
            else if (dtype == 27) t4_hit();
            wait_till_button_up(lbmice);

_settextposition(13,1);
        printf (" <space> bar will also advance frame");
```

```
                display_frame_no ();

_settextposition(15,1);
                printf ("File:   %s         ", scenname);
                printf ("\n\nStill Frame: \t%d      ", stillframe);
                printf ("\nStart Frame: \t%d       ", startframe);
                printf ("\nFrames:      \t%d       ", frames);
                printf ("\nNo of Targets \t%d      ", targs);
                }
            wait_till_all_buttons_up ();
            }
    _displaycursor(_GCURSOROFF);
    ShowCursor();
}

/*---------------------------------------------------------------*/
/* MODULE: mapdsk6.c                                             */
/*                                                               */
/* FUNCTION: map_targets (void)                                  */
/*                                                               */
/* This function is the external entry point through which this module */
/* is accessed by the main module                                */
/*                                                               */
/*---------------------------------------------------------------*/ extern void map_targets (void) {
        SetBackColor(0x8000L);
        SetForeColor(0L);
        SetRect (&screen, 0, 0, 755, 485);
        EraseRect(screen);
        dtype = 0;
        SetRect (&image_rect, 0, 0, 2, 2);
        SetRect (&image_rect1, 0, 0, 2, 2);
        screen_menu();

}

/*---------------------------------------------------------------*/
/* MODULE: shtb5.c                                               */
/*                                                               */
/* This module records shootback information                     */
/*---------------------------------------------------------------*/

/*
Include Files --> libraries, etc.
*/
#include <stdio.h>
include <stdlib.h>
#include <conio.h>
include <stage.h>
#include <graph.h>
#include <string.h>
#include <process.h>
#include <dos.h>
#include <bios.h>
#include <time.h>
#include <math.h>
include <ctype.h> include "nvdisk.h"

/*
```

SOME LITERAL DECLARATIONS
*/
define    esc    0x1b
define    space    0x20
define    car_ret 0x0d
define    bs    0x08 define    byte    unsigned char
define    word    unsigned int
define    lbmice    0x01
define    rbmice    0x02 define    lbut    0x01
define    rbut    0x02
define    mbut    0x04

/*
VISTA board colors
*/
define WHITE    0x00007FFFL
define BLACK    0x00000000L
define VIDEO    0x00008000L
define RED    0x00007C00L pragma page 0

/*
local variables
*/
static Rect    screen,draw_rect, r1, r2, r3, r4;
static Point    mice;
static word    micebuttons;
static int    x,y,xc,yc,xo,yo;
static char    ch,ch1,kkey,dtype;

/*
file name
*/
extern char    scenname[20];
extern char    fname[50];

/*
target outline colors
*/
static unsigned long    trgcolor[4] = {0x7ebL,0x7c35L,0x435L,0x7febL};

/*
MENU FUNCTION STRINGS AND POSITIONS
*/
static unsigned char  smenu[28][30] = {
        {"play forward   "}, {"play reverse   "}, {"scan foward    "},
        {"scan reverse   "}, {"fast forward   "}, {"fast reverse   "},
        {"search (#)     "}, {"slow forward   "}, {"slow reverse   "}, {"step forward   "},
        {"step reverse   "}, {"load scenario  "}, {"save scenario  "},
        {"replay scenario"},

```
{"         "}, {"         "}, {"advance frame "},
{"t1 area, green "}, {"t2 area, pink "}, {"t3 area, blue "},
{"t4 area, yellow"}, {"EXIT PROGRAM  "}, {"Clear Shootback"}, {"         "},
{"         "}, {"         "}, {"         "},
{"         "}};

static int rc[28][2] = { {2,5}, {3,5}, {4,5}, {5,5}, {6,5}, {7,5}, {8,5},
                {2,24},{3,24},{4,24},{5,24},{6,24},{7,24},{8,24},
                {2,43},{3,43},{4,43},{5,43},{6,43},{7,43},{8,43},
                {2,62},{3,62},{4,62},{5,62},{6,62},{7,62},{8,62} };

/*
scenario DATA
*/
/*
file header (6 bytes)
*/
extern int    startframe;
extern int    stillframe;
extern int    frames;

extern int    targs;

/*
target area rectangles (based on # targets (max 4 for now)
*/
extern Rect   ta1;
extern Rect   ta2;
extern Rect   ta3;
extern Rect   ta4;

/*
target hit rectangles (based on # targets and # frames (5000 for now)
*/
extern int    stat1[5000];
extern int    stat2[5000];
extern int    stat3[5000];
extern int    stat4[5000];

extern Rect   th1[5000];
extern Rect   th2[5000];
extern Rect   th3[5000];
extern Rect   th4[5000];

extern int shootb [500][3];
extern int sb_cnt;
static int sb_ptr;
static int targ_no = 0;
static int count = 0;
static Rect shoot_rect = {0,0,10,10};
static Rect sbleft_rect =   {100, 100, 110, 110};
static Rect sbcenter_rect = {400, 100, 410, 110};
static Rect sbright_rect =  {700, 100, 710, 110};

static unsigned int button_stat;
static char buffff [20];
```

```
static int i;
static int iii;
static int jjj;
static int kkk;
static int lll;
static int xs0, ys0;
static int rect_x0, rect_y0, rect_x1, rect_y1;
static char done;
static char done1;
static int pen_mode;
static Point cur_pos;
static int bframe, eframe, sc_count = 0, image_cnt, no_rect;
static long cnt;
static int active_rect;
static Rect image_rect;
static unsigned long current_color;

static unsigned char hit_flag = 0;
static unsigned char finished = 0;
static unsigned char cursor_flag = 0;
static unsigned char edit_flag = 0;
extern int frame;

#pragma page ()

extern void save_scenario (void);

extern void load_scenario (void);

extern void wait_till_button_up (word bcode);

extern void wait_till_all_buttons_up (void);

/*--------------------------------------------------------------*/
/* MODULE:  shtb6.c                                             */
/*                                                              */
/* FUNCTION: display_areas (void)                               */
/*                                                              */
/* This function displays the target area for the scenario      */
/*--------------------------------------------------------------*/ static void display_areas (void) {

HideCursor ();
        EraseRect(screen);

if (targs > 0) {
                current_color = trgcolor [0];
                SetForeColor (current_color);
                FrameRect (ta1);
                }
        if (targs > 1) {
                current_color = trgcolor [1];
                SetForeColor (current_color);
                FrameRect (ta2);
                }
        if (targs > 2) {
                current_color = trgcolor [2];
                SetForeColor (current_color);
                FrameRect (ta3);
                }
        if (targs > 3) {
```

```
                    current_color = trgcolor [3];
                    SetForeColor (current_color);
                    FrameRect (ta4);
                    }

ShowCursor ();

}

/*---------------------------------------------------------------*/
/* MODULE:  shtbx.c                                              */
/*                                                               */
/* FUNCTION: searchto (void)                                     */
/*                                                               */
/* This function jumps to a specified frame on the video disk    */
/*---------------------------------------------------------------*/ static void searchto (void) {
        int   frmint;
        char  frm[10];

_setvisualpage(1);
        _setactivepage(1);
        _clearscreen(_GCLEARSCREEN);
        while(1) {
                printf ("Enter target frame   ");
                scanf(" %d",&frmint);
                printf ("frame = %d\n",frmint);
                if ( (frmint > 0) && (frmint < 24001) ) break;
                }
        fast_play_to(frmint);
        _setvisualpage(0);
        _setactivepage(0);
        }

/*---------------------------------------------------------------*/
/* MODULE:  shtbx.c                                              */
/*                                                               */
/* FUNCTION: advance_frame (void)                                */
/*                                                               */
/* This function advances the video disk one frame               */
/*---------------------------------------------------------------*/ static void advance_frame (void) {
        frame++;
        if (frame > frames) frame = frames;
        vdisk_cmd(STEPFWD);
        }

/*---------------------------------------------------------------*/
/* MODULE:  shtbx.c                                              */
/*                                                               */
/* FUNCTION: retreat_frame (void)                                */
/*                                                               */
/* This function moves the video disk back one frame             */
/*---------------------------------------------------------------*/ static void retreat_frame (void) {
        if (frame > 0) frame--;
        vdisk_cmd(STEPREV);
        }
```

```c
/*------------------------------------------------------------------*/
/* MODULE: shtb$.c                                                  */
/*                                                                  */
/* FUNCTION: display_areas (void)                                   */
/*                                                                  */
/* This function determines the pattern for the shootback beams     */
/*------------------------------------------------------------------*/ static void get_pattern (void) {
        char    keyed;
        char    done;
        int     temp;

_setvisualpage(1);
        _setactivepage(1);
        _clearscreen(_GCLEARSCREEN);
        done = 0;
        while (done == 0) {
                printf("\n\n\n0 ==> OFF OFF OFF"
                        "\n1 ==> OFF OFF ON"
                        "\n2 ==> OFF ON  OFF"
                        "\n3 ==> OFF ON  ON"
                        "\n4 ==> ON  OFF OFF"
                        "\n5 ==> ON  OFF ON"
                        "\n6 ==> ON  ON  OFF"
                        "\n7 ==> ON  ON  ON");
                printf("\n\n\nEnter pattern number (0 to 7) \n");
                scanf(" %d", &temp);
                if (( temp >= 0) && (temp <= 7)) {
                        done++;
                        shootb [sb_cnt] [0] = frame;
                        shootb [sb_cnt] [1] = targ_no;
                        shootb [sb_cnt] [2] = temp;
                        sb_cnt++;
                        if (sb_cnt > 499) sb_cnt = 499;
                        }
                }
        _setvisualpage(0);
        _setactivepage(0);
        }

/*------------------------------------------------------------------*/
/* MODULE: shtb$.c                                                  */
/*                                                                  */
/* FUNCTION: sync_frame (void)                                      */
/*                                                                  */
/* This function synchronizes internal counters and the video disk frame */
/*------------------------------------------------------------------*/ static void sync_frame (void) {
        register int temp;

temp = vdisk_track ();
        frame = temp - startframe;
        if (frame > frames) frames = frame;
        if (frames > 5000) {
                frame = 5000;
                frames = 5000;
                }

}
```

```
/*-----------------------------------------------------------*/
/* MODULE:   shtb4.c                                         */
/*                                                           */
/* FUNCTION: t1_area (void)                                  */
/*                                                           */
/* This function obtains shootback data for target 1         */
/*-----------------------------------------------------------*/ static void t1_area (void) { if (targs < 1) return;

targ_no = 0;
        sync_frame ();
        get_pattern ();

}

/*-----------------------------------------------------------*/
/* MODULE:   shtb4.c                                         */
/*                                                           */
/* FUNCTION: t2_area (void)                                  */
/*                                                           */
/* This function obtains shootback data for target 2         */
/*-----------------------------------------------------------*/ static void t2_area (void) { if (targs < 2) return;

targ_no = 1;
        sync_frame ();
        get_pattern ();

}

/*-----------------------------------------------------------*/
/* MODULE:   shtb4.c                                         */
/*                                                           */
/* FUNCTION: t3_area (void)                                  */
/*                                                           */
/* This function obtains shootback data for target 3         */
/*-----------------------------------------------------------*/ static void t3_area (void) { if (targs < 3) return;

targ_no = 2;
        sync_frame ();
        get_pattern ();

}

/*-----------------------------------------------------------*/
/* MODULE:   shtb4.c                                         */
/*                                                           */
/* FUNCTION: t4_area (void)                                  */
/*                                                           */
/* This function obtains shootback data for target 4         */
/*-----------------------------------------------------------*/ static void t4_area (void) {
```

```
                if (targs < 4) return;

targ_no = 3;
                sync_frame ();
                get_pattern ();

}

/*---------------------------------------------------------------*/
/* MODULE: shtb6.c                                               */
/*                                                               */
/* FUNCTION: replay_scenario (void)                              */
/*                                                               */
/* This function replays the selected scenario with shootback    */
/*---------------------------------------------------------------*/ static void replay_scenario (void) { fast_play_to(startframe);
        display_areas ();
        SetForeColor (BLACK);
        PaintRect (sbright_rect);
        PaintRect (sbcenter_rect);
        PaintRect (sbleft_rect);
        _setvisualpage(1);
        _setactivepage(1);
        _clearscreen(_GCLEARSCREEN);
        count = 0;
        for (iii = 0; iii < frames; iii++) {
                _settextposition (5,1);
                printf ("Target Status: one-%x  two-%x  three-%x  four-%x",
                        stat1 [iii], stat2 [iii], stat3 [iii], stat4 [iii]);
                for (i = 0; i < targs; i++) {
                        HideCursor ();
                        SetForeColor (trgcolor [i]);
                        if ((i == 0) && (stat1 [iii] == 1)) FrameRect (th1 [iii]);
                        if ((i == 1) && (stat2 [iii] == 1)) FrameRect (th2 [iii]);
                        if ((i == 2) && (stat3 [iii] == 1)) FrameRect (th3 [iii]);
                        if ((i == 3) && (stat4 [iii] == 1)) FrameRect (th4 [iii]);
                        ShowCursor ();
                }
                if (count < sb_cnt) {
                        if (shootb[count][0] == iii) {
                                targ_no = shootb[count][1];
                                sb_ptn = shootb[count][2];
                                _settextposition (7,1);
                                printf ("Frame %d  Target %d", iii, (targ_no + 1));
                                SetForeColor (WHITE);
                                if ((targ_no == 0) && (stat1 [iii] == 1)) shoot_rect = th1[iii];
                                if ((targ_no == 1) && (stat2 [iii] == 1)) shoot_rect = th2[iii];
                                if ((targ_no == 2) && (stat3 [iii] == 1)) shoot_rect = th3[iii];
                                if ((targ_no == 3) && (stat4 [iii] == 1)) shoot_rect = th4[iii];
                                PaintOval (shoot_rect);
                                SetForeColor (RED);
                                switch (sb_ptn) {
                                        case 0:
                                                break;
                                        case 1:
                                                PaintRect (sbright_rect);
                                                break;
```

```
                    case 2:
                            PaintRect (sbcenter_rect),
                            break;

case 3:
                            PaintRect (sbright_rect);
                            PaintRect (sbcenter_rect);
                            break;
                    case 4:
                            PaintRect (sbleft_rect);
                            break;
                    case 5:
                            PaintRect (sbright_rect);
                            PaintRect (sbleft_rect);
                            break;
                    case 6:
                            PaintRect (sbcenter_rect);
                            PaintRect (sbleft_rect);
                            break;
                    case 7:
                            PaintRect (sbright_rect);
                            PaintRect (sbcenter_rect);
                            PaintRect (sbleft_rect);
                            break;
                    default:
                            break;
                    }
            count++;
            for (i = 0; i < 60; i++) {
                    VBLWait ();
            }
            SetForeColor (BLACK);
            PaintRect (sbright_rect);
            PaintRect (sbcenter_rect);
            PaintRect (sbleft_rect);
            }
    }
    VBLWait ();
    VBLWait ();
    VBLWait ();
    VBLWait ();
    SetForeColor (VIDEO);
    PaintOval (shoot_rect);
    vdisk_cmd(STEPFWD);

for (i = 0; i < targs; i++) {
            HideCursor ();
            SetForeColor (VIDEO);
            if (i == 0) FrameRect (th1 [iii]);
            if (i == 1) FrameRect (th2 [iii]);
            if (i == 2) FrameRect (th3 [iii]);
            if (i == 3) FrameRect (th4 [iii]);
            ShowCursor ();
            }
    if (kbhit()) ch = getch ();
    if (ch == esc) iii = frames;
    }
_settextposition (24,1);
```

```
        printf ("\a\a\aEnd of Scenario");
        vdisk_cmd(STEPREV);
        vdisk_cmd(STEPFWD);
        _setvisualpage(0);
        _setactivepage(0);

}
```

/*--------------------------------------------------------------------*/
/* MODULE:   shtb4.c                                                  */
/*                                                                    */
/* FUNCTION: screen_menu (void)                                       */
/*                                                                    */
/* This function displays a menu on the console and allows a selection */
/* to be made                                                         */
/*--------------------------------------------------------------------*/

```
static void screen_menu (void) {
        int x,y,row,col,orow,ocol,cflag,odtype;

_settextcolor(7);
        _clearscreen(_GCLEARSCREEN);
        _rectangle(_GBORDER,24,8,160,114);
        _rectangle(_GBORDER,176,8,312,114);
        _rectangle(_GBORDER,328,8,464,114);
        _rectangle(_GBORDER,480,8,616,114);
        for (x = 0; x < 28; x++) {
                _settextposition(rc[x][0],rc[x][1]);
                _outtext(&smenu[x][0]);
        }
        _displaycursor(_GCURSORON);
        _settextcolor(12);
        _settextposition(rc[dtype][0],rc[dtype][1]);
        _outtext(&smenu[dtype][0]);
        _settextcolor(7);
        _settextposition(12,1);
        orow = 0;
        ocol = 0;
        while (1) {
                if ( kbhit() ) {
                        kkey = getch();
                        if ( kkey == esc ) break;
                        if ((kkey == 'A') || (kkey == 'a')) t1_area();
                        if ((kkey == 'S') || (kkey == 's')) t2_area();
                        if ((kkey == 'D') || (kkey == 'd')) t3_area();
                        if ((kkey == 'F') || (kkey == 'f')) t4_area();
                        if ( kkey == space ) advance_frame();
                }
                GetCursorPos(&mice);
                Buttons ( &micebuttons );
                row = mice.y >> 4;
                col = mice.x >> 3;

if ((row != orow) || (col != ocol)) {
                        orow = row;
                        ocol = col;
                        cflag = 0;
                        if ( (row > 1) && (row < 9) ) {
                                odtype = dtype;
                                if ((col > 4) && (col < 20)) {
                                        cflag = 1;
```

```
                        dtype = row - 2;
                }
                else if ((col > 23) && (col < 39)) {
                        cflag = 1;
                        dtype = row + 5;
                }
                else if ((col > 42) && (col < 58)) {
                        cflag = 1;
                        dtype = row + 12;
                }
                else if ((col > 61) && (col <77)) {
                        cflag = 1;
                        dtype = row + 19;
                }
        }
        if (cflag) {
                _settextposition(rc[odtype][0],rc[odtype][1]);
                _outtext(&smenu[odtype][0]);
                _settextcolor(12);
                _settextposition(rc[dtype][0],rc[dtype][1]);
                _outtext(&smenu[dtype][0]);
                _settextcolor(7);
        }
        _settextposition(row,col);
} if (micebuttons & rbmice) {
        wait_till_button_up(rbmice);
        break;
}
if (micebuttons & lbmice) {
        if (dtype == 0) vdisk_cmd(PLAYFWD);
        else if (dtype == 1) vdisk_cmd(PLAYREV);
        else if (dtype == 2) vdisk_cmd(SCANFWD);
        else if (dtype == 3) vdisk_cmd(SCANFWD);
        else if (dtype == 4) vdisk_cmd(FASTFWD);
        else if (dtype == 5) vdisk_cmd(FASTREV);
        else if (dtype == 6) searchto();
        else if (dtype == 7) vdisk_cmd(SLOWFWD);
        else if (dtype == 8) vdisk_cmd(SLOWREV);
        else if (dtype == 9) vdisk_cmd(STEPFWD);
        else if (dtype == 10) vdisk_cmd(STEPREV);
        else if (dtype == 11) {
                load_scenario();
                fast_play_to(startframe);
                display_areas ();
        }
        else if (dtype == 12) save_scenario();
        else if (dtype == 13) replay_scenario();
        else if (dtype == 16) advance_frame();
        else if (dtype == 17) t1_area();
        else if (dtype == 18) t2_area();
        else if (dtype == 19) t3_area();
        else if (dtype == 20) t4_area();

else if (dtype == 21) break;
        else if (dtype == 22) sb_cnt = 0;
        wait_till_button_up(lbmice);
```

```
            _settextposition(13,1);
            printf (" <space> bar will also advance frame");

_settextposition(15,1);
            printf ("File:  %s", scenname);
            printf ("\n\nStill Frame: \t%d", stillframe);
            printf ("\nStart Frame: \t%d", startframe);
            printf ("\nFrames:     \t%d", frames);
            printf ("\nNo of Targets \t%d", targs);
            }
        wait_till_all_buttons_up ();
        }
    _displaycursor(_GCURSOROFF);
    ShowCursor();
    }

/*--------------------------------------------------------------*/
/* MODULE: shtb4.c                                              */
/*                                                              */
/* FUNCTION: map_shootback (void)                               */
/*                                                              */
/* This function is the entry point for this module and is called by the */
/* main module                                                  */
/*--------------------------------------------------------------*/ extern void map_shootback (void) {
        SetBackColor(0x8000L);
        SetForeColor(0L);
        SetRect (&screen, 0, 0, 755, 485);
        EraseRect(screen);
        dtype = 0;
        SetRect (&image_rect, 0, 0, 2, 2);
        screen_menu();

}

/*--------------------------------------------------------------*/
/* MODULE: playb4.c                                             */
/*                                                              */
/* This function plays back programmed scenarios                */
/*--------------------------------------------------------------*/

/*
Include Files ---> libraries, etc.
*/
#include <stdio.h>
include <stdlib.h>
#include <conio.h>
include <stage.h>
#include <graph.h>
#include <string.h>
#include <process.h>
#include <dos.h>
#include <bios.h>
#include <time.h>
#include <math.h>
include <ctype.h> include "nvdisk.h"

/*
```

SOME LITERAL DECLARATIONS
*/
define    esc    0x1b
define    space  0x20
define    car_ret 0x0d
define    bs     0x08

/*
VISTA board colors
*/
define WHITE  0x00007FFFL
define BLACK  0x00000000L
define VIDEO  0x00008000L
define RED    0x00007C00L pragma page ()

/*
local variables
*/
static Rect    screen = {0, 0, 756, 486};
static int     x, y;
static char    ch;
static int     file_count = 0;

/*
target outline colors
*/
static unsigned long   trgcolor[4] = {0x7ebL,0x7c35L,0x435L,0x7febL};

/*
scenario DATA
*/
/*
file header (6 bytes)
*/
extern int     startframe;
extern int     stillframe;
extern int     frames;
extern int     targs;
static int     no_files = 0;

/*
target area rectangles (based on # targets (max 4 for now)
*/
extern Rect    ta1;
extern Rect    ta2;
extern Rect    ta3;
extern Rect    ta4;

/*
target hit rectangles (based on # targets and # frames (5000 for now)
*/
extern int     stat1[5000];
extern int     stat2[5000];

```
extern int    stat3[5000];
extern int    stat4[5000];

extern Rect   th1[5000];
extern Rect   th2[5000];
extern Rect   th3[5000];
extern Rect   th4[5000];

extern int shootb [500][3];
extern int sb_cnt;
static int sb_ptr;
static int targ_no = 0;
static int count = 0;
static Rect shoot_rect = {0,0,10,10};
static Rect sbleft_rect =   {100, 100, 110, 110};
static Rect sbcenter_rect = {400, 100, 410, 110};
static Rect sbright_rect =  {700, 100, 710, 110};

static int i;
static int j;
static int iii;
static unsigned long current_color;

extern int frame;

#pragma page ()

extern FILE   *mapfile;
static char   scene [20];
extern char   scene_name [50];

extern void open_mapfile (void);

extern void close_mapfile (void);
```

```
/*-----------------------------------------------------------------*/
/* MODULE: playb4.c                                                */
/*                                                                 */
/* FUNCTION: display_areas (void)                                  */
/*                                                                 */
/* This function displays the target area for the scenario         */
/*-----------------------------------------------------------------*/
```

```
static void display_areas (void) {

HideCursor ();
        EraseRect(screen);

if (targs > 0) {
                current_color = trgcolor [0];
                SetForeColor (current_color);
                FrameRect (ta1);
                }
        if (targs > 1) {
                current_color = trgcolor [1];
                SetForeColor (current_color);
                FrameRect (ta2);
                }
        if (targs > 2) {
                current_color = trgcolor [2];
```

```
                    SetForeColor (current_color);
                    FrameRect (ta3);
                    }
        if (targs > 3) {
                    current_color = trgcolor [3];
                    SetForeColor (current_color);
                    FrameRect (ta4);
                    }

ShowCursor ();

}

/*---------------------------------------------------------------*/
/* MODULE: playb4.c                                              */
/*                                                               */
/* FUNCTION: playback (void)                                     */
/*                                                               */
/* This function plays back the selected scenario                */
/*---------------------------------------------------------------*/ static void playback (void) { fast_play_to(startframe);
        while (startframe != vdisk_track ());
        display_areas ();
        SetForeColor (BLACK);
        PaintRect (sbright_rect);
        PaintRect (sbcenter_rect);
        PaintRect (sbleft_rect);
        count = 0;
        for (iii = 0; iii < frames; iii++) {
                    for (i = 0; i < targs; i++) {
                                HideCursor ();
                                SetForeColor (trgcolor [i]);
                                if ((i == 0) && (stat1 [iii] == 1)) FrameRect (th1 [iii]);
                                if ((i == 1) && (stat2 [iii] == 1)) FrameRect (th2 [iii]);
                                if ((i == 2) && (stat3 [iii] == 1)) FrameRect (th3 [iii]);
                                if ((i == 3) && (stat4 [iii] == 1)) FrameRect (th4 [iii]);
                                ShowCursor ();
                                }
                    if (count < sb_cnt) {
                                if (shootb[count][0] == iii) {
                                            targ_no = shootb[count][1];
                                            sb_ptn = shootb[count][2];
                                            SetForeColor (WHITE);
                                            if ((targ_no == 0) && (stat1 [iii] == 1)) shoot_rect = th1[iii];
                                            if ((targ_no == 1) && (stat2 [iii] == 1)) shoot_rect = th2[iii];
                                            if ((targ_no == 2) && (stat3 [iii] == 1)) shoot_rect = th3[iii];
                                            if ((targ_no == 3) && (stat4 [iii] == 1)) shoot_rect = th4[iii];
                                            PaintOval (shoot_rect);
                                            SetForeColor (RED);
                                            switch (sb_ptn) { case 0:
                                                                    break;
                                                        case 1:
                                                                    PaintRect (sbright_rect);
                                                                    break;
```

```
                    case 2:
                            PaintRect (sbcenter_rect);
                            break;
                    case 3:
                            PaintRect (sbright_rect);
                            PaintRect (sbcenter_rect);
                            break;
                    case 4:
                            PaintRect (sbleft_rect);
                            break;
                    case 5:
                            PaintRect (sbright_rect);
                            PaintRect (sbleft_rect);
                            break;
                    case 6:
                            PaintRect (sbcenter_rect);
                            PaintRect (sbleft_rect);
                            break;
                    case 7:
                            PaintRect (sbright_rect);
                            PaintRect (sbcenter_rect);
                            PaintRect (sbleft_rect);
                            break;
                    default:
                            break;
                    }
                    count++;
                    for (i = 0; i < 60; i++) {
                            VBLWait ();
                    }
                    SetForeColor (BLACK);
                    PaintRect (sbright_rect);
                    PaintRect (sbcenter_rect);
                    PaintRect (sbleft_rect);
            }
        }
        VBLWait ();
        VBLWait ();
        VBLWait ();
        VBLWait ();
        SetForeColor (VIDEO);
        PaintOval (shoot_rect);
        vdisk_cmd(STEPFWD);

for (i = 0; i < targs; i++) {
                HideCursor ();
                SetForeColor (VIDEO);
                if (i == 0) FrameRect (th1 [iii]);
                if (i == 1) FrameRect (th2 [iii]);
                if (i == 2) FrameRect (th3 [iii]);
                if (i == 3) FrameRect (th4 [iii]);
                ShowCursor ();
        }
        if (kbhit()) ch = getch ();
        if (ch == esc) iii = frames;
    }
vdisk_cmd(STEPREV);
vdisk_cmd(STEPFWD);

}
```

```
/*----------------------------------------------------------------*/
/* MODULE: playb4.c                                               */
/*                                                                */
/* FUNCTION: playback_scene (void)                                */
/*                                                                */
/* This function is the entry point from the main menu and reads file */
/* for the scenario file to be played back                        */
/*----------------------------------------------------------------*/ extern void playback_scene (void) {
        _clearscreen(_GCLEARSCREEN);
        printf("Playing Back Scenario\n\n");

open_mapfile ();
        fseek (mapfile, 0L, SEEK_SET);
        fscanf (mapfile, "%d", &stillframe);
        fscanf (mapfile, "%d", &no_files);
        printf ("Still Frame: %d    %d files\n", stillframe, no_files);
        for (j = 0; j < no_files; j++) {
                fscanf (mapfile, "%s", scene);
                sprintf(scene_name,"clips\\%s",scene);
                printf (" %s now playing\n", scene);
                load_scene ();
                playback ();
                }
        close_mapfile ();
        }

/*----------------------------------------------------------------*/
/* MODULE: file5.c                                                */
/*                                                                */
/* This module contains the functions (subroutines) that handle file I/O */
/*                                                                */
/*----------------------------------------------------------------*/
/*
Include Files ---> libraries, etc.
*/
#include <stdio.h>
include <stdlib.h>
#include <conio.h>
include <stage.h>
#include <graph.h>
#include <string.h>
#include <process.h>
#include <dos.h>
#include <bios.h>
#include <time.h>
#include <math.h>
include <ctype.h>

/*
SOME LITERAL DECLARATIONS
*/
#define     esc     0x1b
#define     space   0x20
#define     cr      0x0d
define     bs      0x08 pragma page ()

/*
local variables
*/
static char ch;
static int i;

/*
file name
*/
static FILE    *scenfile;
extern FILE    *mapfile= NULL;
static char    *scendir = "ls clips\\*.*";
static char    *mapdir = "ls scenes\\*.*";
```

```
extern char     scenname[20] = {NULL};
static char     mapname[20];
static char     fname[50];
extern char     scene_name[50] = {"clip\\foo.clp\n"};

/*
scenario DATA
*/
/*
file header
*/
extern int      startframe = 0;
extern int      stillframe = 0;
extern int      frames = 0;
extern int      targs = 0;

/*
target area rectangles (based on # targets (max 4 for now)
*/
extern Rect     ta1 = {100,100,150,200};
extern Rect     ta2 = {200,100,300,200};
extern Rect     ta3 = {350,100,450,200};
extern Rect     ta4 = {500,100,600,200};

/*
target hit rectangles (based on # targets and # frames (5000 for now)
*/
extern int      stat1[5000] = {0};
extern int      stat2[5000] = {0};
extern int      stat3[5000] = {0};
extern int      stat4[5000] = {0};

extern Rect     th1[5000] = {{100,150,120,170}};
extern Rect     th2[5000] = {{250,150,270,170}};
extern Rect     th3[5000] = {{400,150,420,170}};
extern Rect     th4[5000] = {{550,150,570,170}};

extern int shootb [500][3] = {{0},{0},{0}};
extern int sb_cnt = 0;
extern int frame = 0;

#pragma page ()

/*--------------------------------------------------------------*/
/* MODULE: file5.c                                              */
/*                                                              */
/* FUNCTION: get_scenname (void)                                */
/*                                                              */
/* This function gets the name of the scene file from the console */
/*                                                              */
/*--------------------------------------------------------------*/ static void get_scenname (void) {
        int     temp;

for (temp = 0; temp < 50; temp++) {     /* clear old filename */
                fname[temp] = 0;
        }
        while(1) {
                printf ("Enter file name for scenario.\n");
                temp = scanf("%s",scenname);
                sprintf(fname,"clips\\%s",scenname);
                if (temp != 0) break;
        }
}

/*--------------------------------------------------------------*/
/* MODULE: file5.c                                              */
/*                                                              */
/* FUNCTION: get_mapname (void)                                 */
/*                                                              */
/* This function gets the name of the map file from the console */
/*--------------------------------------------------------------*/ static void get_mapname (void) {
        int     temp;
```

```c
        for (temp = 0; temp < 50; temp++) {    /* clear old filename */
                fname[temp] = 0;
                }
        while(1) {
                printf ("Enter file name for mapfile.\n");
                temp = scanf("%s",mapname);
                sprintf(fname,"scenes\\%s",mapname);
                if (temp != 0) break;
                }
        }

/*--------------------------------------------------------------------*/
/* MODULE: file5.c                                                    */
/*                                                                    */
/* FUNCTION: save_scenario(void)                                      */
/*                                                                    */
/* This function saves the current scenario to disk                   */
/*                                                                    */
/*--------------------------------------------------------------------*/ extern void save_scenario (void) {
        char    keyed;

_setvisualpage(1);
        _setactivepage(1);
        _clearscreen(_GCLEARSCREEN);
        printf("scenario directory\n");
        system(scendir);
        get_scenname();
        printf("Hit 'S' to save scenario to file > %s\n\n",fname);
        printf("(caution this will clear any data under filename)/n");
        keyed = getch();
        if ( (keyed == 'S') || (keyed == 's') ) {
                if ((scenfile = fopen(fname,"wb")) == NULL) {
                        printf("cant open file");
                        }
                else {
                        fwrite( (char *)&startframe,2,1,scenfile);
                        fwrite( (char *)&stillframe,2,1,scenfile);
                        fwrite( (char *)&frames,2,1,scenfile);
                        fwrite( (char *)&targs,2,1,scenfile);
                        if (targs > 0) fwrite ( (char *)&ta1, sizeof(Rect), 1, scenfile);
                        if (targs > 1) fwrite ( (char *)&ta2, sizeof(Rect), 1, scenfile);
                        if (targs > 2) fwrite ( (char *)&ta3, sizeof(Rect), 1, scenfile);
                        if (targs > 3) fwrite ( (char *)&ta4, sizeof(Rect), 1, scenfile);
                        for (i = 0; i < frames; i++) {
                                if (targs > 0) {
                                        fwrite ( (char *)&th1 [i], sizeof(Rect), 1, scenfile);
                                        fwrite ( (char *)&stat1 [i], sizeof(int), 1, scenfile);
                                        }
                                if (targs > 1) {
                                        fwrite ( (char *)&th2 [i], sizeof(Rect), 1, scenfile);
                                        fwrite ( (char *)&stat2 [i], sizeof(int), 1, scenfile);
                                        }
                                if (targs > 2) {
                                        fwrite ( (char *)&th3 [i], sizeof(Rect), 1, scenfile);
                                        fwrite ( (char *)&stat3 [i], sizeof(int), 1, scenfile);
                                        }
                                if (targs > 3) {
                                        fwrite ( (char *)&th4 [i], sizeof(Rect), 1, scenfile);
                                        fwrite ( (char *)&stat4 [i], sizeof(int), 1, scenfile);
                                        }
                                }
                        fwrite( (char *)&sb_cnt,2,1,scenfile);
                        for (i = 0; i < sb_cnt; i++) {
                                fwrite( (char *)&shootb[i][0],2,1,scenfile);
                                fwrite( (char *)&shootb[i][1],2,1,scenfile);
                                fwrite( (char *)&shootb[i][2],2,1,scenfile);
                                }
                        printf("saved data to file > %s\n",fname);
                        fclose(scenfile);
                        }
                }
        _setvisualpage(0);
        _setactivepage(0);
        }
```

```
/*-------------------------------------------------------------------*/
/* MODULE:  file5.c                                                  */
/*                                                                   */
/* FUNCTION:  load_scenario (void)                                   */
/*                                                                   */
/* This function reads the data from a file back into memory         */
/* This function loads under console control                         */
/*                                                                   */
/*-------------------------------------------------------------------*/ extern void load_scenario (void) {
        char    keyed;
        int     i,j,k;
        int     frmint;
        char    frm[10];
        int     actual;

for (i = 0; i < 5001; i++) {
                stat1[i] = 0;
                stat2[i] = 0;
                stat3[i] = 0;
                stat4[i] = 0;
                } for (i = 0; i < 500; i++) {
                shootb [i][0] = 0;
                shootb [i][1] = 0;
                shootb [i][2] = 0;
                } sb_cnt = 0;
        frame = 0;
        frames = 0;
        startframe = 0;
        stillframe = 0;
        targs = 0;

_setvisualpage(1);
        _setactivepage(1);
        _clearscreen(_GCLEARSCREEN);
        printf("scenario directory\n\n\n");
        system(scendir);
        get_scenname();
        printf("\n\nHit 'G' to retrieve scenario from file > %s\n",fname);
        printf("     (caution this will overwrite any current data)\n");
        keyed = getch();
        if ( (keyed == 'G') || (keyed == 'g') ) {
                if ((scenfile = fopen(fname,"rb")) == NULL) {
                        printf("cant open file");
                        }
                else {
                        fseek(scenfile,0L,SEEK_SET);
                        fread( (char *)&startframe,2,1,scenfile);
                        fread( (char *)&stillframe,2,1,scenfile);
                        fread( (char *)&frames,2,1,scenfile);
                        fread( (char *)&targs,2,1,scenfile);
                        if (targs > 0) fread ( (char *)&ta1, sizeof(Rect), 1, scenfile);
                        if (targs > 1) fread ( (char *)&ta2, sizeof(Rect), 1, scenfile);
                        if (targs > 2) fread ( (char *)&ta3, sizeof(Rect), 1, scenfile);
                        if (targs > 3) fread ( (char *)&ta4, sizeof(Rect), 1, scenfile);
                        for (i = 0; i < frames; i++) {
                                if (targs > 0) {
                                        fread ( (char *)&th1 [i], sizeof(Rect), 1, scenfile);
                                        fread ( (char *)&stat1 [i], sizeof(int), 1, scenfile);
                                        }
                                if (targs > 1) {
                                        fread ( (char *)&th2 [i], sizeof(Rect), 1, scenfile);
                                        fread ( (char *)&stat2 [i], sizeof(int), 1, scenfile);
                                        } if (targs > 2) {
                                        fread ( (char *)&th3 [i], sizeof(Rect), 1, scenfile);
                                        fread ( (char *)&stat3 [i], sizeof(int), 1, scenfile);
                                        }
                                if (targs > 3) {
                                        fread ( (char *)&th4 [i], sizeof(Rect), 1, scenfile);
                                        fread ( (char *)&stat4 [i], sizeof(int), 1, scenfile);
                                        }
```

```c
                }
                actual = fread ( (char *)&sb_cnt,2,1,scenfile);
                if (actual > 0) {
                        for (i = 0; i < sb_cnt; i++) {
                                fread ( (char *)&shootb[i][0],2,1,scenfile);
                                fread ( (char *)&shootb[i][1],2,1,scenfile);
                                fread ( (char *)&shootb[i][2],2,1,scenfile);
                        }
                }
                printf("retrieved data from file > %s\n",fname);
                fclose(scenfile);
        }
    }
    _setvisualpage(0);
    _setactivepage(0);

}

/*----------------------------------------------------------------*/
/* MODULE:   file5.c                                              */
/*                                                                */
/* FUNCTION: load_scene (void)                                    */
/*                                                                */
/* This function reads the data from a file back into memory.     */
/* This function loads from the scenario playback module.         */
/*                                                                */
/*----------------------------------------------------------------*/ extern void load_scene (void) {
        char    keyed;
        int     i,j,k;
        int     frmint;
        char    frm[10];
        int     actual;

for (i = 0; i < 5001; i++) {
                stat1[i] = 0;
                stat2[i] = 0;
                stat3[i] = 0;
                stat4[i] = 0;
                } for (i = 0; i < 500; i++) {
                shootb [i][0] = 0;
                shootb [i][1] = 0;
                shootb [i][2] = 0;
                } sb_cnt = 0;
        frame = 0;
        frames = 0;
        startframe = 0;
        stillframe = 0;
        targs = 0;

if ((scenfile = fopen(scene_name,"rb")) == NULL) {
                printf("cant open scenario file");
                getch ();
                }
        else {
                fseek(scenfile,0L,SEEK_SET);
                fread( (char *)&startframe,2,1,scenfile);
                fread( (char *)&stillframe,2,1,scenfile);
                fread( (char *)&frames,2,1,scenfile);
                fread( (char *)&targs,2,1,scenfile);
                if (targs > 0) fread ( (char *)&ta1, sizeof(Rect), 1, scenfile);
                if (targs > 1) fread ( (char *)&ta2, sizeof(Rect), 1, scenfile);
                if (targs > 2) fread ( (char *)&ta3, sizeof(Rect), 1, scenfile);
                if (targs > 3) fread ( (char *)&ta4, sizeof(Rect), 1, scenfile);
                for (i = 0; i < frames; i++) {
                        if (targs > 0) {
                                fread ( (char *)&th1 [i], sizeof(Rect), 1, scenfile);
                                fread ( (char *)&stat1 [i], sizeof(int), 1, scenfile);
                                }
                        if (targs > 1) {
                                fread ( (char *)&th2 [i], sizeof(Rect), 1, scenfile);
                                fread ( (char *)&stat2 [i], sizeof(int), 1, scenfile);
                                }
```

```c
if (targs > 2) {
        fread ( (char *)&th3 [i], sizeof(Rect), 1, scenfile);
        fread ( (char *)&stat3 [i], sizeof(int), 1, scenfile);
        }
if (targs > 3) {
        fread ( (char *)&th4 [i], sizeof(Rect), 1, scenfile);
        fread ( (char *)&stat4 [i], sizeof(int), 1, scenfile);
        }
} actual = fread ( (char *)&sb_cnt,2,1,scenfile);
                if (actual > 0) {
                        for (i = 0; i < sb_cnt; i++) {
                                fread ( (char *)&shootb[i][0],2,1,scenfile);
                                fread ( (char *)&shootb[i][1],2,1,scenfile);
                                fread ( (char *)&shootb[i][2],2,1,scenfile);
                                }
                        }
                fclose(scenfile);
                }
        }

/*----------------------------------------------------------------*/
/* MODULE:  file5.c                                               */
/*                                                                */
/* FUNCTION:  open_mapfile (void)                                 */
/*                                                                */
/* This function opens a mapfile using console input to obtainthe file */
/* name.                                                          */
/*                                                                */
/*----------------------------------------------------------------*/ extern void open_mapfile (void) {
        char    keyed;

_setvisualpage(1);
        _setactivepage(1);
        _clearscreen(_GCLEARSCREEN);
        printf("scenario directory\n");
        system(mapdir);
        get_mapname ();
        printf("Hit 'O' to open scene file > %s\n\n",fname);
        keyed = getch();
        if ( (keyed == 'O') || (keyed == 'o') ) {
                if ((mapfile = fopen(fname,"rt")) == NULL) {
                        printf("cant open scene file");
                        getch ();
                        }
                }
        _setvisualpage(0);
        _setactivepage(0);
        }
extern void close_mapfile (void) {
        fclose(mapfile);
        }
/*----------------------------------------------------------------*/
/* MODULE:  file5.c                                               */
/*                                                                */
/* FUNCTION:  edit_mapfile (void)                                 */
/*                                                                */
/* This function shells out to a text editor (ae --> short for aedit) */
/* to edit the mapfile.                                           */
/*                                                                */
/*----------------------------------------------------------------*/ extern void edit_mapfile (void) {
        _setvideomode(_DEFAULTMODE);
        _clearscreen(_GCLEARSCREEN);
        system (mapdir);
        get_mapname ();
        sprintf (fname, "ae scenes\\%s", mapname);
        system (fname);
        _setvideomode(_ERESCOLOR);
        _clearscreen(_GCLEARSCREEN);
        }
```

What is claimed is:

1. Apparatus that provides tracking of a source of infrared illumination from at least one trainee's weapon to continuously monitor its movement for continuously identifying the aiming position coordinates of said trainee's weapon, comprising:

a reflective screen;

a source of infrared energy from at least one trainee's weapon having a beam output to directly illuminate a spot on any position of said screen;

optical means having a field of view and having said infrared illuminated spot within its field of view, for receiving energy from said infrared energy source reflected by said screen, transmitting the energy and focusing it at a preselected distance optically downstream;

electrically-biased means at said preselected distance optically downstream said optical means for sensing said energy transmitted by said optical means and providing two pairs of opposing output signal voltages from a substantially two-dimensional surface with first and second outputs being opposite one another on said two-dimensional surface, and third and fourth outputs likewise being opposite one another that identify in each orthogonal location whereat the energy is sensed; and processing means comprising a separate electronic channel for receiving each of said output signal voltages from said electrically-biased means and each channel including a transimpedance amplifier coupled to its respective output of said electrically-biased means, a band-pass filter coupled to its transimpedance amplifier, a full-wave rectifier coupled to its transimpedance amplifier, and a low-pass filter coupled to its full-wave rectifier, and wherein said low-pass filters of said channels are coupled to an analog-to-digital converter for determining therefrom the orthogonal location of said spot on said screen.

2. The apparatus of claim 1 wherein said electrically-biased means is a position sensing detector.

3. The apparatus of claim 1 wherein said optical means includes filter means for blocking visible light from being focused at said preselected distance optically downstream.

* * * * *